(12) United States Patent
Hilscher et al.

(10) Patent No.: US 12,710,375 B2
(45) Date of Patent: Aug. 18, 2026

(54) METHODS FOR ANALYZING PLANT MATERIAL, FOR DETERMINING PLANT MATERIAL COMPONENTS AND FOR DETECTING PLANT DISEASES IN PLANT MATERIAL

(71) Applicant: KWS SAAT SE & Co. KGaA, Einbeck (DE)

(72) Inventors: Elke Hilscher, Einbeck (DE); Heiko Narten, Einbeck (DE); Stefan Meldau, Einbeck (DE)

(73) Assignee: KWS SAAT SE & Co. KGaA, Einbeck (DE)

( * ) Notice: Subject to any disclaimer, the term of this patent is extended or adjusted under 35 U.S.C. 154(b) by 118 days.

(21) Appl. No.: 18/277,357

(22) PCT Filed: Feb. 16, 2022

(86) PCT No.: PCT/EP2022/053786
§ 371 (c)(1),
(2) Date: Aug. 15, 2023

(87) PCT Pub. No.: WO2022/175309
PCT Pub. Date: Aug. 25, 2022

(65) Prior Publication Data

US 2024/0125711 A1 Apr. 18, 2024

(30) Foreign Application Priority Data

| | | |
|---|---|---|
| Feb. 17, 2021 | (EP) | 21157702 |
| Feb. 17, 2021 | (EP) | 21157707 |
| Oct. 6, 2021 | (EP) | 21201107 |

(51) Int. Cl.
*G01N 21/00* (2006.01)
*G01N 21/3563* (2014.01)
(Continued)

(52) U.S. Cl.
CPC ......... *G01N 21/94* (2013.01); *G01N 21/3563* (2013.01); *G01N 21/359* (2013.01)

(58) Field of Classification Search
CPC .. G01N 21/31; G01N 21/3563; G01N 21/359; G01N 21/64; G01N 21/65; G01N 21/71; G01N 21/85; G01N 21/94
See application file for complete search history.

(56) References Cited

U.S. PATENT DOCUMENTS

| | | | |
|---|---|---|---|
| 6,630,672 | B1 | 10/2003 | Brotherton et al. |
| 7,695,566 | B2 | 4/2010 | Arnold et al. |

(Continued)

FOREIGN PATENT DOCUMENTS

| | | | |
|---|---|---|---|
| CN | 101815795 | A | 8/2010 |
| CN | 104034691 | A | 9/2014 |

(Continued)

OTHER PUBLICATIONS

Balmer et al., "Induces resistance in maize is based on organ-specific defence responses", The Plant Journal, 2013, vol. 74, pp. 213-225.

(Continued)

*Primary Examiner* — Dani Fox
(74) *Attorney, Agent, or Firm* — Troutman Pepper Locke LLP

(57) ABSTRACT

The invention relates to a method for analyzing a crop sample comprising a target plant material with soil tare adhered thereto, particularly soiled plant material. Further, the invention relates to a method for generating first calibration data for analyzing a crop sample comprising a target plant material with soil tare adhered thereto, and an analysis assembly for analyzing a crop sample comprising the target plant material. In addition, the invention relates to an arrangement for analyzing a crop sample comprising the
(Continued)

target plant material, a sugar production facility, and the use of an analysis assembly in a sugar production facility. Further, the invention relates to a method for determining components in sugar beets for sugar production. Further, the invention relates to a method for detecting plant diseases in plant material and/or physiological properties influenceable by environmental stress in plant material.

11 Claims, 20 Drawing Sheets

(51) Int. Cl.
*G01N 21/359* (2014.01)
*G01N 21/94* (2006.01)

(56) References Cited

U.S. PATENT DOCUMENTS

| | | | | |
|---|---|---|---|---|
| 8,328,948 | B2 | 12/2012 | Rad et al. | |
| 8,691,306 | B2 | 4/2014 | Arnold et al. | |
| 2010/0216114 | A1 | 8/2010 | Friedhoff et al. | |
| 2010/0329515 | A1* | 12/2010 | Edgerton | G01N 21/3563 435/165 |
| 2012/0293801 | A1 | 11/2012 | Kanal et al. | |
| 2013/0126399 | A1 | 5/2013 | Wolff | |
| 2015/0147797 | A1 | 5/2015 | Johnson et al. | |
| 2019/0041334 | A1 | 2/2019 | Nikolajsen et al. | |
| 2020/0208227 | A1 | 7/2020 | Ajdari Rad | |

FOREIGN PATENT DOCUMENTS

| | | | |
|---|---|---|---|
| CN | 108760635 | A | 11/2018 |
| DE | 2611636 | | 3/1977 |
| DE | 10 2018 127846 | | 5/2020 |
| EP | 1 894 461 | A1 | 3/2008 |
| JP | 2002-005842 | A | 1/2002 |
| JP | 2006-038511 | A | 2/2006 |
| JP | 2013-074807 | A | 4/2013 |
| KR | 10-2014-0038213 | A | 3/2014 |
| WO | 99/34193 | | 7/1999 |
| WO | 2004/055219 | A1 | 7/2004 |
| WO | 2009/121423 | A1 | 10/2009 |
| WO | 2018/018089 | A1 | 2/2018 |
| WO | 2018/193984 | A1 | 10/2018 |
| WO | 2019/185149 | | 10/2019 |

OTHER PUBLICATIONS

Yang et al., "Transcriptomic and Phytochemical Analyses Reveal Root-Mediated Resource-Based Defense Response to Leave Herbivory by Ectropis oblique in Tea Plat (*Camellia sinensis*)", Journal of Agricultural and Food Chemistry, 2019, vol. 67, No. 19, pp. 5465-5476.

Karssemeijer et al., "Foliar herbivory by caterpillars and aphids differentially affects phytohormonal signalling in roots and plant defence to a root herbivore", Plant Cell & Environment, 2020, vol. 43, pp. 775-786.

Buddemeyer et al., "Genotypic reaction of sugar beet to Rhizoctonia solani root and crown rot—susceptibility, yield and quality at different levels of infestation", Journal of Plant Diseases and Protection, 2005, vol. 112, No. 2, pp. 105-117.

Yordanov et al., "Plant response to drought, acclimation, and stress tolerance", Photosyntetica, 2000, vol. 38, No. 1, pp. 171-186.

Shaw et al., "Responses of sugar beet (*Beta vulgaris* L.) to drought and nutrient deficiency stress", Plant Growth Regulation, 2002, vol. 37, pp. 77-83.

Buchholz et al., "Neubewertung des technischen Wertes von Zuckerrüben","Re-evaluation of technical value of sugar beet", Zuckerind., 1995, vol. 120, Nr. 2, pp. 113-121 (with English Abstract only).

Bruhns et al., "Neue Technikumsanlage zur Rübenverabeitung am Zuckerinstitut Braunschweig", "New R&D installation for beet processing at the Brunswick sugar institute", Zuckerind., 1993, vol. 118, No. 6, pp. 450-454 (with English Abstract only).

Burba et al., "Nichtzuckerbilanz und lonenbilanz im Dicksaft als Grundlagen einer Qualitätsbewertung von Zuckerrüben—Teil 1", "The nonsugar and ion balances of thick juice as bases for a quality assessment of sugar beets: Part 1", Zuckerind., 1993, vol. 118, No. 9, pp. 682-691 (with English Abstract Only).

Burba et al., "Nichtzuckerbilanz und lonenbilanz im Dicksaft als Grundlagen einer Qualitätsbewertung von Zuckerrüben - Teil 2", "The nonsugar and ion balances of thick juice as bases for a quality assessment of sugar beets: Part 2", Zuckerind., 1993, vol. 118, No. 12, pp. 921-936 (with English Abstract Only).

Burba, "Perspectives and Limits of current beet quality evaluation", "Perspektiven und Grenzen der heutigen Rübenqualitäts-Bewertung", Zuckerind., 1998, vol. 123, No. 5, pp. 365-374.

Tamada et al., Beet Necrotic Yellow Vein Virus from Rizomania-Affected Sugar Beet in Japan, Ann. Phytopath. Soc. Japan, 1973, vol. 39, pp. 325-332.

International Search Report and Written Opinion issued in PCT/EP2022/053786 dated Jul. 8, 2022.

Magaña et al., "Direct prediction of bioethanol yield in sugar beet pulp using Near Infrared Spectroscopy", Bioresource Technology, 2011, vol. 102, No. 20, pp. 9542-9549.

Tugrul et al., "Determination of soil loss by sugar beet harvesting", Soil & Tillage Research, 2012, vol. 123, pp. 71-77.

Hien, "Analyse von verfahren zur bestimmung der qualität von zuckerrüben, insbesondere des erdantells", "Analysis of procedures to measure the quality of sugar beet, especially of soil tare", Zuckerindustrie, 1996, vol. 121, No. 4, pp. 244-249 (with English Abstract only).

Li et al., "Modern imaging techniques in plant nutrition analysis: A review", Computers and Electronics in Agriculture, 2020, vol. 174, 105459, 14 pages.

Li et al. "A Review of Imaging Techniques for Plant Phenotyping", Sensors, 2014, vol. 14, No. 11, pp. 20078-20111.

Ncama et al., "Non-destructive prediction of 'Marsh' grapefruit susceptibility to postharvest rind pitting disorder using reflectance Vis/NIR spectroscopy", Scientia Horticulturae, 2018, vol. 231, pp. 265-271.

Office Action issued in JP Application No. 2023549982 dated Oct. 28, 2025 (with English translation).

Jones et al., "The development of on-line analysis by NIR in the beet sugar production process", Making Light Work: Advances in Near Infrared Spectroscopy, 1991, pp. 447-453.

O'Shea et al., "Implementation of on-line near infrared (NIR) technologies for the anlysis of cane, bagasse and raw sugar in sugar factories to improve performance", International Sugar Journal, 2011, vol. 113, Issue 1345, pp. 879-887.

Heppner et al., "Potential applications of NIR spectrometry in the sugar industry", [Einsatzmoglichkeiten der NIR- Spektrometrie in der Zuckerindustrie], Zuckerindustrie, 2000, vol. 125, Issue 5, pp. 325-330. (with English Abstract).

Third Party Observations issued in European Application No. 22706290.8 mailed May 13, 2026.

* cited by examiner

METHODS FOR ANALYZING PLANT MATERIAL, FOR DETERMINING PLANT MATERIAL COMPONENTS AND FOR DETECTING PLANT DISEASES IN PLANT MATERIAL

CROSS-REFERENCE TO RELATED APPLICATIONS

This application is a U.S. National Phase of International Patent Application No. PCT/EP2022/053786, filed on Feb. 16, 2022, which claims priority to European Application No. 21201107.6, filed Oct. 6, 2021, European Application No. 21157707.7, filed Feb. 17, 2021, and European Application No. 21157702.8, filed Feb. 17, 2021. The entire contents of these applications are incorporated herein by reference in their entirety.

The invention relates to a method for analyzing a crop sample comprising a target plant material with soil tare adhered thereto, a method for generating first calibration data for analyzing a crop sample comprising a target plant material with soil tare adhered thereto, and an analysis assembly for analyzing a crop sample comprising a target plant material with soil tare adhered thereto. Further, the invention relates to an arrangement for analyzing a crop sample comprising a target plant material with soil tare adhered thereto, a sugar production facility, and the use of an analysis assembly in a sugar production facility.

In the food industry, typically plant material, such as root crops, in particular sugar beets, are delivered to a production facility, for example a sugar production facility. Sugar beets are typically used for sugar production in sugar production facilities. Sugar beets are removed from the ground and are either delivered directly to the sugar production facility or stored at the field for later delivery to the sugar production facility. When sugar beets are delivered to a sugar production facility, the so-called tare content, which is the amount of soil tare (which is also denominated soil tare or tare soil) comprising for example soil that adheres to the sugar beets, solid lumps, leaf debris, weeds, loose soil, stones, and any other material that was picked up with the sugar beets, is determined. Sugar beets are delivered with trucks to receiving stations, where the trucks with the sugar beets are weighed. The sugar beets are transferred to a set of grab rolls. The grab rolls grate and pinch off a substantial portion of tops, weeds, and dirt, which is attached to the sugar beets after harvesting. The soil tare is often referred to as tare soil or soil tare (as described for example in Vermeulen, G. D: "Reduction of soil tare by improving uprooting of sugar beet, a soil dynamic approach"; Dissertation Wageningen University 2001) and can be expressed in percent of the total mass of sugar beets and soil tare (i.e. gross soil tare) or in percent of the mass of cleaned sugar beets (i.e. net soil tare). The relative mass of the tare soil is usually referred to as soil tare, expressed in percent of the total mass of sugar beets and soil tare (gross soil tare) or of the mass of the clean sugar beets (net soil tare). Determining the tons of sugar beets that are received at a receiving station, the truck can be weighed fully loaded upon arrival and then weighed again empty after offloading the delivery.

The terms unwanted material, tare soil and soil tare are used synonymously herein.

To determine the amount of soil tare, the delivered sugar beets or a part of the delivered sugar beets, for example in the range of 20 wt. %-25 wt. % of the delivered sugar beets, are weighted and sampled. First, the sample is weighed, and then the sugar beets are washed and cleaned. Thereby, it is typically necessary that material has to be removed by hand. Then, the cleaned sample is weighed and the percentage by mass of the soil tare (% tare) is calculated by determining the mass of the uncleaned sample (W1) minus the mass of the cleaned sample (W2) and dividing this difference by the mass of the uncleaned sample (W1). The result therefrom expressed in percent is often referred to as "tare percentage", which is the percentage of mass of the soil tare with respect to the mass of the whole delivery comprising plant material and soil tare. The equation of the above described calculation can be expressed as follows:

$$\%\ \text{tare}=([W1-W2]/W1)\times 100$$

In "Beet-Sugar Handbook", Mosen Asadi, John Wiley & Sons, 23.06.2006-800 pages, p. 94-96 it is described that a beet gross weight (weight of sugar beets and tare) equals the weight of the loaded vehicle (weight in) minus the weight of the unloaded vehicle (weight out).

$$\text{Weight gross}=\text{Weight in}-\text{Weight out}$$

And all tare for a particular grower for each day can be averaged and applied to the sugar beet gross weight to calculate sugar beet net weight $$\text{Net weight}=(\text{Gross weight})\times(100-\%\ \text{tare})/100$$

With the tare percentage the net mass of delivered sugar beets can be determined. Based on the net mass, the deliverer can be paid. Typically, the payment for the delivery is calculated by taking into account the determined percentage by mass of the soil tare and preferably other parameters such as sugar content of the sugar beets.

Existing solutions, however, have the drawback that determining the percentage by mass of the soil tare requires a considerable amount of equipment for weighing and/or sampling and/or preparing, in particular cleaning, manually removing unwanted material and drying, the delivered plant material. In addition, large amounts of water are needed in these processes, for example 600-1000 gallons of water per minute per washer can be needed, and many laboratories operate multiple lines with each line having a washer. Thus, a challenge for most laboratories is that they first must source a large amount of water which needs to be a relatively clean and which needs to be provided from a stable source. Furthermore, it must be possible to dispose the water which typically contains dirt and other contaminants, hence it is typically required that the water is treated. In addition, determining the percentage by mass is relatively time-consuming and labour-intensive. Hence, the determination of the percentage of mass of the soil tare is relatively expensive.

It is an object of the present invention to provide an improved method for analyzing a crop sample comprising a target plant material with soil tare adhered thereto, and/or to provide an improved method for generating calibration data for analyzing a crop sample comprising a target plant material with soil tare adhered thereto, and/or to provide an improved analysis assembly and/or an improved arrangement for analyzing a crop sample comprising a target plant material with soil tare adhered thereto. In particular, it is an object of the present invention to provide a solution for reliably determining the amount of soil tare and/or to reliably determine components of the soil tare.

Furtherhe invention relates to a method for determining components in industrial processing of sugar beets in a production facility, an arrangement for determining components in sugar beets for sugar production, a sugar production facility, and a method for generating calibration data for the determination of components in sugar beets for sugar production. Further, the invention relates to a use of an analysis assembly in a sugar production facility and/or a use of an arrangement for determining components in sugar beets for sugar production and/or a use of a method for determining components in sugar beets for sugar production.

Sugar beets are typically used for sugar production in sugar production facilities. In a sugar production process that consists of several steps, sugar is extracted from the sugar beets.

Existing solutions, in particular for extracting sugar from sugar beets, are described for example in U.S. Pat. No. 7,695,566 B2, U.S. Pat. No. 8,328,948 B2, U.S. Pat. No. 8,691,306 B2, US 2020/0208227 A1, and WO 2004/055219 A1.

For determining components in sugar beets and for quality control of the sugar beets received at a sugar production facility, typically a sub-sample of the delivered sugar beets is analysed. Therefore usually, a beet saw, for example as described in DE 2611636 B1, is used with which a fine and homogeneous sugar beet pulp can be prepared from the sugar beets. The sugar beet pulp is extracted using aluminium sulfate or lead acetate solution or water, then analysed by conducting measurements, such as polarimetry, flame photometry, fluorometric o-phthalaldehyde (OPA) method, copper method, and immobilized enzyme biosensor method or others.

Determining components in sugar beets for sugar production and quality control of sugar beets is relatively time consuming as well as labour and cost intensive. Furthermore, only a small fraction of the sugar beets received at a sugar production facility is analysed for quality control. From the sugar beet pulp usually only a sample of 0.3-2 wt. %, for example 26 g of sugar beet pulp, is used for determining components. Many process steps from sampling to analysing are necessary and these steps have an influence on the accuracy of the analysis results and are thus only limitedly representative. As a result of such non-representative sampling and analysis, significant distortions and therefore an unreliability may occur in the component analysis, resulting in suboptimal sugar production from the sugar beets.

It is a further object of the present invention to provide an improved method for determining components in sugar beets for sugar production, and/or to provide an improved method for generating calibration data for the determination of components in sugar beets for sugar production, and/or to provide an improved arrangement for determining components in sugar beets for sugar production, and/or to provide an improved sugar production facility. In particular, it is an object of the present invention to provide a solution for improving the quality control of sugar beets in a sugar production process and for determining components in sugar beets for sugar production.

The invention further relates to a method for detecting plant diseases in plant material and/or physiological properties influenceable by environmental stress in plant material, an analysis assembly for detecting plant diseases in plant material, an arrangement for detecting plant diseases in plant material, and a control unit for controlling an analysis assembly and/or for receiving data from an analysis assembly.

In breeding, field trail, and/or in plant processing industries, such as the sugar industry, plant diseases can occur in plant material used therein. The infection of plant material with plant diseases is typically detrimental, as plant diseases can dramatically change the properties of the plant material.

Many biotic agents, such as virus, fungi, bacteria, nematodes, insects, molluscs, mammals, arthropods can cause imbalance in the physiology of the vital plant material parts. These biotic agents can attack the tissue of the plant material and cause chemical changes in the systemic tissues that are not directly affected. For example, maize leaf infection by fungi can cause physiological changes in the root of the plant material, even if the roots of the plant material are not infected (Balmer et al, The Plant Journal (2013) 74, 213-225). In addition, leaf infestation by pests can cause root metabolite changes in tea plants (Yang et al. J. Agric. Food Chem. 2019, 67, 19, 5465-5476). Furthermore, different leaf pests affect root metabolic responses in cabbage plants (Karssemeijer et al, Plant Cell Environ. 2020; 43:775-786). Sugar beet root and crown rot, induced by the soil-borne fungus *Rhizoctonia solani*, has an influence on quality components in sugarbeets. *R. solani* infestation led to an enormous increase of reducing sugars as glucose and fructose. The molassegenic components sodium and amino-N showed minimal or no reaction to infestation, whereas potassium increased with increasing disease severity (J. Buddemeyer; B. Marlander; Journal of Plant Diseases and Protection Vol. 112, No. 2; 105-117; 2005). These examples show that chemical changes can be measured throughout the plant material after infection of local tissues. Both parasite and non-parasites diseases cause a great deal of damage and are characterized by wilting, scabs, mold coatings, rusts, and blotches, holes and rotted tissue.

At the whole plant level all stress conditions as drought stress, heat stress, salt stress are usually perceived as a decreases in photosynthesis and growth. Plants have evolved several adaptive mechanisms that allow the photochemical and biochemical system to cope with negative changes in environment. (I. Yordanov; V. Velikova; T. Tsonev; Plant response to drought, acclimation, and stress tolerance; Photosyntetica 38(1); 171-186; 2000).

Response of Sugar beet genotypes to drought and nutrient deficiency stress included leaf RWC (relative water content), glycine betaine accumulation, alteration of shoot/root ratio and production off fibrous roots (B. Shaw, T. H. Thomas; D. T. Cooke; Responses of sugar beet (*Beta vulgaris* L.) to drought and nutrient deficiency stress; Plant Growth Regulation (37) 77-83, 2002)

Determining plant diseases in plant material is relatively time consuming as well as labour and cost intensive. Furthermore, typically only a small portion of the plant material is analysed to determine if plant diseases are present in the plant material. However, if only parts of the plant material are infected with plant diseases, such plant infections can be overlooked, resulting in unreliability of the detection of plant diseases.

It is a further object of the present invention to provide an improved method for detecting plant diseases in plant material, and/or to provide an improved analysis assembly for detecting plant diseases in plant material, and/or to provide an improved arrangement for detecting plant diseases in plant material, and/or to provide an improved control unit for controlling an analysis assembly and/or for receiving data from an analysis assembly. In particular, it is an object of the present invention to provide a solution for reliable and automated detection of plant diseases in plant material.

According to a first aspect, it is provided a method for analyzing a crop sample comprising a target plant material with soil tare adhered thereto, comprising receiving a crop sample comprising target plant material adhered with soil tare, emitting electromagnetic waves towards the crop sample comprising target plant material adhered with soil tare, receiving electromagnetic waves reflected from the crop sample comprising target plant material adhered with soil tare, processing the received electromagnetic waves using an analysis assembly, determining a percentage by mass of the target plant material and/or a percentage by mass of the soil tare and/or components of the soil tare.

Preferably, the method steps are carried out in the listed order, in particular one after the other. However, it is also possible to carry out the method in an order that deviates from the listed order.

Herein, a crop sample comprising a target plant material with soil tare adhered thereto is used synonymously with a crop sample comprising target plant material adhered with soil tare. This is preferably understood as target plant material together with soil tare. Preferably, a crop sample comprising a target plant material with soil tare adhered thereto or comprising target plant material adhered with soil tare can be understood to be directly harvested plant material, in particular in the state in which it is delivered to the sugar production facility. In particular, a crop sample comprising a target plant material with soil tare adhered thereto or comprising target plant material adhered with soil tare can be understood as harvested plant material that is not completely cleaned. A crop sample comprising a target plant material with soil tare adhered thereto or comprising target plant material adhered with soil tare comprises target plant material and soil tare. Tare soil as used herein in particular refers to the presence of soil tare.

Soil tare is preferably understood to be material that is not wanted in the production process, for example in the sugar production process. Soil tare or unwanted material preferably comprises one or several of the following group: soil that adheres to the target plant material, solid lumps, leaf debris, weeds, loose soil, stones, and any other material that was picked up with the target plant material.

Target plant material can be root crops and/or tuber crops, in particular of the species *Beta vulgaris* and/or *Solanum tuberosum*. Target plant material is preferably understood to be the part or the parts of a plant material that is wanted for processing, for example for extraction of sugar, in a production process, in particular in a sugar production process the sugar beet plant without its leaves can be the target plant material. Plant material can for example be root crops and/or tuber crops, in particular of the species *Beta vulgaris* and/or *Solanum tuberosum*. Preferably, plant material comprises or is one or several of the following group: sugar beet, spinach beet, Swiss chard, beetroot, mangelwurzel, or potato. Herein, target material is understood to be target plant material.

Preferably, receiving a crop sample comprising target plant material adhered with soil tare is conducted by receiving a truckload of crop samples comprising target plant material adhered with soil tare and/or a container of crop samples comprising target plant material adhered with soil tare and/or a goods wagon of crop samples comprising target plant material adhered with soil tare. Preferably the spectroscopic analysis of the soil tare takes place in a receiving section of a sugar production facility.

Preferably, the electromagnetic waves that are emitted towards the crop sample comprising target plant material adhered with soil tare lie within the infrared spectrum, in particular in the near-infrared spectrum and/or in the visible spectrum and/or in the ultraviolet spectrum. Preferably, the electromagnetic waves have at least one wavelength, wherein the wavelength of the electromagnetic waves lies in the range of 170 nm to 1,000,000 nm, in particular in the range of 750 nm to 2,500 nm, preferably in the range of 780 nm to 1800 nm. Preferably, the spectral signal is converted by using spectroscopy, in particular near-infrared spectroscopy (NIRS), and/or mid-infrared spectroscopy, and/or far-infrared-spectroscopy, and/or terahertz-spectroscopy and/or ultraviolet-visible spectroscopy (UV-Vis) and/or Raman spectroscopy and/or laser-induced breakdown spectroscopy (LIBS) and/or images as well as hyperspectral images and/or combination of images and/or hyperspectral images with spectroscopy methods and/or combinations of different spectroscopic methods.

Preferably, the received electromagnetic waves are converted into a spectral signal, wherein the spectral signal is generated dependent on the received electromagnetic waves.

Preferably, the electromagnetic waves are reflected from the crop sample comprising target plant material adhered with soil tare and the reflected electromagnetic waves are received, in particular with a sensor that is adapted to receive electromagnetic waves. Preferably, the electromagnetic waves are reflected from the crop sample comprising target plant material adhered with soil tare, or a part thereof. The electromagnetic waves can also be, at least partly, emitted through the plant material and the electromagnetic waves can be received, in particular with a sensor that is adapted to receive electromagnetic waves. Preferably, the electromagnetic waves can be emitted through the plant material, or through a part thereof.

The analysis assembly is preferably adapted to process the spectral signal. Preferably, processing the received electromagnetic waves comprises the received electromagnetic waves being converted into a spectral signal, wherein the spectral signal is generated dependent on the received electromagnetic waves.

Preferably, the method comprises processing the spectral signal for determining a percentage by mass of the target plant material and/or for determining a percentage by mass of the soil tare.

The percentage by mass of the soil tare can preferably be predicted from the spectral signal, in particular from information in the spectral signal, in particular by taking into account calibration data.

Characteristics of the crop sample comprising target plant material adhered with soil tare can in particular be understood as any properties of the crop sample comprising target plant material adhered with soil tare. In particular, characteristics of the crop sample comprising target plant material adhered with soil tare can be understood to comprise the percentage by mass of the target plant material and/or the percentage by mass of the soil tare and/or components of the soil tare.

A first advantage is that the prediction of the percentage by mass of the soil tare can be relatively accurate so that the percentage by mass can be determined by using spectroscopy and preferably RGB (red, green and blue) images. The process for determining the percentage by mass can thus be automated, wherein less labour is needed for the determination of the percentage by mass.

In addition, in known processes for determining the percentage by mass of the soil tare laboratory and weighing equipment is necessary. It is an advantage of the method described herein that less equipment and less space is needed when compared to conventional methods for determining the percentage by mass of the soil tare.

Another advantage is that less water is needed for determining the percentage by mass of the soil tare when compared to conventional methods for determining the percentage by mass of the soil tare.

Another advantage is that with the method more reliable results can be obtained because human failure can be minimized due to less manual steps in the method described herein when compared to conventional methods.

Furthermore, it is an advantage that the method can be implemented in a sugar production process, in particular in a sugar production facility, without the need to stop the sugar production process. In particular, with the method it is possible to conduct the spectroscopic measurements and/or to take images on the crop sample comprising target plant material adhered with soil tare that is moved on a conveyor belt. Thus, the method can be carried out as a continuous process. Therefore, the method can save time and be more cost efficient when comparted to conventional methods.

Another advantage is that not only intermittent samples can be investigated with this method, as this can be the case for conventional methods, but it is also possible to continuously carry out the method and therefore analyse at least some or all parts of the delivered crop sample comprising target plant material adhered with soil tare which can result in more representative sampling. Thus, with the described method a more reliable and a more accurate determination of the percentage by mass of the soil tare can be achieved.

Preferably, the electromagnetic waves are reflected from the crop sample comprising target plant material adhered with soil tare that is arranged on a transport device, such as a conveyor belt, and the reflected electromagnetic waves are received, in particular with a sensor that is adapted to receive electromagnetic waves. Preferably, the electromagnetic waves are reflected continuously from the crop sample comprising target plant material adhered with soil tare.

Another advantage is that with the method it is possible to analyse the soil tare. The method can comprise processing the spectral signal for determining components of the soil tare. By determining components of the soil tare, valuable information regarding the soil tare can be obtained.

For example, it is possible to obtain information about macro and trace nutrients of the soil as part of the soil tare. Although a large number of elements are naturally available in the soil, 17 elements are currently known to be important for the proper growth and development of crop plants. While Nitrogen (N), Phosphorus (P), Potash (K), Calcium, Sulfur (S), and Magnesium (Mg) are known as macronutrients (required in comparatively larger amounts), Iron (Fe), Zinc (Zn), Copper (Cu), Boron (B), Manganese (Mn), Molybdenum (Mo), Chloride (CI), and others are the micronutrients (required in a smaller quantity) for the growth and development of crop plants. This information can be used to determine the soil quality in which the crop sample comprising target plant material adhered with soil tare was harvested. Based on this information further farming decisions regarding the field from which the plant material was harvested can be made. Soils can have inhomogeneous distribution of chemical, physical and biological soil properties. Therefore information on components in the soil can be particularly valuable.

According to a preferred embodiment, processing electromagnetic waves is conducted by using spectroscopy, in particular near-infrared spectroscopy, and preferably digital image analysis, in particular of RGB images, and/or hyperspectral imaging, for determining a percentage by mass of the target plant material and/or a percentage by mass of the soil tare.

In a preferred embodiment, near-infrared spectroscopy is used for determining a percentage by mass of the target plant material and/or a percentage by mass of the soil tare. In particular it is possible that by only using near-infrared spectroscopy the percentage by mass of the soil tare and/or the percentage by mass of the target material can be determined. However, it can be preferred that in addition further analysis methods are used.

Preferably, images, in particular RGB images, of the crop sample comprising target plant material adhered with soil tare are captured next to or behind a sensor head of a spectroscopy device, which is preferably a near-infrared spectroscopy device. Thus, the crop sample comprising target plant material adhered with soil tare can be analysed by using RGB images. Taking RGB images and carrying out analysis by using near-infrared spectroscopy can be carried out simultaneously.

Preferably, the crop sample comprising target plant material adhered with soil tare is illuminated with light to remove at least a part of, in particular the greatest amount of, shadows and a camera captures at least one image, preferably several images, of the crop sample comprising target plant material adhered with soil tare. The captured images can be filtered to provide the possibility to distinguish the target plant material from the soil tare. A filter can be set up to be trained to distinguish what is either target material or soil tare. Such a filter can also be set up to determine specific parts in the soil tare, such as for example sugar beet tops. Thus, it is also possible to determine the relative amount of specific parts in the soil tare.

Preferably, the percentage by mass of the soil tare and the percentage by mass of the target material add up to 100%. If the percentage by mass of the soil tare is known, the percentage by mass of the target material can be calculated and vice versa.

The net mass of the target material can be calculated from the percentage by mass of the target material and the mass of the crop sample comprising target plant material adhered with soil tare. It is also possible that the net mass of the target material can be calculated from the percentage by mass of the soil tare and the mass of the crop sample comprising target plant material adhered with soil tare.

Preferably, processing electromagnetic waves is conducted by using spectroscopy, in particular laser-induced breakdown spectroscopy (LIBS), and preferably at least one other analytical method, for determining components of the soil tare.

Preferably other analytical methods are at least one of the following group: spectroscopy, in particular near-infrared spectroscopy, digital image analysis, in particular of RGB images, or hyperspectral imaging.

Herein, determining components of the soil tare can in particular be understood as determining parameters of the soil tare, in particular chemical soil parameters.

Such chemical soil parameters preferably include the total contents of the main nutrients, such as for example potassium, magnesium, calcium, nitrogen and phosphorus, and/or the total contents of the trace nutrients such as for example iron and manganese, and/or the plant availability of these nutrients, and/or the humus content and/or the soil pH value.

Laser-induced breakdown spectroscopy (LIBS) can be understood as an optical emission spectroscopy technique, wherein preferably an intense pulse of laser radiation, typically of nanosecond duration, is focused onto the sample, where it ablates material from the surface and creates a micro-plasma. The plasma, in turn, excites atoms and atomic ions that emit radiation specific to the elemental composition of the sample. By use of certified reference material, the detected spectrum can be related to total concentrations of elements. The technique can thus be used for simultaneous multi-element analysis. In comparison to X-ray fluorescence (XRF), which also gains interest as method for rapid soil analysis, the whole range of elements, including the light elements, is accessible by LIBS. This allows the direct (in situ) analysis of macro and trace nutrients because no or only minimal sample preparation is necessary.

For example in a sugar production facility, a LIBS system can be set up on a conveyor belt behind a chopper that chops the delivered sugar beets into sugar beet pieces, so that the chopped sugar beet are analysed using LIBS. The spectral data processing can be done as described in the following example: First, all spectra of a plot are filtered to eliminate spectra without information content. The filter wavelength was set to the Ha line at 656.6 nm. All spectra below a threshold of 1500 counts were removed. The remaining spectra of each plot were averaged to become the mean plot spectrum. In a second step, plots where the mean plot spectrum contained less than 110 individual spectra were removed, to avoid non-representative plots in the data set. In a third step, the plot mean spectra are background corrected and normalized (to background, Ha, N/O line, depending on the analyte). In a fourth step, the wavelength range is selected according to the analyte. In a fifth step, outlier inspection and removal is conducted. And in a sixth step, the data is split into calibration and validation.

As specific parameters for the fiber LIBS system, for example the following values can be used:

| Parameter | Value |
|---|---|
| Grating | 600 lines/mm |
| Slit | 25 μm |
| Wavelength range | 485.0-1020.5 nm |
| Dispersion/Pixel | 0.26 nm |
| Spectral resolution | Approx. 0.7 nm |
| Pixel | 2048 |
| Pixel distance | 14 μm |
| Pixel height | 200 μm |
| Pixel width | 14 μm |

As specific parameters for the laser of the LIBS system, for example the following values can be used:

| Laser | Microchip Laser | High Power Laser |
|---|---|---|
| Pulse energy | 3 mJ | 14 mJ |
| Pulse duration | 2 ns | 10 ns |
| Pulse peak power | 1.5 MW | 1.4 MW |
| Repetition frequency | 100 Hz | 100 Hz |
| Measurement spot | <100 μm | <200 μm |
| Focal length of focusing mirror | 101.6 mm | 203.2 mm |
| Fiber diameter | 900 μm | 400 μm |

It is preferred if the LIBS system comprises a high power laser.

In this example, by application of a high power laser the analytical performance of the system could be increased. However, the high power LIBS system can have the additional following advantages: A first advantage is that better practical implementation can be achieved, because the distance to the sample can be larger, which makes the system easier to be implemented and to be installed and additionally reduces the contamination of the window next to the laser. Another advantage is that it is possible to achieve a two times larger measurement spot and an about 4.5 times higher pulse energy when compared to a non-high power LIBS system. Another advantage is that more light can reach the detector, which opens the door for using several detectors to e.g. expand the wavelength range coverage. In particular, it is possible with such a high power LIBS system to determine potassium (K) and sodium (Na).

Apart from the intensity in the spectrum, the higher pulse power and the larger measurement spot can lead to a higher amount of measured spectra per plot when compared with an application of fiber laser. With high power LIBS the average spectra per plot can be more than two times higher when compared with fiber laser. This means that more material per plot can be measured (increased sample cross-section), which can be advantageous, in particular in case of heterogeneous material such as a crop sample comprising target plant material adhered with soil tare.

In an example, for the determination of potassium, the spectra were normalized on the Ha line at 565.5 nm and the range limited to 764 to 772 nm for determining potassium. The noise was lower in the high power spectra, although the signal heights were at the same level due to the normalization. Stated in numbers the signal-to-noise ratio was about 8 times better for the high power LIBS. Therefore it can be preferred to use high power LIBS.

In an example for the determination of sodium, the spectra were normalized on the Ha line at 565.5 nm and the range was limited to 586 to 591 nm, to the sodium emission line. The noise was lower in the high power spectra. For sodium, the signal-to-noise ratio was about two times better for the high power LIBS. In the calibration as well in the cross-validation, the high power LIBS can perform about 20% better than the fiber LIBS. The High Power LIBS can for example reach an $R^2$ of 0.83 and a root mean square error (RMSE) of 0.38 mmol/100 g sugar beet.

The results of this example show exemplarily for sodium and potassium, that LIBS is well suited for analysis of chemical soil parameters in the soil tare, in particular for analysis of contents of main nutrients, such as potassium, magnesium, calcium, nitrogen and phosphorus, and preferably for analysis of total contents of trace nutrients such as iron and manganese. With such a direct analysis of specific macro- and micro-nutrients in the soil tare, in particular in the soil, it is possible to determine parameters of the soil tare in the growing areas.

According to a preferred embodiment, the method comprises generating first calibration data, comprising taking a sample of the crop sample comprising target plant material adhered with soil tare and dividing the sample into a first sample and a second sample, preferably chopping the target plant material adhered with soil tare of the first sample, and/or preferably moving the first sample along a sensor that is adapted to receive electromagnetic waves and/or along a camera that is adapted to receive electromagnetic waves, analysis of the first sample by, preferably continuously, emitting electromagnetic waves towards the first sample, receiving electromagnetic waves reflected from the first sample, and preferably processing the received electromagnetic waves, generating a reference analysis of the second sample by determining a first mass of the second sample, removing at least a part of the soil tare from the second sample and subsequently determining a second mass of the second sample, and calculating the percentage by mass of the soil tare with respect to the first mass of the second sample by using the first mass of the second sample and the second mass of the second sample, and/or the percentage by mass of the soil tare with respect to the mass of the target plant material by using the first mass of the second sample and the second mass of the second sample, and comparing the results of the analysis of the first sample with the results of the reference analysis of the second sample.

Removing at least a part of the soil tare comprises removing preferably at least 95 wt. %, in particular at least 98 wt. %, particularly preferred at least 99 wt. % of the soil tare from the crop sample comprising target plant material adhered with soil tare.

The sample of the crop sample comprising target plant material adhered with soil tare can be a sample of sugar beet pieces. The sample of the crop sample comprising target plant material adhered with soil tare can for example comprise 10 kg or 20 kg or 30 kg of the crop sample comprising target plant material adhered with soil tare, which preferably comprises sugar beets and/or sugar beet pieces. Other amounts of the crop sample comprising target plant material adhered with soil tare can also be used. Preferably, receiving electromagnetic waves can be understood as receiving electromagnetic waves that are reflected from the sample. Reference analysis can comprise at least one or several measurements. Preferably, by comparing the results obtained from the spectroscopic analysis with the results obtained from the reference analysis, calibration data can be generated.

Preferably, the spectroscopic analysis is carried out continuously. Preferably, first calibration data is generated by repeatedly taking samples, conducting spectroscopic analyses of the samples. Preferably, calibration data is generated by repeatedly comparing results of spectroscopic analyses with results from reference analyses. It is preferred if this procedure is repeated several times, in particular more than 100 times, preferably more than 1000 times. Preferably, this procedure conducted on the crop sample comprising target plant material adhered with soil tare with different components, preferably on a relatively wet crop sample comprising target plant material adhered with soil tare, on a relatively dry crop sample comprising target plant material adhered with soil tare, on a crop sample comprising target plant material adhered with soil tare with a relatively high percentage by mass of soil tare, on a crop sample comprising target plant material adhered with soil tare with a relatively low percentage by mass of soil tare.

Preferably, first calibration data is generated over a time period of at least several days, in particular of at least several weeks and/or of at least several months and/or of several years.

Generating first calibration data can also be carried out in a static process, wherein the sample of the crop sample comprising target plant material adhered with soil tare is not moved along a sensor. Preferably, within such a static process, the sample is located at a defined position, in particular under a sensor that is adapted to receive electromagnetic waves.

An advantage of generating first calibration data in the described way is that the calibration data can be used for reliably determining percentage by mass of the soil tare.

From filtered images, which can be generated by using a camera, a calibration can be carried out that can provide the predicted amount of soil tare in the crop sample comprising target plant material adhered with soil tare. To develop such a calibration, preferably the sample can be split into two parts, so that a comparison can be made between target material and the crop sample comprising target plant material adhered with soil tare.

Preferably, in order to develop, optimise and validate a calibration model for a qualitative NIRS procedure used for identification or qualification, sets of samples are required: the calibration set (i.e. the group of samples that are used to build the model parameters), the cross-validation set (i.e. samples temporarily excluded from model development but still ultimately involved in the development of the model), and the independent validation set (i.e. samples that have no input into the development of the model). It is preferred if the validation set of samples (for external validation) is completely independent of the calibration set. A comparison of results can be obtained by analysis of the same set of samples by the NIRS procedure and the reference method forms part of the validation of NIRS, along with independently determined parameters, such as intermediate precision.

In a preferred embodiment, generating first calibration data further comprises one or several of the following steps: converting the received electromagnetic waves into a spectral signal, in particular by using near-infrared spectroscopy (NIRS), and/or into at least one digital image, preferably several digital images, in particular RGB images and/or hyperspectral imaging, and/or pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out, and/or pre-processing the at least one digital image using a filter, wherein preferably the filter is arranged for using at least one colour threshold to distinguish between target plant material and soil tare, and/or removing spectral signals that are not converted from electromagnetic waves that are reflected from the first sample, preferably by differentiating the spectral signals using classification and/or filtering, in particular using mathematical filtering methods, and/or averaging spectral signals to one spectral signal, and/or carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks.

Preferably, the spectral signal is converted by using spectroscopy, in particular near-infrared spectroscopy (NIRS). In particular, a combination of different spectroscopy methods as well in combination with hyperspectral images and/or RGB images can be used, wherein preferably the spectral signals converted by using different spectroscopy methods or different methods can be combined.

Preferably, the method comprises generating second calibration data, comprising taking a sample of the crop sample comprising target plant material adhered with soil tare, preferably a determined amount, for example 10 kg, preferably chopping the target plant material adhered with soil tare, and preferably moving the sample along a sensor that is adapted to receive electromagnetic waves, spectroscopic analysis of the sample by, preferably continuously, emitting electromagnetic waves towards the sample, receiving electromagnetic waves, and converting the received electromagnetic waves into a spectral signal, in particular by using laser-induced breakdown spectroscopy (LIBS) and preferably at least one other analytical method, reference analysis of the soil tare by conducting measurements, such as polarimetry, flame photometry, fluorometric o-5 phthalaldehyde (OPA) method, copper method, immobilized enzyme biosensor method, oven method, atomic absorption spectrometry (AAS), X-ray fluorescence spectroscopy (XRFS), inductively coupled plasma-atomic emission spectrometry (ICP-AES), and/or others, comparing the results of the spectroscopic analysis with the results of the reference analysis, wherein preferably generating second calibration data further comprises one or several of the following steps: pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out, and/or removing spectral signals that are not converted from electromagnetic waves that are reflected from the crop sample comprising target plant material adhered with soil tare, preferably by differentiating the spectral signals using classification and/or filtering, in particular using mathematical filtering methods, and/or averaging spectral signals to one spectral signal, and/or carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks.

Preferably the spectroscopic analysis is carried out continuously. Preferably, the second calibration data is generated by repeatedly taking samples, conducting spectroscopic analyses of the samples. Preferably, calibration data is generated by repeatedly comparing results of spectroscopic analyses with results from reference analyses. It is preferred if this procedure is repeated several times, in particular more than 100 times, preferably more than 1000 times. Preferably, this procedure conducted on the crop sample comprising target plant material adhered with soil tare with different components, preferably on a relatively wet crop sample comprising target plant material adhered with soil tare, on a relatively dry crop sample comprising target plant material adhered with soil tare, on a crop sample comprising target plant material adhered with soil tare with a relatively high percentage by mass of soil tare, on a crop sample comprising target plant material adhered with soil tare with a relatively low percentage by mass of soil tare.

Preferably, second calibration data is generated over a time period of at least several days, in particular of at least several weeks and/or of at least several months and/or of several years.

Generating second calibration data can also be carried out in a static process, wherein the sample of the crop sample comprising target plant material adhered with soil tare is not moved along a sensor. Preferably, within such a static process, the sample is located at a defined position, in particular under a sensor that is adapted to receive electromagnetic waves.

An advantage of generating second calibration data in the described way is that the calibration data can be used for reliably determining components of the soil tare.

Preferably, by combining LIBS with further analytical methods a detailed soil analysis can be carried out, comprising analysing soil density and/or soil texture and/or soil pH value and/or quality of fertilizers and/or humification of soil and/or soil fertility.

According to a preferred embodiment, the method comprises comparing data derived from processing the electromagnetic waves with the first calibration data and dependent on the comparison determine the percentage by mass of the target plant material and/or the percentage by mass of the soil tare, and/or processing the electromagnetic waves by spectroscopic analysis and comparing data derived therefrom with the second calibration data and dependent on the comparison determine components of the soil tare.

With the described method preferably both determination of percentage by mass of the soil tare and determination of components of the soil tare can be achieved.

According to a further preferred embodiment, the method comprises chopping the crop sample comprising target plant material adhered with soil tare.

To determine the percentage by mass of the soil tare, it is preferred that the crop sample comprising target plant material adhered with soil tare is chopped before emitting electromagnetic waves towards the crop sample comprising target plant material adhered with soil tare.

An advantage of conducting spectroscopy on a chopped crop sample comprising target plant material adhered with soil tare is that the results obtained are more reliable due to a better homogeneity of the target material and the soil tare.

For example, an analysis of soil tare on a whole sugar beet with different sensors can lead to high errors in precision, because sensors are typically working in one dimension and soil usually adheres unevenly to a sugar beet surface. Due to chopping the crop sample comprising target plant material adhered with soil tare, both soil tare and target plant material can be equally distributed within a sample.

Preferably, the method comprises homogeneously distributing the crop sample comprising target plant material adhered with soil tare onto the transport device, preferably with a roller that is arranged above the transport device, moving the crop sample comprising target plant material adhered with soil tare along a sensor that is adapted to receive electromagnetic waves and/or along a camera that is adapted to receive electromagnetic waves, wherein preferably moving the crop sample comprising target plant material adhered with soil tare is conducted using a transport device, preferably a conveyor belt, preferably with a transport velocity within a range of 0.05 m/s to 20 m/s, in particular 0.05 m/s to 10 10 m/s, preferably 0.5 m/s to 5 m/s.

According to a further preferred embodiment, processing the received electromagnetic waves comprises converting the received electromagnetic waves into a spectral signal, and/or converting the received electromagnetic waves into at least one digital image, preferably several digital images, in particular RGB images.

Preferably, with a combination of one or several spectral signals and one or several digital images the percentage by mass of the soil tare and components of the soil tare can be determined.

According to a further preferred embodiment, the method comprises illuminating the crop sample comprising target plant material adhered with soil tare to reduce and/or minimize shadows, and/or filtering the at least one digital image, wherein the filter is adapted to distinguish between target plant material and soil tare, preferably by using at least one colour threshold.

Preferably, a light source is used to illuminate the crop sample comprising target plant material adhered with soil tare. By illuminating the crop sample comprising target plant material adhered with soil tare, shadows can be removed and/or minimised.

It is preferred if a filter is applied to the digital image or the digital images. Preferably, by applying such a filter it is possible to distinguish between target material and soil tare. Such a filter can for example comprise a threshold.

In a further preferred embodiment, emitting electromagnetic waves towards the crop sample comprising target plant material adhered with soil tare is conducted continuously and/or while the crop sample comprising target plant material adhered with soil tare are moving along the sensor and/or along the camera, and/or receiving electromagnetic waves reflected from the crop sample comprising target plant material adhered with soil tare is conducted continuously and/or while the crop sample comprising target plant material adhered with soil tare is moving along the sensor and/or along the camera.

Preferably, the method described herein is conducted continuously. The spectroscopic analysis can be carried out on the crop sample comprising target plant material adhered with soil tare, in particular on the chopped crop sample comprising target plant material adhered with soil tare, that is moved along an analysis assembly that comprises a spectroscopic device for carrying out spectroscopic analysis. The spectroscopic analysis can be adapted to the moving speed of the crop sample comprising target plant material adhered with soil tare relative to the spectroscopic device. Preferably, the analysis assembly comprises at least one additional analysis device such as a camera for capturing images of the moving crop sample comprising target plant material adhered with soil tare.

It is preferred that the wavelength of the electromagnetic waves lies in the infrared spectrum, preferably in the near-infrared spectrum, and/or in the microwave region and/or in the visible spectrum, and/or in the ultraviolet spectrum, and/or that the spectral signal is converted by using spectroscopy, in particular near-infrared spectroscopy (NIRS), mid-infrared-spectroscopy, far-infrared spectroscopy, terahertz-spectroscopy and/or ultraviolet-visible spectroscopy (UV-Vis) and/or Raman spectroscopy and/or laser-induced breakdown spectroscopy (LIBS), and/or fluorescence spectroscopy and/or hyperspectral imaging, and/or nuclear magnetic resonance and/or a combination of hyperspectral imaging with different spectroscopic approaches and/or combinations of different spectroscopic methods, and/or that receiving electromagnetic waves is conducted using a camera and/or using a combination of a camera with one or several spectroscopy methods, in particular a combination of RGB camera with near-infrared spectroscopy and/or hyperspectral imaging.

Preferably, the infrared spectrum comprises wavelengths in a range from 750 nm to 1,000,000 nm. Preferably, the near-infrared spectrum comprises wavelengths in a range from 750 nm to 2,500 nm. Preferably, the visible spectrum comprises wavelengths in a range from 400 nm to 750 nm. Further preferably, the wavelength of the electromagnetic waves lies in the ultraviolet spectrum, wherein preferably, the ultraviolet spectrum comprises wavelengths in a range from 10 nm to 400 nm.

Preferably, the spectral signal is converted by using spectroscopy, in particular near-infrared spectroscopy (NIRS), and/or mid infrared spectroscopy and/or far infrared spectroscopy and/or ultraviolet-visible spectroscopy (UV-Vis) and/or Raman spectroscopy and/or laser-induced breakdown spectroscopy (LIBS). In particular a combination of different spectroscopy methods as well in combination with hyperspectral images can be used. Preferably, nuclear magnetic resonance may be also used in combination with any of the above-mentioned spectroscopic methods.

In a further preferred embodiment, the method is performed as a continuous process, preferably by emitting electromagnetic waves and/or receiving electromagnetic waves and/or converting the received electromagnetic waves into a spectral signal in intervals of less than 100 ms, in particular of less than 50 ms, preferably in intervals of 10 ms, 20 ms, 30 ms or 40 ms, and/or by emitting electromagnetic waves and/or receiving electromagnetic waves and/or converting the received electromagnetic waves into a spectral signal repeatedly for at least 2 seconds, preferably at least 10 seconds, more preferably at least 20 seconds, more preferably at least 10 minutes, in particular at least 1 hour.

Preferably, the intervals are chosen in such a way that optimal results are obtained. In particular the intervals can be chosen dependent on the moving speed of the crop sample comprising target plant material adhered with soil tare relative to the sensor.

In particular it is preferred if the measurement cycle is in the range of 10-20 seconds. Other measurement cycles can be preferred depending on other parameters in order to obtain optimal results.

Preferably, the species of the target plant material is a root crop and/or a tuber crop, in particular *Beta vulgaris* and/or *Solanum tuberosum*, or at least a part thereof, and/or wherein the target plant material comprises or consists of sugar beets.

The target plant material can be a part of root crops and/or tuber crops, in particular of the species *Beta vulgaris* and/or *Solanum tuberosum*. Preferably, the target plant material comprises or is one or several of the following group: sugar beet, spinach beet, Swiss chard, beetroot, mangelwurzel, potato.

In a further preferred embodiment, the method comprises processing the spectral signal for determining components in the soil tare, and/or comparing the spectral signal with the second calibration data and dependent on the comparison determine, preferably quantitatively, an amount and/or mass and/or mass fraction and/or volume fraction of components in the soil tare.

Preferably, the different components and the relative amount of the components in the soil tare can be determined by using the spectral signal and the second calibration data.

According to a further preferred embodiment, the components in the soil tare comprise one or several of the following group: minerals, in particular potassium, sodium, magnesium, calcium, nitrogen, phosphorus, trace nutrients, for example iron and/or manganese, humus content, soil pH value, nitrogen containing compounds, organic matter, carbohydrates, starch, aromatics, fatty acids, leaves, root tips, topped beets, pieces of beets, weed, soil density, soil texture quality of at least one fertilizer, humification, soil fertility.

Preferably, different components in the soil tare can be identified and analysed. In particular with the method described herein it is possible to determine components of interest. In particular by determining components information about the soil that is part of the soil tare can be obtained.

Obtaining information about the soil, such as for example humus content, soil pH value, potassium, sodium, magnesium, calcium, nitrogen, phosphorus, trace nutrients, and others can be valuable in order to analyse the conditions of the soil in the field from which the plant material was harvested. With such information about the soil it is possible to improve growing conditions in the fields and/or treat the fields in such a way that the growing conditions are improved. In addition, such information can be provided to the sugar factories, which thus receive information on the growing area of the beet and the quality that can be expected from it.

Preferably, the method comprises changing at least one breeding parameter and/or fertilizer application dependent on the amount of at least one of the determined components in the soil tare.

Preferably, with the information obtained regarding the components in the soil tare, a suitable fertilizer application for the field from which the plant material was harvested can be determined in order to optimize the growing conditions in the field.

It can also be possible to change breeding parameters dependent on the determined components in the soil tare in order to optimize breeding conditions in a field.

According to a further aspect, it is provided a method for generating first calibration data for analyzing a crop sample comprising a target plant material with soil tare adhered thereto, comprising taking a sample of the crop sample comprising target plant material adhered with soil tare, comprising target plant material and soil tare, and dividing the sample into a first sample and a second sample, preferably chopping the target plant material adhered with soil tare of the first sample, and/or preferably moving the first sample along a sensor that is adapted to receive electromagnetic waves and/or along a camera that is adapted to receive electromagnetic waves, analysis of the first sample by, preferably continuously, emitting electromagnetic waves towards the first sample, receiving electromagnetic waves reflected from the first sample, and preferably processing the received electromagnetic waves, creating a reference analysis of the second sample by determining a first mass of the second sample, removing at least a part of the soil tare from the second sample and subsequently determining a second mass of the second sample, and calculating the percentage by mass of the soil tare with respect to the first mass of the second sample by using the first mass of the second sample and the second mass of the second sample, and/or the percentage by mass of the soil tare with respect to the mass of the target plant material by using the first mass of the second sample and the second mass of the second sample, comparing the results of the analysis of the first sample with the results of the reference analysis of the second sample.

It is preferred that the method comprises converting the received electromagnetic waves into a spectral signal, and/or into at least one digital image, preferably several digital images, in particular RGB images, and/or pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out, and/or pre-processing the at least one digital image using a filter, wherein preferably the filter is arranged for using at least one colour threshold to distinguish between target plant material and soil tare, and/or removing spectral signals that are not converted from electromagnetic waves that are reflected from the first sample, preferably by differentiating the spectral signals using classification and/or filtering, in particular using mathematical filtering methods, and/or averaging spectral signals to one spectral signal, and/or carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks.

According to a further aspect, it is provided an analysis assembly for analyzing a crop sample comprising a target plant material with soil tare adhered thereto, wherein the analysis assembly is arranged to emit electromagnetic waves towards the crop sample comprising target plant material adhered with soil tare, wherein the analysis assembly is arranged to receive electromagnetic waves reflected from the crop sample comprising target plant material adhered with soil tare, wherein the analysis assembly is arranged to convert received reflected electromagnetic waves into a spectral signal and/or into digital images, preferably RGB images, wherein the analysis assembly is arranged to process the spectral signal and/or the digital images for determining the percentage by mass of the target plant material and/or the percentage by mass of the unwanted plant material and/or components in the unwanted plant material.

Preferably, the analysis assembly comprises a spectroscopic device, in particular a near-infrared spectroscopic device. It can be preferable if the analysis assembly comprises a camera for taking images, in particular RGB images.

Such an analysis assembly can preferably be mounted at a desired position. In particular, the analysis assembly can designed in such a way that it can be moved to another position.

According to a further aspect, it is provided an arrangement for analyzing a crop sample comprising a target plant material with soil tare adhered thereto, the arrangement comprising a receiving section, preferably of a production facility, in particular a sugar production facility, for receiving the crop sample comprising target plant material adhered with soil tare, in particular soiled sugar beets, comprising target plant material and soil tare, a chopping device for chopping the crop sample comprising target plant material adhered with soil tare into pieces, an analysis assembly according to the preceding claim, wherein preferably the analysis assembly is arranged above a transport device on which pieces of the crop sample comprising target plant material adhered with soil tare are moved relative to the analysis assembly.

According to a further aspect, it is provided a sugar production facility comprising an arrangement as described herein.

Sugar production is preferably conducted in such a sugar production facility. In particular, a sugar production facility is understood to be a sugar factory or a sugar beet-processing factory.

Preferably, the sugar production facility is adapted to process at least 500 tons of sugar beets per day, or at least 1,000 tons of sugar beets per day, preferably at least 5,000 tons of sugar beets per day, in particular at least 10,000 tons of sugar beets per day. The sugar beets can comprise several tons of sugar beets. Preferably, the sugar beets are delivered to the sugar production facility by truck or train. Preferably, the plurality of sugar beets can be provided from a receiving station and/or a storage station.

Preferably, sugar is produced in the sugar production facility. Preferably, producing sugar comprises slicing sugar beets into sliced sugar beets, and preferably producing a raw juice from the sliced sugar beets, comprising extracting sugar the sliced sugar beets in an extraction process, wherein the sliced sugar beets are arranged in hot water and the hot water flows in opposite direction to a direction in which the sliced sugar beets are transported, wherein sugar is removed from the sliced sugar beets into the hot water and the raw juice is made from the hot water containing the extracted sugar. Preferably, the raw juice contains about 98 wt. % of the sugar contained in the sugar beets and organic and inorganic constituents that can be referred to as non-sugars from the sugar beets.

According to a further aspect, it is provided a use of an analysis assembly in a sugar production facility as described herein for analyzing a crop sample comprising a target plant material with soil tare adhered thereto.

As to the advantages, preferred embodiments and details of the individual different aspects and their preferred embodiments, reference is also made to the corresponding advantages, preferred embodiments and details described with reference to the respective other aspects.

Further advantageous embodiments result from the combination of individual, several or all of the preferred features described herein.

According to a further aspect, it is provided a method for determining components in industrial processing of sugar beets in a production facility, comprising providing a plurality of sugar beets including a production portion of sugar beets for production and an analysis portion of sugar beets for component analysis and possibly for production, analysing at least the analysis portion and possibly the production portion, wherein analysing comprises emitting electromagnetic waves towards at least the analysis portion and possibly the production portion, receiving electromagnetic waves, converting the received electromagnetic waves into a spectral signal, producing a product from at least the production portion and possibly from the analysis portion.

Sugar production is preferably conducted in a sugar production facility. In particular, a sugar production facility is understood to be a sugar factory or a sugar beet-processing factory. Preferably, the sugar production facility is adapted to process at least 500 tons of sugar beets per day, or at least 1,000 tons of sugar beets per day, preferably at least 5,000 tons of sugar beets per day, in particular at least 10,000 tons of sugar beets per day. The plurality of sugar beets can comprise several tons of sugar beets. Preferably, the plurality of sugar beets is delivered to the sugar production facility by truck or train. Preferably, the plurality of sugar beets can be provided from a receiving station and/or a storage station.

The plurality of sugar beets comprises a production portion of sugar beets for sugar production and an analysis portion of sugar beets for component analysis. The production portion is preferably at least 99 wt. %, in particular at least 99.9 wt. % or 99.999 wt. %, of the plurality of sugar beets. The production portion can be 100 wt. % of the plurality of sugar beets. In the sugar production process, sugar is extracted from the production portion.

The analysis portion can be a part of the production portion or, at least partly or fully, identical with the production portion. The analysis portion can be a part of the plurality of sugar beets that is not part of the production portion. The analysis portion of sugar beets can also be partly part of the production portion and/or partly part of the plurality of sugar beets that is not part of the production portion. In particular, the analysis portion is, at least primarily, used for component analysis, wherein preferably several components can be determined. Further, also the analysis portion can be used for sugar production. The analysis portion can be chosen randomly or selectively. Preferably, the analysis portion can be selected continuously by a sample provider from the production portion.

The analyses as described herein can be performed on the full analysis portion or on at least a part of the analysis portion. In particular, in case several analyses are performed, each of the analyses can be performed on the whole or a part of the analysis portion. For example, different or overlapping or identical parts of the analysis portion can be used for different analyses. Therefore, any reference herein to the analysis portion can also be understood as a reference to at least a part of the analysis portion.

The components in sugar beets can be one or several of the following group: total sugar content, content of monosaccharides as glucose; fructose; galactose; content of disaccharides as sucrose, lactose, maltose; content of Oligosaccharides as raffinose, maltodextrin, cellodextrin; content of polysaccharides as inulins, fructans; extraction efficiency of sugar; dry matter content, crude protein, crude fiber, amino acids, starch, total sugar content, recoverable sugar content, soluble nitrogen compounds as proteins, betaine, betalaine, amides and amino acids; insoluble nitrogen compounds as unsoluble proteins; nitrogen free organic substances as pectins, saponins, organic acids; marc content; fat content; content of alcohols; phenolic compounds, content of structural carbohydrates as NDF (Neutral Detergent Fiber); ADF (Acid Detergent Fiber); AOL (Acid Detergent Lignin) or content of Hemicellulose; cellulose; Lignin; ash content; content of alkali metal elements and its inorganic compounds as sodium; sodium chloride; content of metal elements und inorganic compounds as calcium; calcium carbonate, magnesium, magnesium oxide; content of metalloid elements and inorganic compounds as boron, borate minerals, selenium, silicon; content of nonmetal elements and inorganic compounds as carbon, carbonates, phosphorus, phosphates; sulfur, iodine.

As will be described in more detail below, the production portion and/or the analysis portion can be provided in sugar beet pieces by chopping and/or slicing. After providing the production portion and/or the analysis portion in sugar beet pieces, the production portion consisting of sugar beet pieces is still referred to as production portion and the analysis portion consisting of sugar beet pieces is still referred to as analysis portion. The analysis portion and the production portion can be chopped and/or sliced into sugar beet pieces using the same device, e.g. a slicing device, or different devices, e.g. a slicing device and a chopping device.

Preferably, the electromagnetic waves that are emitted towards at least the analysis portion and possibly the production portion lie within the infrared spectrum, in particular in the near-infrared spectrum and/or in the visible spectrum and/or in the ultraviolet spectrum. Preferably, the electromagnetic waves have at least one wavelength, wherein the wavelength of the electromagnetic waves lies in the range of 170 nm to 1,000,000 nm, in particular in the range of 750 nm to 2,500 nm, preferably in the range of 780 nm to 1800 nm. Preferably, the spectral signal is converted by using spectroscopy, in particular near-infrared spectroscopy (NIRS), and/or mid-infrared-spectroscopy, and/or far-infrared-spectroscopy and/or ultraviolet-visible spectroscopy (UV-Vis) and/or Raman spectroscopy and/or laser-induced breakdown spectroscopy (LIBS).

Preferably, the electromagnetic waves are reflected from at least the analysis portion that is arranged on the transport device and the reflected electromagnetic waves are received, in particular with a sensor that is adapted to receive electromagnetic waves. Preferably, the electromagnetic waves are reflected continuously from the analysis portion and the production portion. Preferably, the received electromagnetic waves are reflected by the analysis portion and possibly the production portion.

Preferably, the received electromagnetic waves are converted into a spectral signal, wherein the spectral signal is generated dependent on the received electromagnetic waves.

Preferably, producing sugar comprises producing a raw juice from at least the production portion and possibly from the analysis portion, comprising extracting sugar from at least the production portion in an extraction process, wherein at least the production portion is arranged in hot water and the hot water flows in opposite direction to a direction in which at least the production portion is transported, wherein sugar is removed from at least the production portion into the hot water and the rawjuice is made from the hot water containing the extracted sugar. Preferably, the rawjuice contains about 98 wt. % of the sugar contained in the production portion and organic and inorganic constituents that can be referred to as non-sugars from the sugar beets.

The method steps can be carried out in an order that deviates from the listed order. However, it is preferred if the method steps are carried out in the listed order, in particular one after the other.

The solution described herein has the advantage that analyzing sugar beets in a sugar production process can be automated by using spectral signals. The solution results in a determination of components in sugar beets that is less labour and cost intensive as well as less time consuming. Determining components in sugar beets can be done simultaneously with the sugar production process. It is particularly advantageous that components can be determined without delay. With a solution described herein a real-time determination of components can be achieved.

Furthermore, the solution described herein has the advantage that the sugar production process can be improved, and in particular made more efficient, because from the information of the spectral signals sugar production parameters can be adjusted, dependent on the components of the sugar beet pieces that are currently in the sugar production process or that are introduced into the sugar production process. With the information derived from the spectral signals, improved (and real-time) analysis data can be available, with which it is possible to adjust sugar production parameters more accurately for an improved sugar production process.

Typically, the extraction of sucrose from beet pulp is one of the most important processes of a sugar production process. It can for example determine the loss of sucrose in sugar beet pieces, molasses, energy cost and raw juice quality. Usually for determining components in sugar beets for sugar production and for sugar beets processed at a sugar production facility, typically a small amount of sliced beets and/or dried pulp, particular on sugar beet pieces in form of slices are analysed. The slices and/or dried pulp are mashed to a homogeneous sugar beet pulp by a cutter mill. The sugar beet pulp is extracted by Aluminium sulfate or lead acetate solution or water, and then analysed by conducting measurements, such as polarimetry, flame photometry, fluorometric o-phthalaldehyde (OPA) method, copper method, and immobilized enzyme biosensor method or others. The slices of fresh sugar beets and/or dried pulp can be analysed for sugar content, dry matter, marc content to evaluate the right extraction conditions (temperature, time, pressure). Raw juice can comprise beside sugar non-sugars such as water, pectin, proteins, and pigments and other components. Raw juice sugar is preferably further purified. Preferably, an important stage of sugar production can be refining of raw juice, wherein juice purity can directly be related to removing non-sugar material. The extraction process itself can have a great effect on the composition of the raw juice. The purity of clarified juice can be higher than that of the raw juice, an increase in purity and a corresponding decrease in non-sugars in clarified juice can indicate that during clarification process it has been ensured that the non-sugars are removed or greatly decreased when the precipitation and absorbing agents are used. Preferably, the evaporation and crystallization processes can reduce the concentration of non-sugars and increase the purity of syrup and molasses. Preferably, the knowledge about all sugar beet quality parameters including sugars and all non-sugar components allows to ensure the adjustment of all processing and juice purification steps in sugar production facility.

Therefore, a further advantage of the solution described herein is that a method is developed for a real-time quality testing for determining components in sugar beets for sugar production, an arrangement for determining components in sugar beets for sugar production, and a sugar production facility. Further, the invention allows for the use of an application of Process Analytical Technology (PAT) equipment in a sugar production facility and/or an arrangement from off-line to real-time quality testing for determining components in sugar beets for sugar production in a sugar production facility and/or a method for determining components in sugar beets for sugar production in a sugar production facility. With the solution described herein, new quality aspects of sugar beets can be determined, and production processes can be adjusted and/or regulated to increase the process efficiency in a sugar production facility.

A further advantage is that a significantly larger quantity of the sugar beets that are received at a sugar production facility can be analysed and that determining components in sugar beets for sugar beet production can be conducted on a significantly larger amount of sugar beets compared to the use of existing analysis methods used for analysing sugar beets that are determined for sugar production, for example for quality control.

The solution described herein overcomes the disadvantages of existing solutions, where only a very small amount of the sugar beets is analysed and determining components in sugar beets for sugar production is only conducted on a very small amount of the sugar beets in a sugar beet production process.

A further advantage is that in the solution described herein all parts of the sugar beets can be analysed, as the sugar beets are chopped into sugar beet pieces before component analysis. This can lead to a higher accuracy of determining components, when compared to component analysis by analysing sugar beet pulp, as the concentration and the content of components in sugar beets are irregularly distributed within a single sugar beet and between different sugar beets.

A further advantage of the solution described herein lies in the fact that in sugar production facilities typically only polarization and/or sugar content of the sugar beets is analysed. This information is used to estimate the quality of the sugar beets and farmers receive a payment dependent on the estimated quality. However, these analyses are based on very few parameters, such as Sodium, Potassium, alpha-amino-N, sugar content, and do not sufficiently reflect the chemical complexity of a sugar beet and how well the sugar can be extracted from the sugar beet. With the solution described herein, an entire range of organic compounds in sugar beets can be detected. Thus, with the solution described herein it is possible to estimate the quality of sugar beets more accurately beyond the classical analysis.

A further advantage of the solution described herein lies in the fact that problems in analysing sugar beets that are caused by the fact that sugar beets are composed heterogeneously in respect to their components can be overcome. In particular the structure and composition of samples that are used for analysis can be crucial for the accuracy of determining components, such as quality parameters. Genomic parameters, crop cultivation, and environmental conditions can influence growth and content of components in sugar beets. For example, the concentration and the content of the components in sugar beets, such as for example the distribution of sucrose, dry matter, α-amino-nitrogen, soluble nitrogen, total nitrogen, glucose, fructose, sodium and potassium, within sugar beets can be irregular distributed within a sugar beet and between different sugar beets. A classical component analysis for determining components can usually be done in a laboratory, wherein a representative beet pulp can be produced. For more than 60 years this has been done using a beet saw which can supply fine and homogeneous sugar beet pulp that is required in sufficient quantity and quality for the sugar beet analysis. After production and storage, this sugar beet pulp can be converted into an aqueous filtrate by cold aqueous digestion with aluminum sulfate (ICUMSA GS 6-3) as clarifying agent for subsequent analysis. The International Commission for Uniform Methods of Sugar Analysis (ICUMSA) is an international standards body that publishes detailed laboratory procedures for the analysis of sugar. The procedures have specific steps involved. The quality parameters can be analysed by an automatic beet laboratory, sucrose can be analysed by using a polarimeter (ICUMSA GS 6-3), Potassium and Sodium by using a Flame-Photometer (ICUMSA GS 6-7) and α-amino-N by using fluorometric OPA method or by the copper method ('Blue Number') (ICUMSA GS6-5). The concentration of Glucose can be determined by an immobilized Enzyme Biosensor Method (ICUMSA GS6-8). Within such a classical component analysis, from the whole produced pulp usually only a sample, for example of about 0.3-2 wt. %, can be used for the component analysis itself. Many process steps from sampling to analysing are typically necessary and can have an influence on the accuracy of the results of the component analysis that may be only limitedly representative. As a result of a non-representative sampling, significant distortions may occur in the measurement of ingredients. However, applying the solution described herein can reduce the sample error and therefore the prediction error for the entire sample. The solution described herein overcomes these shortcomings pointed out above in that a much larger sample and/or a much larger amount of sugar beets can be analysed. This can advantageously result in a reduction of the sample error and therefore a reduction of the prediction error for the analysed sugar beets.

The success in production of sugar from sugar beets can not only be affected by the total sugar content in sugar beets but also by components which interfere with sugar the manufacturing process, such as non-sugar components of the beets. For example, the influence of the non-sugar components on sugar extractability has been subject to several investigations, wherein different formulas were developed. For example, Buchholz et al. (Buchholz, K.; Märländer, B.; Puke, H.; Glattkowski, H.: Neubewertung des technischen Wertes von Zuckerrüben. Zuckerind.120 (1995)113-121) has established a formula for quality estimation of sugar beets based on 60 sugar beet varieties and molasses analysis. The consistent way of obtaining an indirect determination of the amount of sugar molasses from semi-technical molasses using betaine content of sugar beets and molasses as a reference value, required extensive processing of the sugar beets in a pilot plane (Bruhns, M.; Sievers, C.; Bliesener, K.-M.; Miehe, D.: Neue Technikumsanlage zur Rubenverabeitung am Zuckerinstitut Braunschweig. Zuckerind. 118 (1993)450-454). Due to the use of variables such as Sodium, Potassium and amino-nitrogen this equation can be applied in quality estimation of sugar beets and payment of the farmers. In order to realistically evaluate sugar beet according to their quality, it is preferred if also the acid formation from the degradation of reducing sugars (invert sugars) is taken into consideration. A further problem with the known formula can be that during sugar processing the soluble nitrogen compounds reaching the thick juice (the so-called harmful nitrogen) and detection of all α-amino-nitrogen compounds (analysed in sugar beets) can make up only 35-40% total harmful nitrogen. Due to the importance of harmful nitrogen in sugar processing and quality evaluation of sugar beet it has become essential to consider these compounds in factory evaluation. Formulas were developed by Burba and Schiweck to predict the alkanity reserves in sugar beets (Burba, M.; Schiweck, H.: Nichtzuckerbilanz und Ionenbilanz im Dicksaft als Grundlage einer Qualitatsbewertung von Zuckerrüben. Zuckerind. 118(1993) 680-689 and 924-936). Formula of Burba and Schiweck required the analysis of invert sugar as an additional analytical parameter. All of these formulas lack an analytical method for total nitrogen in thick juice. Until now, a common way to analyse the harmful nitrogen is done by measuring α-amino-N, due to the fact that there is a high correlation to the total harmful soluble nitrogen. It is of high importance to include a high nitrogen supplier such as betaine in beet quality calculation, but until now there are no fast-analytical approaches available to achieve this.

Beside Nitrogen content a lot of scientific efforts have been made to determine the various quality parameters of sugar beet and in the technical juices extracted from them as shown in the following table (Oltmann, W.; Burba. M; Bolz, G.: Die Qualität der Zuckerrübe. Bedeutung, Beurteilungskriterien und Maßnahmen zu ihrer Verbesserung. Berlin und Hamburg 1984).

| Parameter | | |
|---|---|---|
| Biological | Outer condition | Root tape- top tare; dirt; trash; relative amount of beet tops; relative amount of beet tails |
| | Bolting resistance | |
| | Resistance to diseases | |
| | Variety | Environmental stability |
| | Storability | Sucrose losses by respiration |
| Chemical | Sugar content | |
| | Marc content | |
| | Non-sugar components | |
| | Harmful soluble nitrogen | Glutamine; betaine; pyrrolidone; Asparagine |
| | Invert sugar | |
| | Pectins | |
| | Dextran | |
| | Raffinose | |
| Physical (mechanical) | External influences | Crushing, breakage; woody and fibrous beets, elasticity; compressibility |

Until now it has not been possible to arrive to a commonly accepted, binding solution to the problem, explaining importance of each parameter and expressing them in a single formula or a single term (Burba, M.: Perspectives and Limits of current beet quality evaluation. Zuckerind. 123(1998)5, 365-374).

It is an advantage of the solution described herein that these shortcomings can be overcome. Light of specific wavelengths, such as for example in the near-infrared range, can be absorbed by molecules containing C—H; N—H; S—H; O—H groups (fat; carbohydrates; organic acids; structural carbohydrates; water, alcohols, phenolics). The information present in a spectral signal can be used to estimate the concentration of a given substance in a sample or to estimate a bulk or physical property when these can be reflected and result in significant changes in the intensity and/or the wavelength of the spectral signals that is obtained from reflected electromagnetic waves.

A further advantage of the solution described herein lies in the fact that the payment of farmers can be done dependent on the sugar beet quality. Typically, in sugar production facilities only polarisation and/or recoverable sugar content are analysed based on the so called Braunschweiger formula to estimate the quality of sugar beets and to calculate a payment for the farmers based on these calculations. However, these calculations are based on very few parameters (Na, K, alpha-amino-N, sugar) and do not sufficiently reflect the chemical complexity of a sugar beets and how well the sugar can be extracted out of the sugar beets. With the solution described herein, it can be possible to detect an entire range of organic compounds in sugar beets that can be used to estimate the quality of sugar beets beyond the classical analysis. Using mathematical models, such as neuronal networks, can help to identify specific features of spectral signals that can correlate well with the extraction efficiency of the sugar beets. This information can be used to assess the quality of a delivery by a farmer much better than the classical analysis of only a few parameters and can then be used for optimizing the payment system of farmers. In this way the sugar beet-processing factory can benefit from better distinguishing high-quality sugar beets from low quality sugar beets and the farmers get incentivized to deliver best quality for the extraction efficiency of sugar out of sugar beets.

A further advantage of the solution described herein lies in the fact that information of sugar beet quality obtained from component analysis of sugar beets at a receiving section in a sugar production factory can be combined with information from which field or fields these sugar beets were harvested and how this field or these fields were agronomically managed. With such a combination of information growing conditions of sugar beets can be increased, which can lead to an increased quality of sugar beets for future sugar beet deliveries. It is a further advantage that farmers can get more information about components in sugar beets and on growing conditions that can lead to a higher quality of sugar beets for sugar extraction. For example, the information regarding the sugar beet quality can be exchanged with farmers, and/or farmers can exchange information about growing conditions and agricultural practices (e.g. obtained, collected and analysed using farm-management software) with the sugar production facility and/or other third parties, such as farm-management software providers or seed producers or retailers.

According to a preferred embodiment, the production facility is a production facility for sugar production and/or for production of animal feed and/or for biogas production and/or for ethanol production and/or for production of biodegradable plastics and/or for production of fuels and/or for production of fuel bio-components, and/or wherein the production is sugar production and/or production of animal feed and/or biogas production and/or ethanol production and/or production of biodegradable plastics and/or production of fuels and/or production of fuel bio-components, and/or wherein the product is sugar and/or animal feed and/or biogas and/or ethanol and/or biodegradable plastics and/or fuels and/or fuel bio-components.

Preferably, in industrial processing of sugar beets sucrose is extracted from sugar beets using hot water, resulting in raw juice, which can then be purified, filtered, and concentrated by cyclic rinsing and evaporation. To obtain the final product, the thick juice can be crystallized, which can result in white sugar that can then recrystallized, which ultimately can lead to the production of high-quality refined sugar. Various sugar beet products can be produced at different stages of sugar beet processing. A by-product, which can contain a large amount of water, can comprise up to 75% of beet pulp. The beet pulp can be used as a heat source and, circulating in a closed system, can be used repeatedly to provide a large proportion of heat demands of a sugar production facility. Other by-products can be components that are used as supplements in food production or the pharmaceutical industry, including betaine, betalain, betacyanins, betaxanthins. Following the extraction of sucrose, the sugar beet pulp and beet splinters are preferably used in animal feed production and/or biogas production. Sugar beet leaves can also be used for production of methanol. After centrifugation of thick syrup in a sugar production process, the molasses obtained can be used for the production of alcohol, for a production of animal feed, and/or as a medium for yeast biomass production. Raw sugar beet juice can be used as feedstock for ethanol fermentation. Ozonation can be used to stabilize new kinds of fermentation media used in the biotechnological production of liquid fuel additives. Ethanol obtained in this way can be relatively inexpensive and can be used as a fuel or fuel additive. Hydrolysates of sucrose can be used as raw materials for the production of biodegradable plastics, fuels and/or fuel bio-components.

According to a preferred embodiment, the method further comprises receiving the plurality of sugar beets including the production portion of sugar beets for sugar production and the analysis portion of sugar beets for component analysis and possibly for sugar production, and/or providing sugar beet pieces from the production portion and/or the analysis portion, and/or arranging at least the analysis portion and possibly the production portion onto at least one transport device, and/or conveying at least the analysis portion and possibly the production portion using the at least one transport device, preferably with a transport velocity within a range of 0.05 m/s to 20 m/s, in particular 0.05 m/s to 10 m/s, preferably within a range of 0.05 m/s to 5 m/s, more preferably within a range of 0.05 m/s to 1 m/s.

Preferably, the method comprises producing pressed pulp by removing liquid substances from at least the production portion and/or at least the analysis portion, preferably using a mechanical press.

Preferably, receiving the plurality of sugar beets is conducted by receiving a truckload of sugar beets and/or a container of sugar beets and/or a goods wagon of sugar beets at the sugar production facility, in particular at a receiving section of the sugar production facility.

The method comprises arranging at least the analysis portion onto at least one transport device. Preferably, the method comprises arranging the analysis portion and the production portion onto at least one transport device. The at least one transport device is understood to be a device for conveying sugar beets and/or sugar beet pieces, in particular the analysis portion. The at least one transport device can be adapted to convey the analysis portion and the production portion. Preferably, the at least one transport device comprises or is a conveyor belt.

Preferably conveying at least the analysis portion using the at least one transport device is conducted along a transport direction, wherein a stream of at least the analysis portion is generated. Preferably, the stream of at least the analysis portion moves along the transport direction. Preferably, the method comprises conveying the analysis portion and the production portion using the at least one transport device. The at least one transport device can be arranged at a receiving station, in particular at a position where sugar beets are received. The at least one transport device can be arranged next to and/or at a storage station that is adapted to store sugar beets. The at least one transport device can be arranged next to another transport device in a sugar production facility, in particular next to a transport device that is adapted to convey sugar beets and/or sugar beet pieces. The at least one transport device can comprise several transport sub-devices, in particular transport sub-devices that are arranged next to each other, wherein at least a part of the transport sub-devices are arranged in a sugar production facility. The at least one transport device can be adapted to convey sugar beets and/or sugar beet pieces.

Preferably, producing sugar comprises producing a raw juice from at least the production portion, and/or producing a thin juice, preferably from at least the raw juice, and/or producing a thick juice, preferably from at least the thin juice, and/or producing sugar, preferably from at least the thick juice.

Preferably, the thin juice is produced from the raw juice by cleaning the raw juice and subsequent filtration of the cleaned juice, wherein cleaning the raw juice comprises extracting and removing non-sugars using lime and carbonic acid gas. Preferably, filtration of the cleaned juice comprises filtering out flocculatable insoluble non-sugars and lime.

Preferably, the thick juice is produced by thickening the thin juice in a, preferably multi-stage, evaporation process, comprising evaporating liquid from the thin juice. In such a way, thick juice can be made from the thin juice.

Preferably, sugar is produced from the thick juice by the following steps: further thickening the thick juice, in particular under vacuum conditions, wherein a crystallization process of sugar crystals occurs, centrifugation of the further thickened thick juice, wherein sugar crystals are separated from syrup due to centrifugal forces. Preferably, the produced sugar contains at least 99.7% sucrose. Subsequently, the produced sugar can be dried, in particular by using an air stream. By drying the sugar, the sugar content can be increased and the moisture content can be decreased.

According to a further preferred embodiment of the method, analysing at least the analysis portion is conducted after the step of receiving a plurality of sugar beets, and preferably prior to storing the plurality of sugar beets. Preferably, the analysis portion is crumbled and/or cut into sugar beet pieces prior to analysing at least the analysis portion. Preferably slicing and/or cutting the production portion into sugar beet pieces is conducted after analysing at least the analysis portion. Analysing at least the analysis portion can be conducted at a receiving station, wherein preferably at the receiving station sugar beets are received. Preferably, when analysing at least the analysis portion is conducted after the step of receiving a plurality of sugar beets and preferably prior to storing the plurality of sugar beets, the transport velocity lies within a range of 0.05 m/s to 20 m/s, in particular 0.05 m/s to 10 m/s, preferably within a range of 0.05 m/s to 5 m/s, more preferably within a range of 0.05 m/s to 1 m/s.

According to a further preferred embodiment of the method, analysing at least the analysis portion is conducted after and/or during storing the plurality of sugar beets, and preferably prior to providing sugar beet pieces, in particular by slicing, Preferably, slicing and/or cutting the production portion into sugar beet pieces is conducted after analysing at least the analysis portion. Analysing at least the analysis portion can be conducted at a storing station, wherein preferably at the storing station sugar beets are stored. Preferably, when analysing at least the analysis portion is conducted after and/or during storing the plurality of sugar beets, and preferably prior to providing sugar beet pieces, in particular by slicing, the transport velocity lies within a range of 0.05 m/s to 20 m/s, in particular 0.05 m/s to 10 m/s, preferably within a range of 0.05 m/s to 5 m/s, more preferably within a range of 0.05 m/s to 1 m/s.

According to a further preferred embodiment of the method, analysing at least the analysis portion and possibly the production portion is conducted after providing sugar beet pieces, in particular by slicing, and preferably prior to producing a raw juice from at least the production portion, Preferably the analysis portion is sliced and/or cut into sugar beet pieces prior to analysing at least the analysis portion. Analysing at least the analysis portion can be conducted within a sugar production process, in particular in a sugar production facility. Analysing at least the analysis portion can preferably be conducted on sliced and/or cut sugar beet pieces within a sugar production facility. Preferably, when analysing at least the analysis portion and possibly the production portion is conducted after providing sugar beet pieces the transport velocity lies within a range of 0.05 m/s to 20 m/s, in particular 0.05 m/s to 10 m/s, preferably within a range of 0.05 m/s to 5 m/s, more preferably within a range of 0.05 m/s to 1 m/s. It is particularly advantageous that analysing can be conducted without homogeneously distributing sugar beet pieces on the at least one transport device. Preferably, at least the analysis portion can be analysed during the sugar beet pieces are conveyed and without the need to further arrange the sugar beet pieces on the at least one transport device.

According to a further preferred embodiment of the method, analysing at least the analysis portion and possibly the production portion is conducted after producing pressed pulp, preferably prior to and/or after drying of the pressed pulp. Preferably the analysis portion comprises and/or is pressed pulp. Preferably the analysis portion is sliced and/or cut into sugar beet pieces prior to analysing at least the analysis portion. Preferably, when analysing at least the analysis portion and possibly the production portion is conducted after producing pressed pulp the transport velocity lies within a range of 0.05 m/s to 20 m/s, in particular 0.05 m/s to 10 m/s, preferably within a range of 0.05 m/s to 5 m/s, more preferably within a range of 0.05 m/s to 1 m/s. Preferably pressed pulp is produced by removing liquid substances from at least the production portion and/or at least the analysis portion, preferably using a mechanical press, wherein the pressed pulp comprises the analysis portion, and/or emitting electromagnetic waves towards the analysis portion, and/or receiving, in particular reflected, electromagnetic waves that were reflected from the analysis portion, wherein preferably the wavelength of the electromagnetic waves lies in the infrared spectrum, in particular in the near-infrared spectrum and/or in the visible spectrum, and/or converting the reflected electromagnetic waves into a spectral signal. Preferably, after sugar has been extracted from at least the production portion in a sugar production process, the sugar beet pieces from which the sugar has been extracted are mechanically pressed, in particular using the mechanical press with which liquid in the sugar beet pieces can be extracted. Preferably, at least 20%, in particular at least 44%, of the volumetric and/or gravimetric moisture content of the sugar beet pieces is extracted by using the mechanical press and/or by removing liquid substances from at least the production portion. The volumetric moisture content can be understood as the ratio of the volume of water to the total volume of the material. The gravimetric moisture content can be understood as the ratio of the mass of water to the total mass of the material. Preferably, the extracted liquid is reintroduced into the sugar production process, as the extracted liquid contains sugar. Subsequently, the pressed pulp can be dried. To determine components in the pressed pulp, the method described herein can be applied. From the spectral signal, component analysis can be carried out. In particular, from the spectral signal volumetric and/or gravimetric moisture content and/or sugar content in the pressed pulp can be determined.

According to a further preferred embodiment of the method, analysing is performed as a continuous process, preferably by emitting electromagnetic waves and/or receiving electromagnetic waves and/or converting the received electromagnetic waves into a spectral signal in intervals of less than 100 ms, in particular of less than 50 ms, preferably in intervals of 1 ms, 10 ms, 20 ms, 30 ms, or 40 ms. The intervals can also be 1 s, 10 s, 20 s, 30 s or 40 s or several minutes or several hours Preferably, the intervals between generating spectral signals are less than 100 ms, in particular less than 50 ms, preferably 10 ms, 20 ms, 30 ms or 40 ms. Preferably the intervals between converting received electromagnetic waves into spectral signals are less than 100 ms, in particular less than 50 ms, preferably 10 ms, 20 ms, 30 ms or 40 ms.

According to a further preferred embodiment of the method, the mass fraction of the analysis portion is at least 0.001% or at least 0.1% or at least 0.2% or at least 0.5% or at least 1% or at least 10% or at least 25, or at least 50%, or at least 80% within the plurality of sugar beets.

Preferably, the production portion comprises the analysis portion. Preferably, the production portion and the analysis portion are, at least partly, identical. The production portion and the analysis portion can comprise the same sugar beets and/or sugar beet pieces. The production portion and the analysis portion can consist of the same sugar beets and/or sugar beet pieces.

An advantage of a mass fraction of the analysis portion of at least 0.001% lies in the fact that in particular in sugar production processes usually much smaller mass fractions of the analysis portion are investigated. Therefore, a much higher mass fraction of analysed sugar beets and/or sugar beet pieces can be achieved.

It is possible that the mass fraction of the analysis portion is a large fraction within the plurality of sugar beets, such as for example a mass fraction of 50% or 80% within the plurality of sugar beets. The mass fraction of the analysis portion can be 100% within the plurality of sugar beets. In this case, component analysis is carried out on all sugar beets of the plurality of sugar beets. The volume fraction of the analysis portion can be at least 0.001% or at least 0.1% or at least 0.2% or at least 0.5% or at least 1% or at least 10% within the plurality of sugar beets. The volume fraction of the analysis portion can be at least 50%, in particular 100%, within the plurality of sugar beets. The mass fraction of the analysis portion within the plurality of sugar beets can be understood as the ratio of the mass of the analysis portion to the total mass of the plurality of sugar beets, wherein the mass fraction can be expressed as percentage by mass. The volume fraction of the analysis portion within the plurality of sugar beets can be understood as the ratio of the volume of the analysis portion to the total volume of the plurality of sugar beets, wherein the volume fraction can be expressed as volume percent.

According to a preferred embodiment of the method, the production portion comprises the analysis portion. It is preferred if at least a part of the production portion is the analysis portion. In this case, at least a part of the sugar beets and at least a part of the sugar beet pieces that belong to the production portion and that are used for sugar production in a sugar production facility are used for component analysis. This is particularly advantageous as the sugar beets on which component analysis is carried out can also be used for sugar production. Therefore, less or no sugar beets for component analysis need to be discarded and thus, the efficiency of sugar production can be increased.

According to a preferred embodiment of the method, the method comprises generating of calibration data, including taking a sample of sugar beets, preferably a determined amount, for example 10 kg, and preferably moving the sample along a sensor that is adapted to receive electromagnetic waves, spectroscopic analysis of the sample by, preferably continuously, emitting electromagnetic waves towards the sample, receiving electromagnetic waves, and converting the received electromagnetic waves into a spectral signal, producing a sugar beet pulp from the sample, preferably by a cutter mill, and extracting the sugar beet pulp, preferably by aluminium sulfate or lead acetate solution or water, reference analysis of the extracted sugar beet pulp by conducting measurements, such as polarimetry, flame photometry, fluorometric o-phthalaldehyde (OPA) method, copper method, immobilized enzyme biosensor method and/or others, comparing the results of the spectroscopic analysis with the results of the reference analysis, wherein preferably generating calibration data further includes one or several of the following steps: pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out, and/or removing spectral signals that are not converted from electromagnetic waves that are reflected from or emitted through the sugar beets, preferably by differentiating the spectral signals using classification and/or filtering, in particular using mathematical filtering methods, and/or averaging spectral signals to one spectral signal, and/or carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks.

The sample of sugar beets can be a sample of sugar beet pieces. The sample of sugar beets can for example comprise 10 kg or 20 kg or 30 kg of sugar beets and/or sugar beet pieces. Other amounts of sugar beets and/or sugar beet pieces can also be used. Preferably, receiving electromagnetic waves can be understood as receiving electromagnetic waves that are reflected from the sample. Sugar beet pulp can be understood as a soft mass of mashed sugar beets. Reference analysis can comprise at least one or several measurements, wherein the at least one measurement can be conducted on the sugar beet pulp. Preferably, by comparing the results obtained from the spectroscopic analysis with the results obtained from the reference analysis, calibration data can be generated, Preferably the spectroscopic analysis is carried out continuously. Preferably, calibration data is generated by repeatedly taking samples, conducting spectroscopic analyses of the samples and producing sugar beet pulp from the samples, Preferably, calibration data is generated by repeatedly comparing results of spectroscopic analyses with results from calibration analyses. It is preferred if this procedure is repeated several times, in particular more than 100 times, preferably more than 1000 times. Preferably, this procedure conducted on sugar beets with different components, preferably on relatively wet sugar beets, on relatively dry sugar beets, on sugar beets with high sugar content, on sugar beets with low sugar content, and/or on sugar beets with varying components.

Preferably, calibration data is generated by analysing sugar beet pieces on a bypass stream and/or by sampling of a defined amount of analysis portion in processes, in particular in a sugar production facility, preferably in regular time intervals. Preferably, calibration data is generated over a time period of at least several days, in particular of at least several weeks and/or of at least several months and/or of several years.

Generating calibration data can also be carried out in a static process, wherein the sample of sugar beets is not moved along a sensor. Preferably, within such a static process, the sample is located at a defined position, in particular under a sensor that is adapted to receive electromagnetic waves.

An advantage of generating calibration data in the described way is that the calibration data can be used for reliably determining components in sugar beets and/or sugar beet pieces, in particular even for sugar beets with different components and/or properties.

Preferably, generating calibration data comprises developing and/or optimising and/or validating a calibration model, wherein developing and/or optimising and/or validating the calibration model comprises generating a calibration set, a cross-validation set, and an independent validation set. Preferably, the calibration set comprises results obtained from spectroscopic analysis of a first part of the sample of sugar beets. Preferably, the cross-validation set comprises results obtained from spectroscopic analysis of a second part of the sample of sugar beets. Preferably, the independent validation set comprises results obtained from spectroscopic analysis of a third part of the sample of sugar beets. It is preferred if the first part, the second part, and the third part of the sample are different parts of the sample of sugar beets. Preferably, the first part, the second part and the third part are from different samples of sugar beets, in particular from samples of sugar beets that have been harvested at different locations. The calibration model can be generated from the calibration set. The cross-validation set can be used for developing, in particular improving, the calibration model. The independent validation set can be used for validating the calibration model. Outliers or also samples in validation set can be used to modify or to develop the calibration model. Preferably, the independent validation set is not used for changing and/or developing the calibration model.

According to a further preferred embodiment, the method comprises processing the spectral signal for determining components in at least the analysis portion and possibly the production portion, and/or comparing the spectral signal with the calibration data and dependent on the comparison determine, preferably quantitatively, the components in at least the analysis portion and possibly the production portion. Processing the spectral signal is carried out to determine components in at least the analysis portion, preferably in the analysis portion and at least a part of the production portion. The components in at least the analysis portion, and preferably in at least a part of the production portion, can for example be one or several of the following group: total sugar content, content of monosaccharides as glucose, fructose, galactose, content of disaccharides as sucrose, lactose, maltose, content of Oligosaccharides as raffinose, maltodextrin, cellodextrin, content of polysaccharides as inulins, fructans, extraction efficiency of sugar, dry matter content, crude protein, crude fiber, amino acids, starch, total sugar content, recoverable sugar content, soluble nitrogen compounds as proteins, betaine, betalaine, betacyanins, betaxanthins, amides and amino acids, insoluble nitrogen compounds as proteins, nitrogen free organic substances as pectins, saponins, organic acids, marc content, fat content, content of alcohols, content of structural carbohydrates as NDF (Neutral Detergent Fiber), ADF (Acid Detergent Fiber), AOL (Acid Detergent Lignin) or content of Hemicellulose, cellulose, Lignin, ash content, content of alkali metal elements and its inorganic compounds as sodium, sodium chloride, content of metal elements und inorganic compounds as calcium, calcium carbonate, magnesium, magnesium oxide, content of metalloid elements and inorganic compounds as boron, borate minerals, selenium, silicon, content of non-metal elements and inorganic compounds as carbon, carbonates, phosphorus, phosphates, sulfur, iodine. The components can be determined qualitatively and/or quantitatively.

According to a further preferred embodiment of the method, the wavelength of the electromagnetic waves lies in the infrared spectrum, preferably in the near-infrared spectrum, and/or in the microwave region and/or in the visible spectrum, and/or in the ultraviolet spectrum, and/or the spectral signal is converted by using spectroscopy, in particular near-infrared spectroscopy (NIRS), mid-infrared-spectroscopy, far-infrared spectroscopy, terahertz-spectroscopy and/or ultraviolet-visible spectroscopy (UV-Vis) and/or Raman spectroscopy and/or laser-induced breakdown spectroscopy (LIBS), and/or fluorescence spectroscopy and/or hyperspectral imaging, and/or nuclear magnetic resonance and/or a combination of hyperspectral imaging with different spectroscopic approaches and/or combinations of different spectroscopic methods, wherein analysing is conducted using a camera and/or using a combination of a camera with different spectroscopic methods.

Preferably, the infrared spectrum comprises wavelengths in a range from 750 nm to 1,000,000 nm. Preferably, the near-infrared spectrum comprises wavelengths in a range from 750 nm to 2,500 nm. Preferably, the visible spectrum comprises wavelengths in a range from 400 nm to 750 nm. Further preferably, the wavelength of the electromagnetic waves lies in the ultraviolet spectrum, wherein preferably, the ultraviolet spectrum comprises wavelengths in a range from 10 nm to 400 nm.

Preferably, the spectral signal is converted by using spectroscopy, in particular near-infrared spectroscopy (NIRS), and/or mid infrared spectroscopy and/or far infrared spectroscopy and/or ultraviolet-visible spectroscopy (UV-Vis) and/or Raman spectroscopy and/or laser-induced breakdown spectroscopy (LIBS). In particular a combination of different spectroscopy methods as well in combination with hyperspectral images can be used, wherein preferably the spectral signals converted by using different spectroscopy methods can be combined for component analysis. Preferably, nuclear magnetic resonance may be also used in combination with any of the above-mentioned spectroscopical methods.

According to a further preferred embodiment, the method comprises changing at least one sugar production parameter, in particular electric field pulses and/or pulse numbers and/or process temperature and/or conveying speed and/or duration of the production portion in reactor dependent on the determined components in at least the analysis portion, and/or changing at least one drying process parameter for drying pressed pulp, in particular drying time and/or drying temperature for drying pressed pulp dependent on the determined components in at least the analysis portion, and/or changing at least the order in which sugar beets are introduced into a sugar production process dependent on the determined components in at least the analysis portion.

In beet juice purification, milk of lime and CO2 can be used. Coke and limestone can be used for the production of CaO and CO2. The lime usage of the conventional process can be about 2% beet. Classical juice purification can consist of liming, carbonation, sludge separation and sulphitation. With this purification process parts of non-sugars can be removed from the sugar. The knowledge about quality of sugar beets can help to adjust the purifications process, in particular adjusting the amount of limestone added. An advantage of optimizing the addition of limestone lies in the fact that the costs can be reduced if a reduction of limestone is possible. Furthermore, analysis results of sugar beet quality loss during storage of sugar beets can be used to adjust the addition of limestone. In addition, the amount of water added during the extraction can be adjusted based on the quality determination of the beets. Relevant parameters can be content of sucrose and the content of non-sugar components as proteins, pectins, inorganic salts, organic acids, colouring substances as glucose and/or fructose, amino acid nitrogen and all soluble nitrogen compounds can negatively affect processing of sugar beet roots because of juice colour modifications and reduction of alkalinity.

Damaged sugar beets, which can be damaged defrosted sugar beets or otherwise damaged sugar beets can have a changed quality that may affect the filtration process during sugar extraction. Adding dextranase during sugar extraction can improve the filtration process. Analysing the presence and the amount of damaged sugar beets can be used for optimising the amount of dextranase addition/supplementation. With an optimization of dextranase addition the sugar beet extraction can be made more cost efficient.

In addition, analyzing the density of sugar beets can help to optimize the cutting and/or slicing process, for example by adjusting the sharpness of the cutting knives and/or by exchanging the cutting knives.

Sugar beets can be decapitated during harvesting, wherein the heads of the sugar beets can contain less sugar and more components that could negatively influence the sugar production process, such as for example nitrogen compounds, when compared to other parts of the sugar beets. In particular, the heads of the sugar beets can contain green material and leaves. Preferably, a determination of the amount of heads of sugar beets or the amount of green material in a sample of sugar beets can be used to estimate the quality of the sample of sugar beets and therefore to adjust the sugar production process dependent on the quality of the sample of sugar beets.

In sugar production, electric field pulses can be applied in an electrical reaction chamber, which is understood as a part of a device in which electric currents and/or electric fields act on target materials, in particular on sugar beet pieces, preferably at least the production portion of sugar beet pieces. An electrical reaction chamber is understood as an electroporation device, wherein electrical field pulses are applied to cells in order to increase the permeability of the cell membrane to improve the process of extracting sugar from at least the production portion. Pulse number refers to the number of electrical field pulses that are applied in the electrical reaction chamber within a certain period of time, in particular the number of electrical field pulses per second. Process temperature can be the temperature of a liquid, in particular water, within a chamber or reactor, preferably in an electrical reaction chamber, or the temperature of water introduced to a chamber, preferably an electrical reaction chamber. Conveying speed can be the speed of the stream of at least the analysis portion, wherein the stream of at least the production portion is generated by conveying at least the analysis portion along the transport direction using the transport device. The duration of the production portion in reactor is preferably the duration in which at least the production portion is arranged in a reactor, in particular in an electrical reaction chamber. A drying process parameter for drying pressed pulp can be the duration of drying pressed pulp and/or the temperature applied for drying pressed pulp.

The order in which sugar beets are introduced into a sugar production process can advantageously be regulated in such a way that the sugar production efficiency is increased. In particular, a waiting queue can be created dependent on the determined components in different sugar beets and/or different pluralities of sugar beets and/or different sugar beet pieces. Preferably, sugar beets are sorted dependent on analysed components of the sugar beets. Thus, advantageously sugar beets of similar quality can be sorted and processed together in a sugar production process in a sugar production facility, wherein the sugar production parameters can be adjusted to most efficiently extract sugar from the sugar beets.

According to a further preferred embodiment of the method, providing sugar beet pieces from the analysis portion is conducted using a chopping device, wherein the chopping device is configured to crumble and/or cut the analysis portion into substantially equal sized sugar beet pieces, and/or providing sugar beet pieces from the analysis portion and/or the production portion is conducted using a slicing device, wherein the slicing device is configured to cut the analysis portion and/or the production portion into sugar beet pieces that are formed as slices and/or thin elongated strips.

Chopping the analysis portion and/or production portion into sugar beet pieces can be conducted using a chopping device, wherein the chopping device is configured to cut and/or crumble the analysis portion and/or the production portion into substantially equal sized sugar beet pieces.

Preferably, the sugar beet pieces are chopped by crumbling sugar beets into sugar beet pieces, in particular using hooks that are adapted to crumble sugar beets into sugar beet pieces rather than cutting the sugar beets. By crumbling sugar beet pieces, sugar beet pieces are broken into pieces off the sugar beets, wherein the crumbled sugar beet pieces are rather dry and in particular do not comprise a flat and wet cutting surface.

Providing sugar beet pieces can also comprise slicing the analysis portion and/or the production portion into sugar beet pieces using a slicing device, wherein the slicing device is configured to cut and/or slice the analysis portion and/or the production portion into sugar beet pieces that are formed as slices and/or thin elongated strips.

Preferably, the production portion can be sliced and/or cut into sugar beet pieces by using a slicing device, wherein the slicing device is configured to cut the analysis portion and/or the production portion into sugar beet pieces that are formed as thin elongated strips. Preferably, the sugar beet pieces are cut, wherein the slicing device comprises blades and/or knifes for cutting and/or slicing sugar beets into sugar beet pieces. The sugar beet pieces formed as thin elongated strips can also be referred to as cossettes. Cutting sugar beets into sugar beet pieces that are formed as thin elongated strips is in particular advantageous because the surface area of the sugar beet pieces is relatively high, which can result in a good extractability of sugar from these sugar beet pieces that are formed as thin elongated strips. Preferably, the length of the sugar beet pieces that are formed as thin elongated strips is at least three times larger, in particular at least five times larger, than the thickness of the sugar beet pieces that are formed as thin elongated strips.

According to a further preferred embodiment of the method, the at least one transport device comprises a first transport section, a main transport section and a second transport section, wherein the main transport section is arranged downstream of the first transport section and upstream of the second transport section, and/or wherein the at least one transport device comprises a bypass section arranged downstream of the first transport section and upstream of the second transport section. Preferably the method further comprises conveying the production portion and the analysis portion along the first transport section, and/or conveying at least the analysis portion along the bypass section, and/or conveying at least a part of the production portion, in particular the sugar beet pieces that are not part of the analysis portion, along the main transport section, and/or conveying the production portion along the second transport section, and/or conveying the analysis portion along the second transport section and/or discarding the analysis portion.

Downstream and upstream are understood in a sense that when conveying at least the analysis portion using the at least one transport device along a transport direction a stream of at least the analysis portion is generated and the stream of at least the analysis portion moves along the transport direction from upstream to downstream. In particular, the stream of at least the analysis portion moves from upstream to downstream.

Preferably, the first transport section comprises an upstream end and a downstream end, the main transport section comprises an upstream end and a downstream end, and the second transport section comprises an upstream end and a downstream and, wherein the downstream end of the first transport section is connected to the upstream end of the main transport section and the downstream end of the main transport section is connected to the upstream end of the second transport section. The first transport section, the main transport section, and the second transport section can be sections of the same transport device. The first transport section, the main transport section, and the second transport section can be driven separately, in particular using electric motors.

It is further preferred that the transport device comprises a bypass section arranged downstream of the first transport section and upstream of the second transport section.

Preferably, the bypass section comprises an upstream end and a downstream end, wherein the upstream end is connected to the downstream end of the first transport section. Preferably, the analysis portion is conveyed along the bypass section from the upstream end of the bypass section to the downstream end of the bypass section. The downstream end of the bypass section can be connected to the upstream end of the second transport section.

According to a further preferred embodiment, the method comprises conveying the production portion and the analysis portion along the first transport section, and/or conveying at least the analysis portion along the bypass section, and/or conveying at least a part of the production portion, in particular the sugar beet pieces that are not part of the analysis portion, along the main transport section.

Preferably, the sugar beet pieces are divided, wherein the analysis portion is guided from the stream of sugar beet pieces on the first transport section to a bypass stream on the bypass section. Preferably, the bypass stream merges with the stream of the other sugar beet pieces at the second transport section. The bypass section can be arranged downstream of, and in particular adjacent to, the first transport section, and upstream of, and in particular adjacent to the second transport section. In particular, the bypass section connects the first transport section and the second transport section as an alternative transport route. Thus, a part of the sugar beet pieces, in particular the part that does not include the analysis portion, can be transported along the main transport section, and a part of the sugar beets, in particular the analysis portion, can be transported along the bypass transport section.

Preferably the transport velocity of the sugar beet pieces that are arranged on the bypass section is lower than, in particular less than half of, the transport velocity of the sugar beet pieces that are arranged on the main section and/or the first transport section and/or the second transport section.

Preferably, the method comprises conveying the production portion along the second transport section, and/or conveying the analysis portion along the second transport section and/or discarding the analysis portion.

Preferably, the production portion and the analysis portion are conveyed along the second transport section from the upstream end of the second transport section to the downstream end of the second transport section. In case that the analysis portion is not conveyed to the second transport section, the analysis portion can be discarded, in particular after conducting component analysis on the analysis portion on the bypass section.

According to a further preferred embodiment of the method, emitting electromagnetic waves towards at least the analysis portion is conducted while the analysis portion is arranged at, and preferably conveyed along, the first transport section and/or arranged at, and preferably conveyed along, the bypass section and/or wherein emitting electromagnetic waves towards the production portion is conducted while the production portion is arranged at, and preferably conveyed along, the first transport section.

Preferably, analysing components of at least the analysis portion is conducted on at least the analysis portion that is arranged on the bypass section. Analysing components of at least the analysis portion can alternatively or additionally be conducted on at least the analysis portion that is arranged on the first transport device or on the second transport device.

According to a further preferred embodiment, the method comprises homogeneously and/or heterogeneously distributing the sugar beet pieces onto the at least one transport device, preferably with a roller that is arranged above the at least one transport device or without a roller.

Preferably homogeneously distributing the sugar beet pieces onto the at least one transport device is conducted on at least the analysis portion when at least the analysis portion is arranged on the bypass section.

Homogeneously distributing the sugar beet pieces can be evenly distributing sugar beet pieces. Preferably, homogeneously distributing the sugar beet pieces is referred to distributing the sugar beet pieces in a way that the height of the sugar beet pieces on the at least one transport device is constant or varies in a range of preferably +/−5 cm. The homogeneously distributed sugar beet pieces can be arranged on the at least one transport device, having a defined and constant height and/or width, wherein preferably variations can occur in the range of +/−5 cm. In particular, the stream of sugar beet pieces that is generated from the transport device has a defined and constant height and/or width, wherein the direction of the width is referred to a direction orthogonal to the transport direction and parallel to a plane on which the sugar beet pieces are arranged on the at least one transport device, wherein the direction of the height is referred to a direction orthogonal to the transport direction and orthogonal to the plane on which the sugar beet pieces are arranged on the at least one transport device. The described process can be conducted in a similar way for heterogeneously distributing of sugar beet pieces as for example for directly measurements on cossettes or dried pulp. Preferably, no defined and/or constant hight or width is needed. Preferably, homogenously distributing sugar beets by using a roller and/or heterogeneously distributing sugar beets without a roller can be conducted.

Preferably, homogeneously distributing is conducted by using a roller, wherein preferably the roller is arranged with a roller axis at a fixed and constant distance above the at least one transport device. Preferably, at least the analysis portion is compressed using the roller to a certain height, wherein in particular the surface of at least the analysis portion is smooth and even. The roller can be driven to rotate by the stream of at least the analysis portion and/or by a motor, wherein the roller can be driven with or in opposite direction to the stream of at least the analysis portion that moves along the transport direction.

According to a further preferred embodiment of the method, the components in the analysis portion preferably comprise one or several of the following group, in particular when analysing at least the analysis portion and possibly the production portion is conducted after producing pressed pulp: dry matter content, protein content, carbohydrate content, fiber content, content of cellulose; content of hemicellulose; neutral detergent fiber (NDF) content, acid detergent fiber (ADF) content, AOL (Acid Detergent Lignin) content; lignin content, amino acid content, starch content, total sugar content, content of monosaccharides; content of oligosaccharides; content of polysaccharides; and/or gross energy content, feed unit for milk production (UFL), metabolizable energy (ME), ash content. Preferably, the components in the analysis portion preferably comprise one or several of the following group, in particular when analysing at least the analysis portion and possibly the production portion is conducted after providing sugar beet pieces, in particular by slicing, and preferably prior to producing a raw juice from at least the production portion: total sugar content, content of monosaccharides as glucose; fructose; galactose; content of disaccharides as sucrose, lactose, maltose; content of Oligosaccharides as raffinose, maltodextrin, cellodextrin; content of polysaccharides as inulins, fructans; extraction efficiency of sugar; dry matter content, crude protein, crude fiber, amino acids, starch, total sugar content, recoverable sugar content, soluble nitrogen compounds as proteins, betaine, betalaine, betacyanins, betaxanthins, amides and amino acids; insoluble nitrogen compounds as proteins; nitrogen free organic substances as pectins, saponins, organic acids; marc content; fat content; content of alcohols; content of structural carbohydrates as NDF (Neutral Detergent Fiber); ADF (Acid Detergent Fiber); AOL (Acid Detergent Lignin) or content of Hemicellulose; cellulose; Lignin; ash content; content of alkali metal elements and its inorganic compounds as sodium; sodium chloride; content of metal elements und inorganic compounds as calcium; calcium carbonate, magnesium, magnesium oxide; content of metalloid elements and inorganic compounds as boron, borate minerals, selenium, silicon; content of non-metal elements and inorganic compounds as carbon, carbonates, phosphorus, phosphates; sulfur, iodine.

According to a further preferred embodiment, the method comprises changing at least one sugar production parameter, in particular electric field pulses and/or pulse numbers and/or process temperature and/or conveying speed and/or duration of the production portion in reactor dependent on the determined components in the pressed pulp analysis portion, and/or changing at least one drying process parameter for drying pressed pulp, in particular drying time and/or drying temperature for drying the pressed pulp dependent on the determined components in the pressed pulp analysis portion, and/or changing at least the order in which sugar beets are introduced into a sugar production process dependent on the determined components in the pressed pulp analysis portion. Regarding the sugar production parameters, it is referred to the definitions and preferred embodiments as described above.

According to a further aspect, it is provided a method for generating calibration data for the determination of components in sugar beets for sugar production, comprising taking a sample of sugar beets, preferably a determined amount, for example 10 kg, and preferably moving the sample along a sensor that is adapted to receive electromagnetic waves, spectroscopic analysis of the sample by, preferably continuously, emitting electromagnetic waves towards the sample, receiving electromagnetic waves, and converting the received electromagnetic waves into a spectral signal, producing a sugar beet pulp from the sample, preferably by a cutter mill, and extracting the sugar beet pulp, preferably by Aluminium sulfate or lead acetate solution or water, reference analysis of the extracted sugar beet pulp by conducting measurements, such as polarimetry, flame photometry, fluorometric o-phthalaldehyde (OPA) method, copper method, immobilized enzyme biosensor method and/or others, comparing the results of the spectroscopic analysis with the results of the reference analysis.

Further advantageous embodiments of the method described above can be realized by combining some or all of the preferred features described herein.

According to a further aspect, it is provided an arrangement for determining components in sugar beets for sugar production, comprising a receiving section for receiving a plurality of sugar beets including a production portion of sugar beets for sugar production and an analysis portion of sugar beets for component analysis and possibly for sugar production, a chopping device, wherein the chopping device is configured to crumble and/or cut the analysis portion into substantially equal sized sugar beet pieces and/or a slicing device, wherein the slicing device is configured to cut the analysis portion and/or the production portion into sugar beet pieces that are formed as slices and/or thin elongated strips, a transport device for conveying at least the analysis portion and possibly the production portion, an analysis assembly arranged to emit electromagnetic waves towards at least the analysis portion that is arranged on the transport device, wherein preferably the analysis assembly is arranged to receive electromagnetic waves, and/or wherein preferably the analysis assembly is arranged to convert the received electromagnetic waves into a spectral signal, a raw juice production device for producing raw juice from at least the production portion, and/or a control unit for controlling the analysis assembly and/or for receiving data from the analysis assembly, wherein preferably the control unit is arranged for changing at least one sugar production parameter, in particular electric field pulses and/or pulse numbers and/or process temperature and/or conveying speed and/or duration of the production portion in reactor, and/or application of milk of lime and CO2 in raw juice purification and or adjustment of processes of liming, carbonation, sludge separation and sulphitation in juice purification dependent on components determined by the analysis assembly, and/or changing at least one drying process parameter for drying pressed pulp, in particular drying time and/or drying temperature for drying pressed pulp dependent on components determined by the analysis assembly, and/or changing at least the order in which sugar beets are introduced into a sugar production process dependent on components determined by the analysis assembly.

In a sugar production process, ammonium can be generated from nitrogen compounds, wherein the ammonium can be volatile and can decrease air quality inside the sugar production facility and outside of the sugar production facility. Preferably, with an analysis of the quality of the sugar beets, the sugar production parameters can be adjusted in a way that the ammonium content in the air and can be decreased and air quality can be increased, which can be beneficial for persons inside the sugar production factory and for the environmental impact of the sugar production facility. Preferably, by adjusting the sugar production parameters, CO2 emissions can be reduced. During the extraction of sugar, for example adding water and/or changing the cutting process of the sugar beets and/or changing the time of the sugar extraction can be adjusted.

The arrangement preferably comprises a mechanical press, in particular a pulp press that is specifically designed for pressing sugar beet pieces, for extracting liquid from the sugar beet pieces. The receiving section can be a section and/or station for receiving sugar beets from transport vehicles, such as for example trucks and/or trains. The receiving section can be an inlet of the chopping device, wherein the sugar beets are introduced to the chopping device through the inlet. The receiving section can be an inlet of the slicing device, wherein the sugar beets are introduced to the slicing device through the inlet. Preferably, the analysis assembly comprises an electromagnetic wave source for emitting electromagnetic waves towards at least the analysis portion that is arranged on the at least one transport device. Preferably, the analysis assembly comprises a sensor for receiving reflected electromagnetic waves. Preferably, the analysis assembly comprises a spectrometer, in particular a spectrometer that is adapted to carry out near-infrared spectroscopy (NIRS); and/or mid-infrared-spectroscopy; and/or far-infrared-spectroscopy; and/or ultraviolet-visible spectroscopy (UV-Vis) and/or Raman spectroscopy and/or laser-induced breakdown spectroscopy (LIBS) and/or Hyperspectral Imaging; and/or in combination. The electromagnetic wave source can be part of the spectrometer or not part of the spectrometer. The sensor can be part of the spectrometer or not part of the spectrometer. Nuclear magnetic resonance can be also used in combination with any of the above-mentioned spectroscopical methods.

According to a preferred embodiment, the arrangement comprises a control unit for controlling the analysis assembly and/or for receiving data from the analysis assembly, wherein preferably the control unit is arranged for changing at least one sugar production parameter, in particular electric field pulses and/or pulse numbers and/or process temperature and/or conveying speed and/or duration of the production portion in the reactor dependent on components determined by the analysis assembly, and/or changing at least one drying process parameter for drying pressed pulp, in particular drying time and/or drying temperature for drying pressed pulp dependent on components determined by the analysis assembly, and/or changing at least the order in which sugar beets are introduced into a sugar production process dependent on components determined by the analysis assembly.

The control unit can receive data and/or signals from the analysis assembly. The control unit is adapted to change at least one, preferably several, sugar production parameters dependent on the received data and/or on the received signals. Thus, the sugar production parameters can be adjusted by changing sugar production parameters that are tailored to the sugar beet pieces that are currently in the sugar production facility. An advantage of changing sugar production parameters in such a way is that sugar can be extracted more efficiently from the sugar beet pieces.

According to a further aspect, it is provided a sugar production facility, comprising an arrangement as described herein.

According to a further aspect, it is provided the use of an analysis assembly in a sugar production facility, in particular a sugar production facility as described herein, and/or the use of an arrangement for determining components in sugar beets for sugar production, in particular an arrangement for determining components in sugar beets for sugar production as described herein, in a sugar production facility, in particular a sugar production facility according to the preceding claim, and/or the use of a method for determining components in sugar beets for sugar production, in particular a method for determining components in sugar beets for sugar production as described herein, in a sugar production facility, in particular a sugar production facility as described herein.

The further aspects described above and their respective possible embodiments comprise features and/or method steps that are particularly suitable to be used with and/or connected with the method and its preferred embodiments described herein.

For the advantages, preferred embodiments, and details of the individual different aspects and their preferred embodiments, reference is also made to the description, and in particular to the described advantages, preferred embodiments, and details described with reference to the respective other aspects.

Further advantageous embodiments result from the combination of individual, several or all of the preferred features described herein.

According to a further aspect, it is provided a method for detecting plant diseases in plant material and/or physiological properties influenceable by environmental stress in plant material, the method comprising receiving plant material, emitting electromagnetic waves towards the plant material, receiving electromagnetic waves, converting the received electromagnetic waves into a spectral signal, and preferably processing the spectral signal, determining plant diseases in the plant material and/or physiological properties, in particular metabolites, influenceable by environmental stress in the plant material.

The "plant material" that may be used in the present invention encompasses various embodiments of plant, including but not limited to, the leaf, root, beet, tuber, stem, fruit, and other plant tissues of any section of the plant, callus or an adventive embryo-like tissue (referred to hereinafter as "callus, etc." or simply "callus"), or a complete plant, A preferable form of the plant material used in the method of the present invention is root, beet or tuber.

Plant material can be root crops and/or tuber crops, in particular of the species *Beta vulgaris* and/or *Solanum tuberosum*. Plant material can be a part of root crops and/or tuber crops, in particular of the species *Beta vulgaris* and/or *Solanum tuberosum*. Preferably, plant material comprises or is one or several of the following group: sugar beet, spinach beet, Swiss chard, beetroot, mangelwurzel, potato. Plant material can be a small or large part of a plant material portion, in particular a part of a plant material portion that is used for production processes and/or breeding processes. Plant material can comprise or consist of one or several parts of a plant. Plant material can for example comprise or consist of a leaf or a part thereof, in particular a stamped-out part of a leaf. Plant material can for example comprise or consist of several leaves or parts thereof, in particular a stamped-out parts of several leaves.

Preferably, receiving plant material is conducted by receiving a truckload of plant material and/or a container of plant material and/or a goods wagon of plant material and/or an amount of plant material from a plot for breeding processes and/or an amount of plant material for field trail and/or plant material of a green house.

Preferably, the electromagnetic waves that are emitted the plant material lie within the infrared spectrum (0.7 μm-1000 μm) and/or in the microwave region (2 $cm^{-1}$-130 $cm^{-1}$) and/or in the visible spectrum (380 nm-750 nm) and/or in the ultraviolet spectrum. (10 nm-380 nm)

Preferably, the spectral signal is converted by using spectroscopy, in particular near-infrared spectroscopy (NIRS) mid-infrared spectroscopy and/or far-infrared spectroscopy and/or terahertz spectroscopy and/or ultraviolet-visible spectroscopy (UV-Vis) and/or Raman spectroscopy and/or laser-induced breakdown spectroscopy (LIBS) and/or fluorescent spectroscopy, and/or images as well as hyperspectral images and/or combination of images and/or hyperspectral images with spectroscopy methods and/or combinations of different spectroscopic methods and/or fluorescence imaging.

Preferably, the electromagnetic waves are reflected from the plant material and the reflected electromagnetic waves are received, in particular with a sensor that is adapted to receive electromagnetic waves. Preferably, the electromagnetic waves are reflected from the plant material, or a part thereof. The electromagnetic waves can also be, at least partly, emitted through the plant material and the electromagnetic waves can be received, in particular with a sensor that is adapted to receive electromagnetic waves. Preferably, the electromagnetic waves are emitted through the plant material, or a part thereof.

Preferably, the received electromagnetic waves are converted into a spectral signal, wherein the spectral signal is generated dependent on the received electromagnetic waves.

Preferably, the method comprises processing the spectral signal for determining plant diseases in the plant material. Processing the spectral signal for determining plant diseases in the plant material can be carried out to determine plant diseases in the plant material or at least in a part of the plant material. Preferably, plant diseases are determined dependent on the spectral signal, in particular dependent on information of the spectral signal.

Plant diseases can for example be determined in sugar beets. Preferably, determining plant diseases comprises determining if one or several of the following plant diseases, in particular sugar beet diseases, are present in the plant material and/or determining an infestation rate of one or several of the following plant diseases, in particular sugar beet diseases:

Rhizomania,
Beet soil-borne virus infection,
Beet mild yellowing virus infection,
*Aphanomyces* root rot,
*Rhizoctonia* root and crown rot,
Violet root rot,
*Phymatotrichum* root rot,
*Phytophthora* root rot,
*Pythium* root rot,
*Phoma* root rot,
Beet vascular necrosis and rot,
Crown gall,
Scab,
Syndrome basses richesse,
Pest infestation, caused by one or several of the following group: wireworm, cutworm, moth, aphid, pygmy mangold beetle, silver Y moth, spotted snake millipede, beet weevil, tortoise beetle, flea beetle, cicada, moth species, cockchafer, crane fly, springtail, darkling beetle, beet fly, beet leafminer, beet moth, garden or glass house symphylid, springtail, southern sugar beet weevil, true weevil, *Lixus subtilis* Sturm, *Lygus*, bright-line brown-eye, African cotton, leafworm, grey beet weevil, two-spotted spider mite, *thrips*.

Preferably, determining plant diseases and pest infestations comprises determining if one or several of the plant diseases and pest infestations shown in the following table, in particular sugar beet diseases, are present in the plant material and/or induced a change in the plant material and/or determining an infestation rate of one or several of the following plant diseases, in particular sugar beet diseases:

| Common name of disease | Causal organisms |
|---|---|
| Bacteria and Rickettsia | |
| Bacterial vascular necrosis and rot | *Pectobacterium carotovorum* supsp. *betavascu-lorum* |
| Bacterial leaf spot | *Pseudomonas syringae* p.v. *aptata* |
| Yellow wilt | *Phytoplasma* (rickettsia-like organism) |
| Syndrome des Basses Richesses (SBR) | Stolbur phytoplasma and proteobacterium |
| Beet latent rosette | Rickettsia-like organism |
| Beet scab | *Streptomyces scabies* |
| Soft rot | *Pectobacterium carotovora* supsp. *carotovora* |
| Bacterial pocket | *Pantoea agglomerans* p.v. *betae* |
| Silvering disease | *Curtobacterium flaccumfaciens* p.v. *betae* |
| Crown gall | *Agrobacterium tumefaciens* |
| Fungi and Oomycetes | |
| Cercospora leaf spot | *Cercospora beticola* |
| Ramularia leaf spot | *Ramularia beticola* |
| Phoma leaf spot | *Phoma betae* |
| Alternaria blight | *Alternaria alternata* and *A. brassicae* |
| Rhizoctonia foliar blight | *Rhizcotonia solani* |
| Powdery mildew | *Erysiphe polygoni* (syn *E. betae*) |
| Downy mildew | *Peronospora farinosa* f. sp. *betae* |
| Beet tumor/Crown wart | *Physoderma leproides* |
| Beet rust | *Uromyces betae* |
| Gray mold/Botrytis blight | *Botrytis cinerea* |
| Aphanomyces seedling disease | *Aphanomyces cochlioides* |
| Rhizoctonia seedling disease | *Rhizoctonia solani* |
| Pythium seedling disease | *Pythium ultimum* and *P. aphanidermatum* |
| Phoma seedling disease | *Phoma betae* |
| Aphanomyces chronic root rot | *Aphanomyces cochlioides* |
| Charcoal rot | *Macrophomina phaseolina* |
| Fusarium yellows | *Fusarium oxysporum* f. sp. *betae* |
| Fusarium root rot | *Fusarium oxysporum* f. sp. *radicis-betae* |
| Phoma root rot | *Phoma betae* |
| Phytophthora root rot | *Phytophthora cryptogea* and *P. drechsleri* |
| Rhizoctonia root and crown rot | *Rhizcotonia solani* |
| Violet root rot | *Helicobasidium brebissonii* |
| Rhizopus root rot | *Rhizopus stolonifer* and *R. oryzae* |
| Phymatotrichum root rot | *Phymatotrichum omnivorum* |
| Sclerotium root rot | *Sclerotium rolfsii* |
| Verticillium wilt | *Verticillium albo-atrum* and *V. dahliae* |

-continued

| Common name of disease | Causal organisms |
|---|---|
| Viruses | |
| Rhizomania | Beet necrotic yellow vein virus (BNYVV) |
| Beet soilborne mosaic virus | Beet soilborne mosaic virus (BSBMV) |
| Beet soilborne virus | Beet soilborne virus (BSBV) |
| Beet virus Q | Beet virus Q (BVQ) |
| Beet yellows virus | Beet yellows virus (BYV) |
| Beet western yellows virus | Beet western yellows virus (BWYV) |
| Beet chlorosis virus | Beet chlorosis virus (BChV) |
| Beet mild yellowing virus | Beet mild yellowing virus (BMYV) |
| Beet yellow stunt | Beet yellow stunt (BYSV) |
| Beet curly top | Beet curly top virus (BCTV) |
| Cucumber mosaic virus | Cucumber mosaic virus (CMV) |
| Beet mosaic | Beet mosaic virus (BtMV) |
| Sugar beet leaf curl | Beet leaf curl virus (BLCV) |
| Lettuce infectious yellows | Lettuce infectious yellows virus (LIYV) |
| Beet yellow blotch | Tobaco rattle virus (TRV) |
| Beet yellow net disease | Beet yellow net virus (BYNV) |
| Nematodes | |
| Sugar beet cyst nematode | *Heterodera schachtii* |
| Root-knot nematodes | *Meloidogyne* spp. |
| False root-knot nematodes | *Nacobbus* spp. |
| Stem and bulb nematode | *Ditylenchus dipsaci* |
| Clover/yellow cyst nematode | *Heterodera trifolii* |
| Stubby-root nematodes | *Trichodorus* spp. |
| Needle nematodes | *Longidorus* spp. |
| Insects and arthropod pests | |
| Sugar beet root maggot | *Tetanops myopaeformis* |
| Palestriped flea beetle | *Systena blanda* |
| Beet carrion beetle | *Aclypea* spp. |
| Beet flea beetles | *Chaetocnema* spp., *Phyllotetra* spp., *Epitrix* spp. |
| Tortoise beetle | *Cassida* spp. |
| Wireworms | *Agriotes* spp. |
| White grubs | *Phyllophaga* spp. |
| Cockchafer/chafer grubs | *Melolontha* spp. |
| Symphylids | *Scutigurella immaculata* |
| Millipedes | *Blaniulus gutulatus* |
| marsh cranefly/leatherjacket | *Tipula paludosa* |
| Pigmy mangold beetle | *Atomaria linearis* |
| Green peach aphid | *Myzus persicae* |
| Black bean aphid | *Aphis fabae* |
| Sugar beet root aphid | *Pemphigus betae* |
| Slugs | *Deroceras reticulatum, D. agreste* |
| Bugs | *Piesma quadrata* |
| Lygus bugs | *Lygus* spp., *Calocoris* spp., *Dolycoris* spp., *Meso-cerus* spp. |
| Springtails | *Onychiurus armatus*, *O. fimatus*, *O. campatus* |
| Sugar beet crown borer | *Hulstia undulatella* |
| Beet petiole borer | *Cosmobaris americana* |
| Webworms | *Loxostege* spp. |
| Army cutworm | *Euxoa auxiliaris* |
| Pale western cutworm | *Agrotis orthogonia* |
| Beet armyworm | *Spodoptera exigua* |
| Fall armyworm | *Spodoptera frugiperda* |
| Beet moth | *Scrobipalpa ocellatella* |
| Silver Y moth | *Autographa gamma* |
| Cabbage moth | *Mamestra brassicae* |
| Springtails | *Bourletiella hortensis* |
| Grasshoppers | *Melaoplus* spp. |
| Leaf-feeding weevil | *Tanymecus confusus* and *T. palliatus* |
| Beet root weevil | *Bothynoderes punctiventris* |
| Beet weevil | *Conorhynchus medicus* |
| Beet lixus | *Lixus juncii* |
| Beet leaf miner | *Pegomya betae* and *P. hyoscyami* |
| Spider mites | *Tetranychus urticae* |
| Beet leaf hopper | *Circulifer tenellus* |
| Yellow leaf hopper | *Paratanus exitiosus* |
| Whitefly | *Bemisia tabaci* |

Plant diseases can for example be determined in potatoes. Preferably, determining if one or several of the following plant diseases, in particular potato diseases, are present in the plant material, and/or determining an infestation rate of one or several of the following plant diseases, in particular potato diseases:

- Black dot (*Colletotrichum coccodes*),
- Black scurf (*Rhizoctonia solani*) and/or stem canker that can be observed on the stem of the plant material and/or the leaf roll of the plant material,
- Common scab (*Streptomyces* scabies),
- Corky ring spot (Tobacco rattle virus [TRV]), in particular spread by soilborne nematodes as a vector,
- Dry rot and skin stain symptoms (*Fusarium* spp.),
- Early blight (*Alternaria solani* and *Alternaria alternata*),
- Gangrene (*Phoma exigua* var. *foveta*),
- Late blight (*Phytophthora infestans*),
- Leaf roll (Potato Leaf Roll Virus [PLRV]), wherein in particular this virus also renders the plant more susceptible to *Rhizoctonia solani,*
- Leaf drop streak, rugose mosaic (Potato Virus Y [PVY]),
- Mop Top (Potato Mop Top Virus [PMTV]),
- Pink eye (unknown causal agent, thought to be bacterial),
- Pink Rot (*Phytophthora erythroseptica*),
- Powdery scab (*Spongospora subterranea*),
- *Pythium* Leak (*Pythium* spp.),
- Ring rot (*Clavibacter michiganensis* subsp. *sepedonicus*),
- Silver scurf (*Helminthosporium solani*),
- Skin spot (*Polyscytalum pustulans*),
- Soft rot (*Erwinia carotovora* subsp. *atroseptica*), wherein in particular this pathogen can cause blackleg, which is observed in the stem and leaves of the plant material,
- Spraing (Tobacco Rattle Virus [TRV]),
- Wart disease (*Synchytrium endobioticum*),
- Zebra chip (Candidatus Liberibacter *solanacearum*),
- Root knot nematode (*Meloidogyne* spp. [nematode]),
- Root lesion nematode (*Pratylenchus penetrans* [nematode]),
- Potato cyst nematode (*Globodera* spp. [nematode]),
- Potato rot nematode (*Ditylenchus* destructor [nematode]),
- Tuberworm (*Phthorimaea operculella* [moth larvae]),
- Wireworm (*Limonius* spp., *Agriotes* spp. and *Ctenicera* spp. [beetle larvae]).

Physiological changes in root crops due to growing or storage condition as well as stress can be also detected according to the present invention. Such changes include in particular:

- Black heart, in particular caused by lack of oxygen during storage which can cause the tissue to die from the inside out and turn black,
- Brown center, wherein in particular an area of dead pith cells can turn brown and can be caused by very wet conditions,
- Elephant hide, wherein in particular rough or thick skin can be present and can be caused by high temperatures, soil fertility, soil moisture, and/or chemical treatments,
- Greening, wherein in particular tubers turning green due to exposure to light,
- Growth cracks, wherein in particular cracks in the skin can be caused by environmental stress, nutritional imbalance, disease, and/or herbicide injury,
- Hollow heart, wherin in particular a star- or lens-shaped hollow area in the centre of the tuber can be caused by uneven amounts of moisture during tuber development or a combination of other environmental factors,
- Jelly/sugar end, wherein in particular physiological condition can be caused by high temperatures and/or moisture stress during tuber development, which can result in pointed and shrivelled stem end of the tuber.

Physiological properties influenceable by environmental stress in plant material is preferably understood to be physiological properties changeable by and/or affectable by environmental stress in plant material.

Preferably, physiological properties influenceable by environmental stress in plant material is understood to be physiological properties changed by and/or affected by environmental stress in plant material. Physiological properties changed by and/or affected by environmental stress in plant material are in particular understood to be physiological properties of the plant material, wherein the physiological properties have been changed and/or affected by environmental stress.

Physiological properties influenceable by environmental stress in plant material can in particular be changed by one or several influences of the following list:

- abiotic stress conditions, such as drought, salinity, heat, cold, frost, UV, wind, soil hardiness, nutrient limitations or overdose (e.g. N, K, P, Na, Mg, ect. Macro- and Micro-nutrients),
- pH value of the soil,
- soil contamination, for example with heavy metals,
- Beneficial organisms: Biologicals,
- Herbicide-induced changes (e.g. Conviso, Glyphosate ect.)
- Agrochemical-induced changes (Fungicides, pesticides, Insecticides, adjuvants)
- Agricultural practices induced changes (damage from non-chemical weed control; damage from agricultural machinery, harvesting damages (e.g. topping),
- storage damages,
- presence of plants in specific developmental conditions (e.g. bolters).

The method steps can be carried out in an order that deviates from the listed order. However, it is preferred if the method steps are carried out in the listed order, in particular one after the other.

The solution described herein has the advantage that spectroscopy has the potential to predict plant biochemical constituents such as nutrients and secondary metabolites, indicative of biotic stress, such as plant diseases. Therefore, using spectroscopy, plant diseases can reliably be determined and/or detected in an automated manner. Spectroscopy is particularly advantageous, as infected plant material can have a different spectral information than healthy plant material. The symptoms and stress caused by the pathogens as well as by insects and/or environmental stress factors can change pigmentation, alter surface temperature, and/or change in metabolites or metabolite contents. For example, sugar beets can be susceptible to a number of different viruses that can be transmitted by insects, fungi, nematodes, seed and/or physical contact. All these viruses may decrease the potential yield of the root crop and for example can affect the extractability of sugar within a sugar production process.

Furthermore, the solution described herein has the advantage that some plant diseases can only or more accurately be determined and/or detected in specific parts of the plant material and with the solution described herein it is possible to analyse specific parts of the plant material, such as for example leaves that are part of the plant material.

Furthermore, the solution described herein has the advantage that from determining diseases and/or physiological properties influenceable by environmental stress further important information can be derived, for example on storage loss of components in the plant material. For example, sugar beets with plant diseases can have a higher loss in sugar content and/or a bad storability behaviour compared to sugar beets without plant diseases. Furthermore, plant diseases can have an influence on the consistency of the plant material. This can lead to problems during chopping and/or slicing of plant material. By gaining such further information, further steps, such as steps in a production processes, agronomic practices or breeding processes can be improved.

In addition, it is an advantage of the method described herein that actions can be undertaken based on the information obtained, including for example:

- optimizing growth conditions,
- choosing the right varieties for the local conditions,
- improving agricultural practices,
- improving storage conditions,
- improving breeding based on such conditions,
- adjusting processes in a production factory,
- improving production factory conditions,
- improving growing conditions.

According to a preferred embodiment, the method comprises generating calibration data, including taking a sample of plant material, preferably with and/or without plant diseases and/or with and/or without physiological properties influenceable by environmental stress, and preferably moving the sample along a sensor that is adapted to receive electromagnetic waves, calibration analysis of the plant material by evaluating plant diseases in the plant material, for example by visual scoring of a plant disease and/or by analysis of metabolites and/or components present in the plant material, spectroscopic analysis of the sample by, preferably continuously, emitting electromagnetic waves towards the sample, receiving electromagnetic waves, and converting the received electromagnetic waves into a spectral signal, and comparing the results of the spectroscopic analysis with the results of the calibration analysis.

The sample of plant material can for example comprise of 10 kg or 20 kg or 30 kg of plant material. Other amounts of plant material can also be used. Preferably, receiving electromagnetic waves can be understood as receiving electromagnetic waves that are reflected from and/or transmitted through and/or emitted by the sample. Calibration analysis can comprise at least one or several measurements, such as for example visual scoring, wherein the at least one measurement can be conducted on the plant material.

Preferably, by comparing the results obtained from the spectroscopic analysis with the results obtained from the calibration analysis, calibration data can be generated, Visual scoring of plant disease can also be conducted on plant material such as crops in the fields before sampling, in particular for leaf infection by *Cercospora*.

Preferably the spectroscopic analysis is carried out continuously. Preferably, calibration data is generated by repeatedly taking samples and conducting spectroscopic analyses of the samples. Preferably, calibration data is generated by repeatedly comparing results of spectroscopic analyses with results from calibration analyses. It is preferred if this procedure is repeated several times, in particular more than 100 times, preferably more than 1000 times. Preferably, this procedure conducted on plant material with different plant diseases and/or on plant material with different plant material conditions, such as on relatively wet plant material, on relatively dry plant material, on plant material with varying components and/or ingredients.

Generating calibration data can also be carried out in a static process, wherein the sample of plant material is not moved along a sensor. Preferably, within such a static process, the sample is located at a defined position, in particular under and/or over a sensor that is adapted to receive electromagnetic waves.

An advantage of generating calibration data in the described way is that the calibration data can be used for reliably determining plant diseases in plant material even for plant material with different components and/or properties and/or with different conditions.

Preferably, generating calibration data comprises developing and/or optimising and/or validating a calibration model, wherein developing and/or optimising and/or validating the calibration model comprises generating a calibration set, a cross-validation set, and an independent validation set. Preferably, the calibration set comprises results obtained from spectroscopic analysis of a first part of the sample of plant material. Preferably, the cross-validation set comprises results obtained from spectroscopic analysis of a second part of the sample of plant material. Preferably, the independent validation set comprises results obtained from spectroscopic analysis of a third part of the sample of plant material. It is preferred if the first part, the second part, and the third part of the sample are parts of different and independent samples of plant material. The calibration model can be generated from the calibration set. The cross-validation set can be used for developing, in particular improving, the calibration model. The independent validation set can be used for validating the calibration model. It is preferable that the independent validation set is not used for changing and/or developing the calibration model. However, it is also possible to use examples from the independent validation set for extending or improving calibration.

According to a preferred embodiment, the method comprises comparing the spectral signal with calibration data and/or at least one reference value and dependent on the comparison determine presence and/or quantification and/or qualification of plant diseases and/or physiological properties influenceable by environmental stress in the plant material.

Preferably, a specific value, for example at a specific wavelength of a spectral signal can be compared with a reference value. Dependent on the characteristic reflectance spectrum based on the stress imposed on the plant (e.g. diseases) a comparison of the specific value with the reference value, it can be determined if plant diseases and/or physiological properties influenceable by environmental stress are present in the plant material. The spectral signal can be compared with calibration data and dependent on the comparison of the calibration data and the spectral signal, it can be determined if plant diseases and/or physiological properties influenceable by environmental stress are present in the plant material. The said reference value is understood by a person skilled in the art, e.g. a value generated based on qualitative and/or quantitative component analysis and/or scoring analysis and/or rating numbers and/or climatic data of samples of plant material. The qualitative and quantitative method include visual rating, such as detection by an imaging system. For example, image analysis technologies can pave the way for an agile systems biology approach to create a reference value or values, and the combination of feature selection and growth modelling may be used in supporting the biological interpretation of plant growth, physiological changes, and stress tolerance.

It is further preferred, if the comparison of the spectral signal with the calibration data and/or the at least one reference value can be used to determine the presence of plant diseases and/or physiological properties influenceable by environmental stress in the plant material. It is further preferred, if the comparison of the spectral signal with the calibration data and/or the at least one reference value can be used to determine the quantification of plant diseases and/or physiological properties influenceable by environmental stress in the plant material, in particular the number of plant diseases and/or the intensity of the one or more plant diseases present in the plant material and/or the intensity of environmental factors. It is further preferred, if the comparison of the spectral signal with the calibration data and/or the at least one reference value can be used to conduct a qualification of plant diseases or environmental factors in the plant material, in particular by determining a severity and/or a class of the plant diseases or class of environmental stress factors present in the plant material.

It is particularly advantageous to use calibration data and/or reference values for this comparison, as in such a way, plant diseases and/or environmental influences can be determined in an automated and reliable way.

According to a further preferred embodiment, generating calibration data and/or generating at least one reference value comprises conducting a plurality of reference spectral signals, wherein preferably the plurality of reference spectral signals is converted from electromagnetic waves reflected from and/or transmitted through plant material without plant diseases and/or plant material with plant diseases and/or plant material from different environmental regions, or at least a part thereof.

Preferably, the calibration data is derived using multiple and/or multivariate and/or linear regression analysis, and/or wherein the calibration data is derived from multivariate analysis including spectral preprocessing preferably by differentiating the spectral signals using mathematical classification options and/or filtering, in particular using mathematical filtering methods, and/or averaging spectral signals to one spectral signal, and/or carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks.

Preferably, the spectral signal is classified into a classification of infestation classes and/or different plant diseases and/or metabolites. In such a way, it is possible to classify plant diseases and environmental stress factors that are present in the plant material from information in the spectral signal.

According to a preferred embodiment of the method, determining plant diseases and/or physiological properties influenceable by environmental stress in the plant material comprises processing the spectral signal for determining plant diseases and/or physiological properties influenceable by environmental stress in the plant material, and/or wherein processing the spectral signal and/or generating calibration data comprises one or several of the following steps: preprocessing the spectral signal for correcting and/or eliminating overlaying effects, wherein preferably preprocessing is conducted using Standard Normal Variate (SNV) and/or multiplicative scatter correction (MSC), and/or first derivatives, and/or second derivatives, and/or smoothing and/or a combination of Derivative and SNV, wherein preferably preprocessing is conducted before multiple and/or multivariate and/or linear regression analysis is carried out, and/or removing spectral signals that are not converted from electromagnetic waves reflected from and/or emitted through the plant material, preferably by differentiating the spectral signals using classification and/or filtering, in particular using mathematical filtering methods and/or averaging spectral signals to one spectral signal.

According to a more preferred embodiment of the method, determining plant diseases and/or physiological properties influenceable by environmental stress in the plant material comprises processing the spectral signal for determining plant diseases and/or physiological properties influenceable by environmental stress in the plant material, and/or wherein processing the spectral signal and/or generating calibration data comprises one or several of the following steps:

preprocessing the spectral signal for correcting and/or eliminating overlaying effects, wherein preferably preprocessing is conducted using Standard Normal Variate (SNV) and/or multiplicative scatter correction (MSC), and/or first derivatives, and/or second derivatives, and/or smoothing, and/or combination of Derivative and SNV, wherein preferably preprocessing is conducted before multiple and/or multivariate and/or linear regression analysis is carried out, and/or Classification as a learning method that classifies data into one of numerous already defined definite classes. This requires pre-allocation of training data in order to classify unknown data, thus classification is a so-called supervised learning method. Relevant algorithms for supervised learning are K-nearest Neighbor (kNN), Decision Trees/Random Forest, Support Vector Machines (SVM), Discriminant Analysis (PLS-DA), Soft independent modelling by class analogy (SIMCA), Naive Bayes (NB) as well as classifiers based on neural network and machine learning and/or Clustering as an unsupervised technique and suited to explore unknown data. Clustering algorithms map or group the input data into clusters according to similarities between them. Such grouping occurs by density-based, hierarchical-based, partitioning or grid-based methods but can also be achieved by machine learning or deep learning approaches. Common algorithms are K-means, mean shift, Gaussian Mixture, hidden Markov model (HMM) and Density-Based Spatial Clustering of Applications with Noise (DBSCAN).

removing spectral signals that are not converted from electromagnetic waves that are reflected from or emitted through the plant material, preferably by differentiating the spectral signals using classification and/or filtering, in particular using mathematical filtering methods, and/or averaging spectral signals to one spectral signal.

An advantage of such a preprocessing is that the spectral signal can be corrected and failures in recorded spectral signals do not lead to poor or wrong results. If unwanted overlaying effects are present in the recorded spectral signals, these effects can be eliminated by using such a preprocessing.

Multiplicative scatter correction (MSC) is a standard normalization technique that aims to correct spectral signals in such a way that they are as close as possible to a reference spectrum, generally the mean of the data set, by changing the scale and the offset of the spectral signals.

Calculating the first derivatives and/or the second derivatives can also be used for preprocessing the obtained spectral signals.

Regression analysis is a set of statistical processes for estimating the relationships between a dependent variable, which is often called the 'outcome variable', and one or more independent variables, which is often called 'predictors', 'covariates', or 'features'. The most common form of regression analysis is linear regression, in which a line or a more complex linear combination is determined, wherein the line most closely fits the data according to a specific mathematical criterion.

Averaging spectral signals to one spectral signal can be conducted by averaging several spectral signals obtained during generating calibration data to one spectral signal that shows an average of the several spectral signals.

According to a further preferred embodiment, the method comprises: detecting metabolites and/or components of the plant material and/or determining sugar beet diseases in the plant material. A metabolite is in particular understood to be an intermediate or end product of metabolism.

According to a further preferred embodiment, the method comprises chopping and/or slicing the plant material into plant material pieces, and/or homogeneously distributing the plant material onto a transport device, preferably with a roller that is arranged above the transport device, and/or adjusting the plant material, in particular by adjusting the height of the plant material and/or by compressing the plant material and/or by smoothing the surface of the plant material, preferably with the roller.

Preferably, chopping the plant material into plant material pieces is conducted by cutting and/or crumbling the plant material into plant material pieces. After chopping the plant material into plant material pieces, the plant material pieces can still be referred to as plant material. Preferably, slicing the plant material into plant material pieces is conducted by slicing and/or cutting the plant material into plant material pieces. After slicing the plant material pieces, the plant material pieces can still be referred to as plant material.

Preferably conveying the plant material using the transport device is conducted along a transport direction, wherein a stream of the plant material is generated. Preferably, the stream of the plant material moves along the transport direction.

Preferably, the transport device is understood to be a device for conveying plant material. The transport device can be adapted to convey the plant material. Preferably, the transport device comprises a conveyor belt.

According to a further preferred embodiment, the method comprises arranging the, preferably homogeneously distributed, plant material onto a transport device, and/or conveying the plant material using the transport device, wherein preferably the plant material is conveyed towards a sensor, wherein the sensor is adapted to receive electromagnetic waves.

Preferably, the electromagnetic waves that are emitted towards the plant material lie within the infrared spectrum, in particular in the near-infrared spectrum, and/or in the visible spectrum and/or in the ultraviolet spectrum. Preferably, the electromagnetic waves have at least one wavelength, wherein the wavelength of the electromagnetic waves lies in the range of 10 nm to 3,000,000 nm, in particular in the range of 780 nm to 2500 nm, 10 preferably in the range of 850 nm to 1650 nm. Preferably, the spectral signal is converted by using spectroscopy, in particular near infrared spectroscopy and/or mid-infrared spectroscopy and/or far infrared-spectroscopy and/or terahertz spectroscopy and/or microwave-spectroscopy and/or ultraviolet-visible spectroscopy (UV-Vis) and/or Raman spectroscopy and/or laser-induced breakdown spectroscopy (LIBS), and or hyperspectral images, and/or fluorescence images and/or combination of hyperspectral images with spectroscopy methods and/or combinations of different spectroscopic methods.

Preferably, the electromagnetic waves are reflected from and/or emitted through the plant material that is arranged on the transport device. Preferably, the electromagnetic waves are received, in particular with a sensor that is adapted to receive electromagnetic waves. Preferably, the electromagnetic waves are reflected from and/or emitted through the plant material. Preferably, the received electromagnetic waves are converted into a spectral signal, wherein the spectral signal is generated dependent on the received electromagnetic waves.

According to a further preferred embodiment, the method comprises continuously recording received electromagnetic waves, and/or continuously converting the received electromagnetic waves into spectral signals.

Continuously recording received electromagnetic waves is particularly advantageous, as in such a way the method described herein can be applied onto continuous processes, such as for example continuous processes within a sugar production factory in which sugar beet pieces are continuously conveyed on a conveyor belt.

Continuously converting the received electromagnetic waves into spectral signals is particularly advantageous, as in such a way the method described herein can be applied onto continuous processes, such as for example continuous processes within a sugar production factory in which sugar beet pieces are continuously conveyed on a conveyor belt.

According to a preferred embodiment of the method, while emitting electromagnetic waves towards the plant material the plant material is arranged on the transport device and/or conveyed using the transport device, and/or wherein the wavelength of the electromagnetic waves lies in the ultraviolet (UV) spectrum and/or in the visible spectrum and/or in the infrared spectrum and/or in the microwave spectrum and/or in the terahertz-spectrum, wherein preferably the wavelength of the electromagnetic waves lies in the range of 10 nm to 3000 μm.

According to a preferred embodiment of the method, the electromagnetic waves are received from at least one spectrometer and/or at least one spectrophotometer.

Preferably, the at least one spectrometer and/or the at least one spectrophotometer are preferably of the following group: ultraviolet-visible (UV/Vis) spectrophotometer, near-infrared (NIR) spectrometer, Raman spectrometer. Near infrared spectroscopy and/or mid-infrared spectroscopy and/or far infrared spectroscopy and/or terahertz spectroscopy and/or microwave spectroscopy and/or ultraviolet-visible spectroscopy (UV-Vis) and/or Raman spectroscopy and/or laser-induced breakdown spectroscopy (LIBS), and or hyperspectral images and/or combination of hyperspectral images with spectroscopy methods and/or combinations of different spectroscopic methods According to a preferred embodiment of the method, chopping the plant material into plant material pieces is conducted using a chopping device, wherein the chopping device is configured to cut and/or crumble the plant material into substantially equal sized plant material pieces and/or wherein slicing the plant material into plant material pieces is conducted using a slicing device, wherein the slicing device is configured to cut and/or slice the plant material into plant material pieces that are preferably formed as thin elongated strips and/or slices.

The plant material can be cut and/or crumbled with the chopping device and/or cut and/or sliced with the slicing device, wherein the chopping device and/or the slicing device comprises blades and/or knifes for cutting the plant material into plant material pieces. The plant material pieces can for example be formed as thin elongated strips, which are also often, and in particular in the sugar production industry, referred to as cossettes.

According to a preferred embodiment of the method, wherein the species of the plant material is a root crop and/or a tuber crop, in particular *Beta vulgaris* and/or *Solanum tuberosum*, or at least a part thereof, and/or wherein the plant material comprises or consists of sugar beets, and/or wherein the plant material is introduced to a production process for processing the plant material in a processing industry, and/or wherein the plant material is introduced to a breeding process.

The processing industry can for example be sugar production industry, potato processing industry or other plant processing industries. Breeding process is understood to be a plant breeding process, in particular for breeding the plant material.

According to a further preferred embodiment, the method comprises introducing plant material into a breeding process, and/or changing at least one breeding parameter, dependent on the determination of plant diseases in the plant material and/or physiological properties influenceable by environmental stress in the plant material. The breeding process could be changed e.g. by using results from the analysis with the method as described herein to select a plant that has increased resistance and/or tolerance to a particular stress condition. The breeding process could be changed e.g. by starting or strengthening a breeding program or weakening the input into a breeding program based on the information about the presence of stress conditions (e.g. diseases) revealed by the data gained from the spectroscopic analysis, e.g. if stress conditions are present in a specific number of economically important markets then it makes sense to invest more into the breeding. The breeding process could be changed e.g. by combining variety information (e.g. the genetic and/or genomic sequence of the varieties) with information about the detection of stress conditions (e.g. diseases), e.g. the data show that specific varieties/genotypes, with specific genomic sequences, have higher or lower levels of stress conditions (e.g. disease scoring based on the calibration) and the information is then used to select varieties/genotypes with the specific genomic sequences and introduce these specific genomic parts into other varieties/genotypes that lack these genomic parts.

Based on the data received from the spectroscopic analysis, the growth/cultivation conditions of the plants (field or glasshouse) could be improved in a way that reduces the stress condition for the plant. E.g.

- identifying locations that are prone to specific stress conditions (e.g. disease hotspots) and improving the yield or quality of the plants grown in these locations by selecting or recommending the right varieties that are adapted/tolerant/resistant for the stress conditions,
- improving agricultural practices in these locations (e.g. using agrochemicals such as pesticides/fungicides/biologicals to minimize disease pressure, specific soil preparations to reduce stress, watering of plants, applying nutrients, using specific farm equipment/technologies to reduce the stress condition, training of farmers, etc.),
- improving storage conditions,
- improving of transport conditions,
- improving seed preparations (e.g. adjusting seed coating with fungicide to increase fungal resistance), and/or
- adjusting crop rotation.

Based on the data received from the spectroscopic analysis and combined with the geographic location and other environmental information it can be possible to improve the carbon footprint (i.e., less CO2 emissions) of a product (e.g. sugar). This information may be revealed to the consumer and therefore increases the price for the plant/crop product. Based on the data received from the spectroscopic analysis and combined with the geographic location and other environmental information it can be possible to identify the cultivation conditions and increase the traceability of such information throughout the supply chain. This information may be revealed to the consumer and therefore increases the price for the plant/crop product.

The data received from the spectroscopic analysis and combined with the geographic location and other environmental information might be of value to certain stakeholders in the agricultural industry and/or food industry and/or insurance industry and/or data industry and/or political decision makers and/or legal entities and or any other stakeholders. Such information could be made available or be implemented by digital farming platforms and/or combined with other data to create additional value.

This method could improve marketing and sales for seed companies or agricultural suppliers by selecting or recommending the right varieties that are adapted/tolerant/resistant for the stress conditions.

According to a further preferred embodiment, the method comprises producing a product, preferably raw juice and/or sugar and/or starch, from the plant material, changing at least one sugar production parameter, in particular extraction parameters, and/or dosages of additives, and/or electric field pulses, and/or pulse numbers, and/or process temperature, and/or conveying speed and/or duration of plant material pieces in reactor and/or at least one drying process parameter, dependent on the determination of plant diseases and/or physiological properties influenceable by environmental stress in the plant material.

Preferably, raw juice is a product within a sugar production process, wherein sugar is produced from sugar beets. It is preferred to change at least one sugar production parameter dependent on the determination of plant diseases in the plant material, in particular because in such a way the sugar production process and in particular the sugar extraction can be improved. For example, the sugar extraction process for extracting sugar from sugar beet pieces can be adapted dependent on the determination of plant diseases in the sugar beets. Thus, the sugar extraction process can be adapted to the determined plant diseases that are currently in the sugar production process, which can for example lead to an improved sugar yield.

According to a further aspect, it is provided a method for generating calibration data for the determination of diseases in plant material and/or physiological properties influenceable by environmental stress in plant material, comprising taking a sample of plant material, preferably with or without plant diseases and/or with or without physiological properties influenceable by environmental stress, and preferably moving the sample along a sensor that is adapted to receive electromagnetic waves, calibration analysis of the plant material by evaluating plant diseases and/or physiological properties, in particular metabolites, influenceable by environmental stress in the plant material, for example by visual scoring and/or analysis of components and/or metabolism of a plant disease and/or physiological properties, in particular metabolites, influenceable by environmental stress present in the plant material, spectroscopic analysis of the sample by, preferably continuously, emitting electromagnetic waves towards the sample, receiving electromagnetic waves, and converting the received electromagnetic waves into a spectral signal, comparing the results of the spectroscopic analysis with the results of the calibration analysis.

According to a further aspect, it is provided an analysis assembly for detecting plant diseases in plant material and/or physiological properties influenceable by environmental stress in plant material, wherein the analysis assembly is arranged to emit electromagnetic waves towards plant material pieces, wherein the analysis assembly is arranged to receive reflected and/or emitted electromagnetic waves, wherein the analysis assembly is arranged to convert the received reflected electromagnetic waves into a spectral signal, wherein the analysis assembly is processing the spectral signal for determining plant diseases and/or physiological properties, in particular metabolites, influenceable by environmental stress in the plant material.

According to a further aspect, it is provided an arrangement for detecting plant diseases in plant material and/or physiological properties influenceable by environmental stress in plant material, the system comprising a receiving section for receiving plant material, a chopping device for chopping the plant material into plant material pieces, an analysis assembly described herein.

The receiving section can be a section and/or station for receiving plant material from transport vehicles, such as for example trucks and/or trains. The receiving section can be an inlet of the chopping device and/or slicing device, wherein the plant material is introduced to the chopping device and/or slicing through the inlet.

According to a further aspect, it is provided a control unit for controlling an analysis assembly as described herein and/or for receiving data from an analysis assembly as described herein and controlling at least one production parameter, in particular extraction parameters and/or dosages of additives, and/or electric field pulses and/or pulse numbers and/or process temperature and/or conveying speed and/or duration of plant material pieces in a reactor and/or at least one drying process parameter dependent on the determination of plant diseases in the plant material and/or physiological properties influenceable by environmental stress in the plant material.

The further aspects described above and their respective possible embodiments comprise features and/or method steps that are particularly suitable to be used with and/or connected with the method and its preferred embodiments described herein.

For the advantages, preferred embodiments, and details of the individual different aspects and their preferred embodiments, reference is also made to the description, and in particular to the described advantages, preferred embodiments, and details described with reference to the respective other aspects.

Further advantageous embodiments result from the combination of individual, several or all of the preferred features described herein.

Preferred embodiments shall now be described with reference to the attached drawings, in which FIG. 1: shows a schematic representation of an example of a method for analyzing a crop sample comprising a target plant material with soil tare adhered thereto;

FIG. 2*a*: shows a schematic representation of an example of a method for analyzing a crop sample comprising a target plant material with soil tare adhered thereto;

FIG. 2*b* shows a schematic representation of an example of a method for analyzing a crop sample comprising a target plant material with soil tare adhered thereto;

FIG. 3: shows a schematic representation of an example of a receiving section for receiving sugar beets and an analysis assembly for analyzing a crop sample comprising a target plant material with soil tare adhered thereto;

FIG. 4: shows an example of spectral signals obtained from using near-infrared spectroscopy on sugar beet pieces;

FIG. 5: shows a diagram with values obtained by near-infrared spectroscopy (NIRS) analysis of soil tare:

FIG. 6*a*: shows a diagram for calibration data with predicted values and reference values of percentage by mass of soil tare;

FIG. 6*b*: shows a diagram with absolute values of reference values shown in FIG. 6*a;*

FIG. 7: shows a schematic representation of an example of a method for determining first calibration data.

Figure 11A:
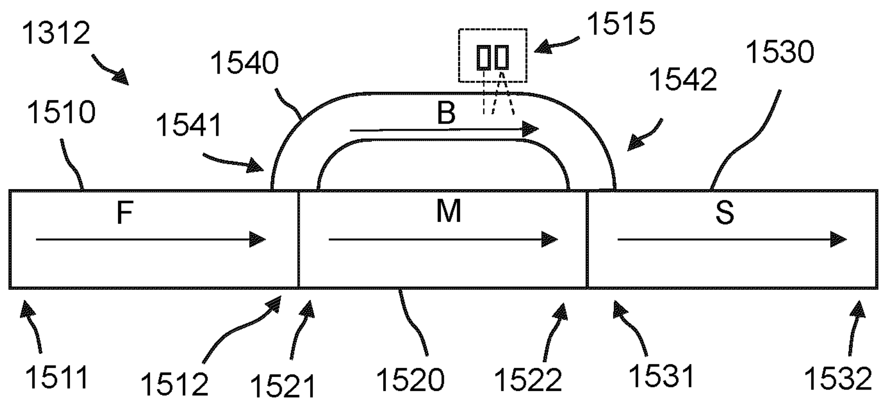
Figure 11B:
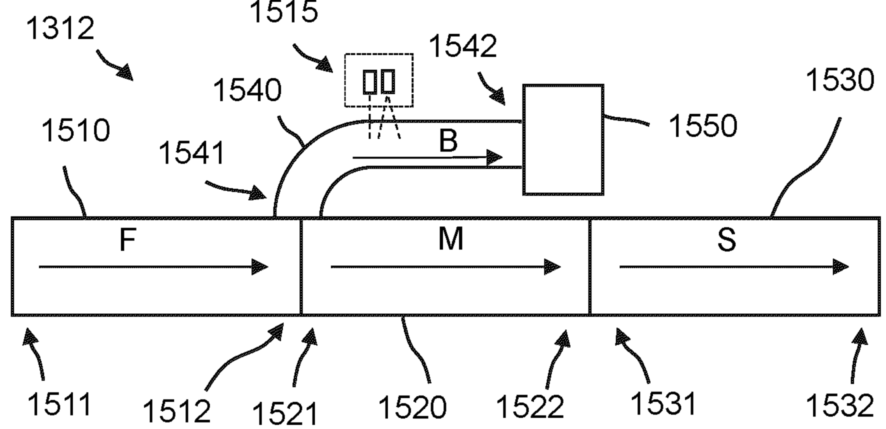
Figure 11C:
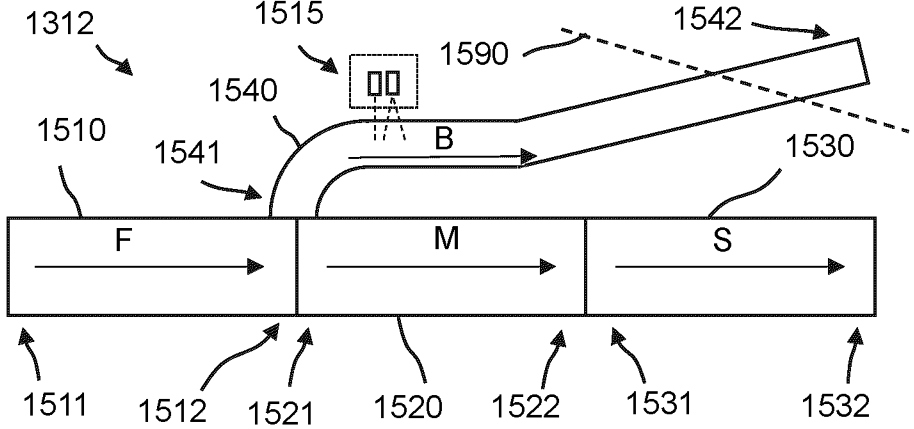
Figure 12:
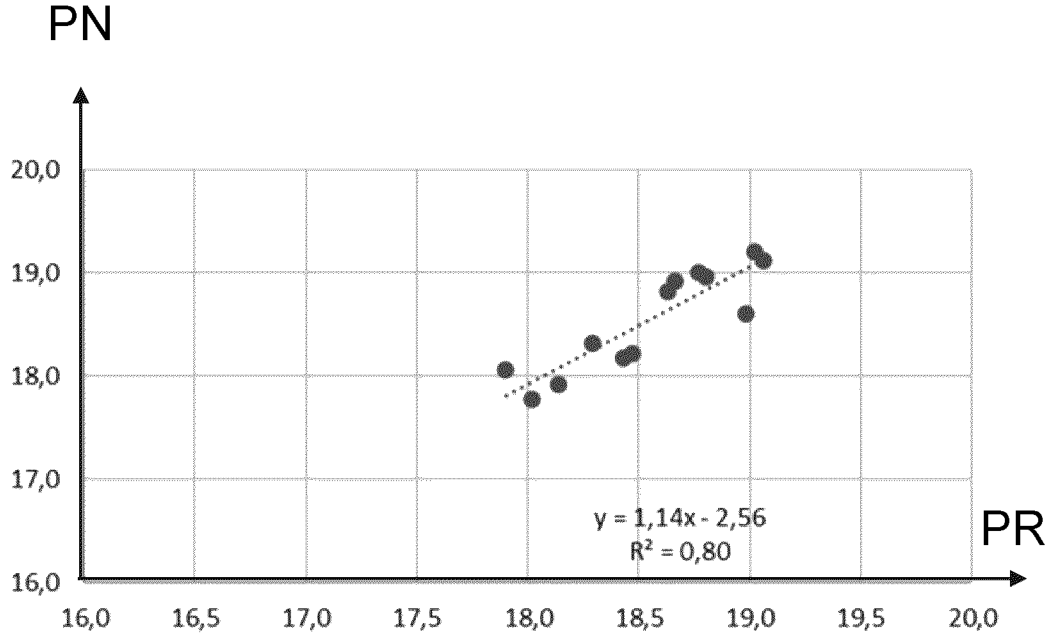
Figure 13:
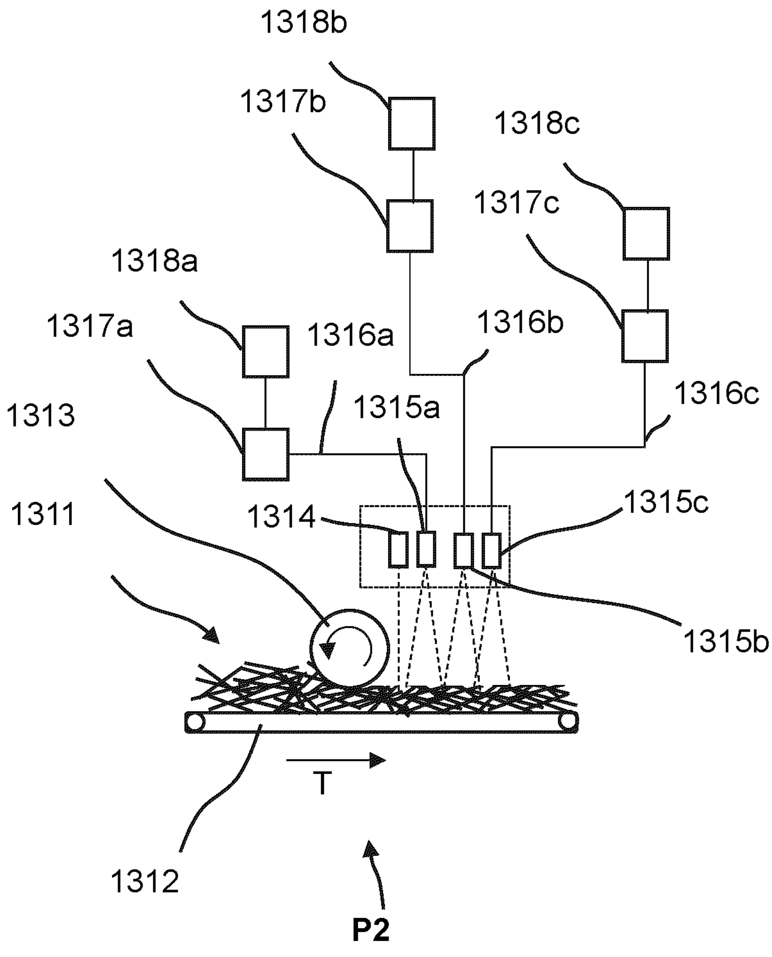
Figure 14:
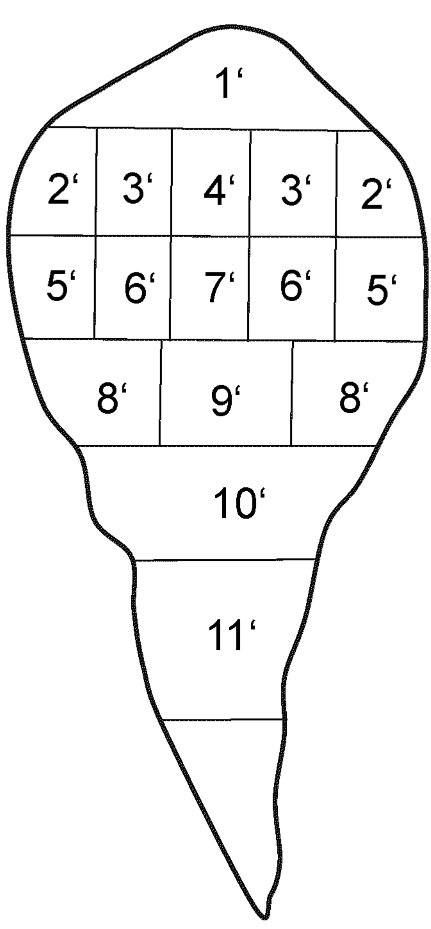
Figure 15:
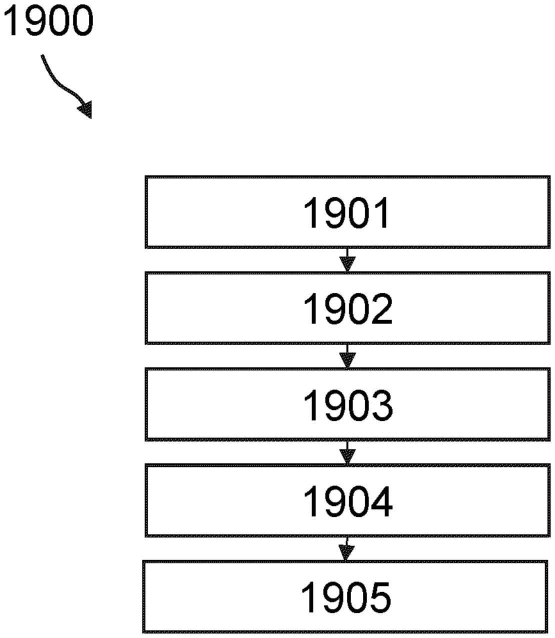

FIG. 11*a* shows a first example of a transport device in a sugar production facility with a bypass section;

FIG. 11*b* shows a second example of a transport device in a sugar production facility with a bypass section;

FIG. 11*c* shows a third example of a transport device in a sugar production facility with a bypass section;

FIG. 12 shows a diagram showing polarisation measured with near-infrared spectroscopy versus polarisation measured with reference method;

FIG. 13 shows a combination of different spectroscopy methods for component analysis;

FIG. 14 shows 11 segments of a sugar beet for investigating heterogeneity in sugar beets;

FIG. 15 shows a schematic representation of an example of a method for generating calibration data for the determination of components in sugar beets for sugar production.

Figure 16:
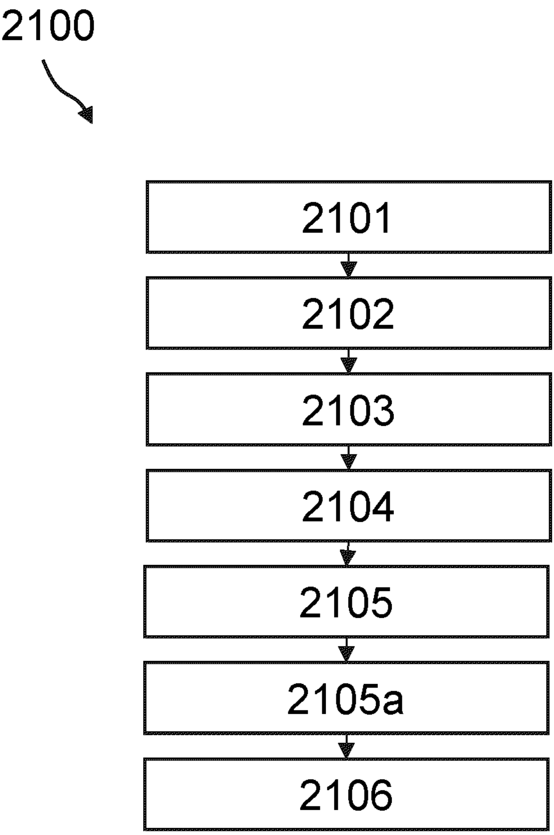
Figure 17:
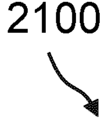
Figure 17:
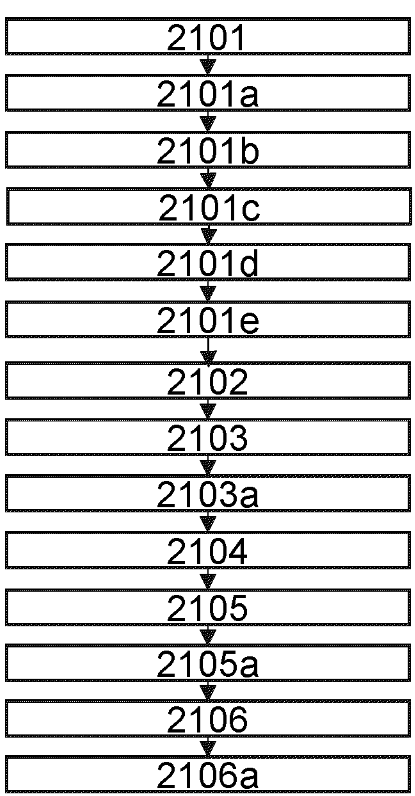
Figure 18:
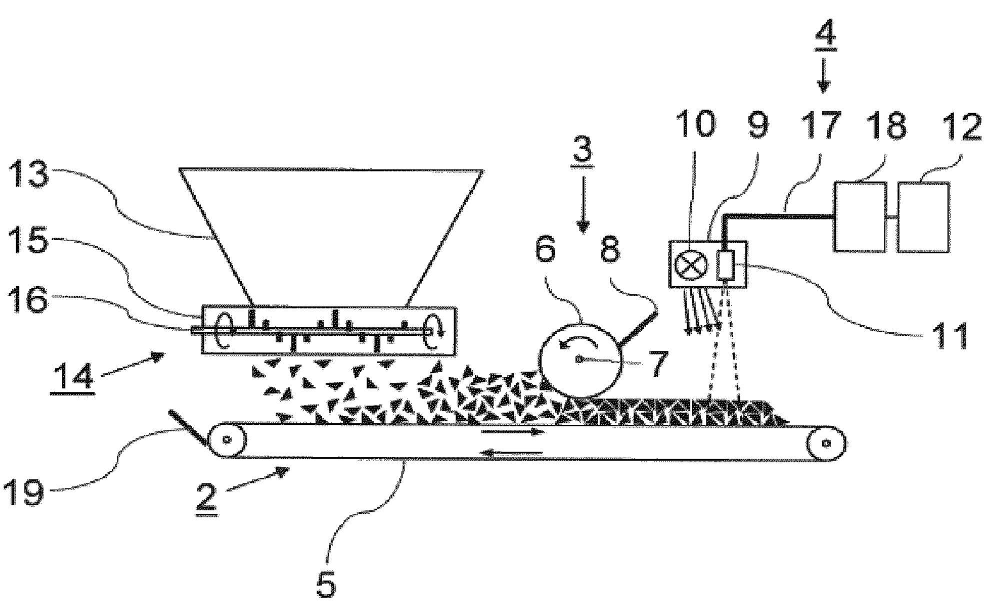
Figure 19:
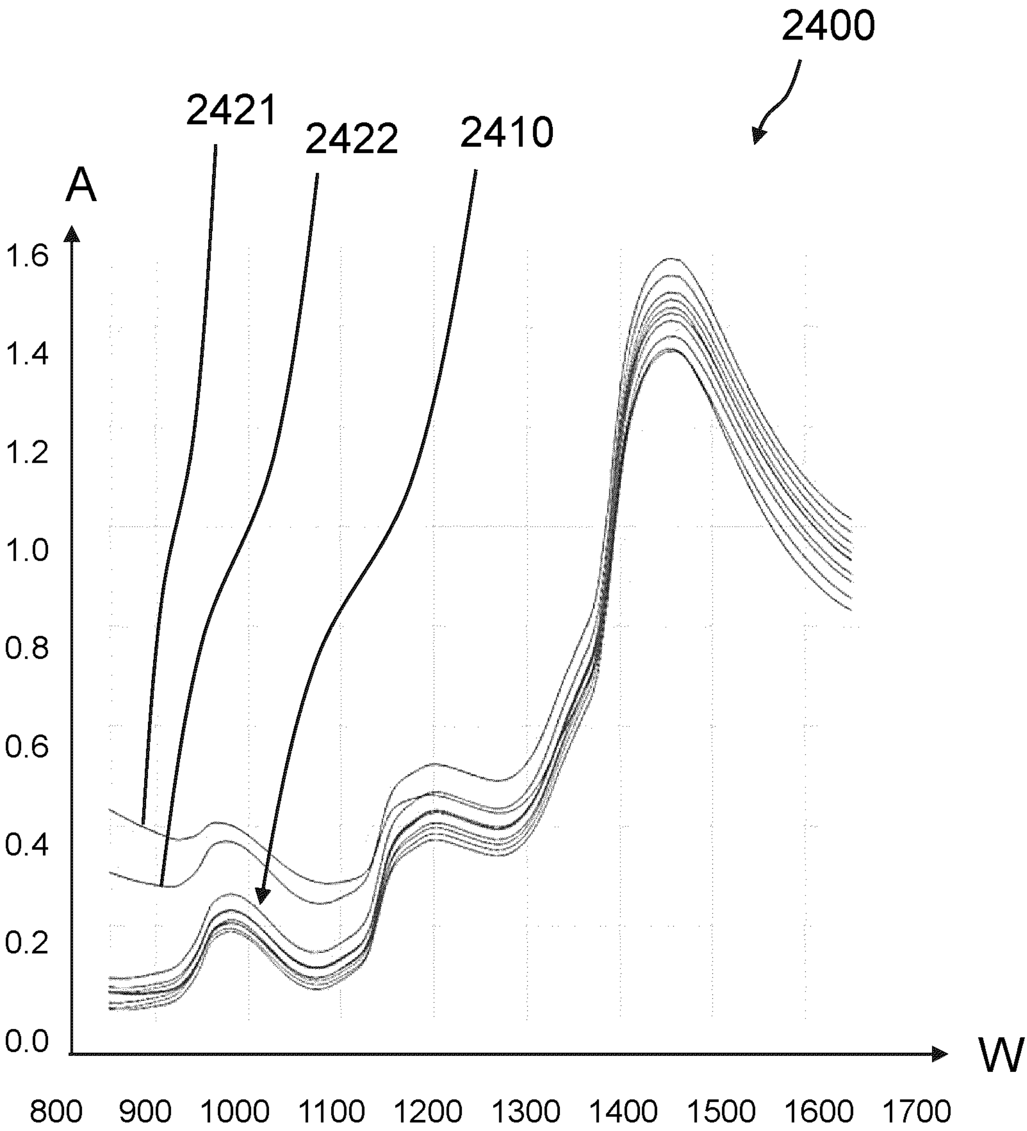
Figure 20:
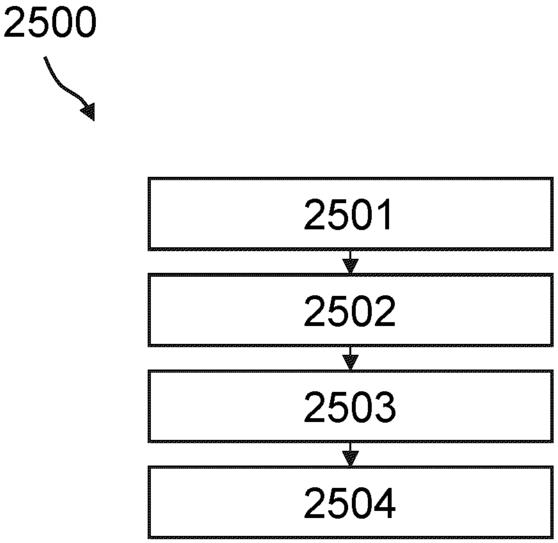

FIG. 16 shows a schematic representation of an example of a method for detecting plant diseases in plant material;

FIG. 17 shows a schematic representation of an example of a method for detecting plant diseases in plant material;

FIG. 18 shows an example of an analysis assembly for detecting plant diseases in plant material;

FIG. 19 shows an example of a spectral signal obtained from using near-infrared spectroscopy on sugar beet pieces;

FIG. 20 shows a schematic representation of an example of a method for generating calibration data for the determination of diseases in plant material.

In the figures, elements with the same or comparable functions are indicated with the same reference numerals.

Figure 1:
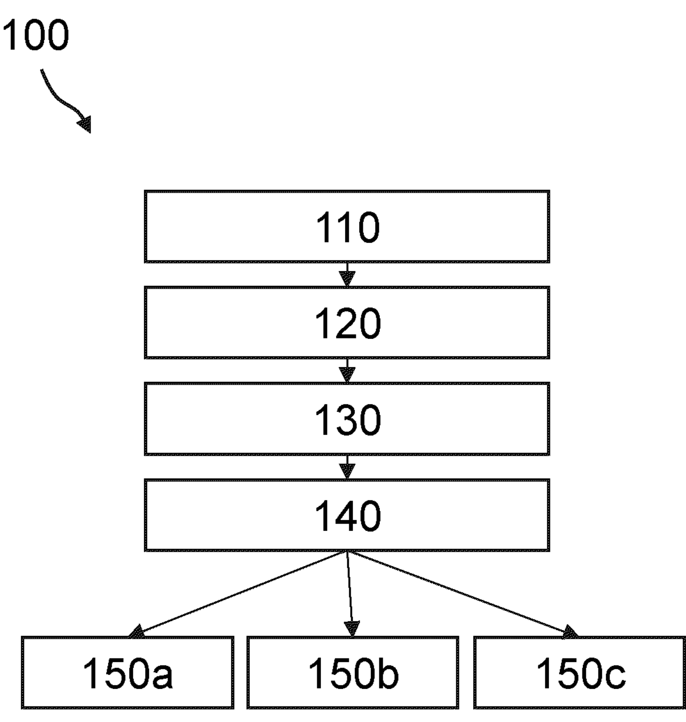

FIG. 1 shows a method 100 for analyzing a crop sample comprising a target plant material with soil tare adhered thereto, in particular soiled plant material. The method comprises the steps described in the following. In a step 110, receiving the crop sample comprising target plant material adhered with soil tare comprising target plant material and soil tare. In a step 120, emitting electromagnetic waves towards the crop sample comprising target plant material adhered with soil tare. In a step 130, receiving electromagnetic waves reflected from the crop sample comprising target plant material adhered with soil tare. In a step 140, processing the received electromagnetic waves using an analysis assembly. Then one or several of the following steps are possible. In a step 150*a*, determining a percentage by mass of the target plant material, and/or in a step 150*b*, determining a percentage by mass of the soil tare, and/or in a step 150*c*, determining components of the soil tare.

Figure 2A:
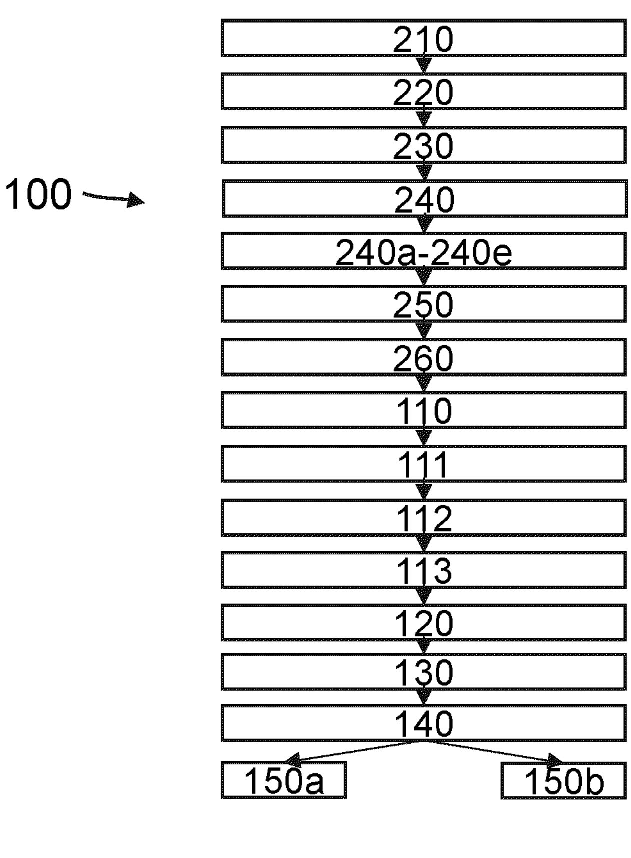

FIG. 2*a* shows a method 100 for analyzing a crop sample comprising a target plant material with soil tare adhered thereto, in particular soiled plant material. In this example a percentage by mass of the target plant material, and/or a percentage by mass of the soil tare can be determined. The method comprises the steps described in the following. First, a calibration is carried out. In a step 210, generating first calibration data, comprising the following steps. In a step 220, taking a sample of the crop sample comprising target plant material adhered with soil tare and dividing the sample into a first sample and a second sample. In a step 230, chopping the target plant material adhered with soil tare of the first sample and moving the first sample along a sensor that is adapted to receive electromagnetic waves and along a camera that is adapted to receive electromagnetic waves. In a step 240, analysis of the first sample by continuously emitting electromagnetic waves towards the first sample, receiving electromagnetic waves from the first sample, and processing the received electromagnetic waves.

Generating first calibration data can further comprise one or several of the following steps: In a step 240*a*, converting the received electromagnetic waves into a spectral signal, preferably by using NIRS and/or into digital images, preferably RGB images. In a step 240*b*, pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out. In a step 240*c*, pre-processing the at least one digital image using a filter, wherein preferably the filter is arranged for using at least one colour threshold to distinguish between target plant material and soil tare. In a step 240*d*, removing spectral signals that are not converted from electromagnetic waves that are reflected from the first sample, preferably by differentiating the spectral signals using classification and/or filtering, in particular using mathematical filtering methods. In a step 240*e*, averaging spectral signals to one spectral signal.

In a step 250, reference analysis of the second sample by determining a first mass of the second sample, removing at least a part of the soil tare from the second sample and subsequently determining a second mass of the second sample, and calculating the percentage by mass of the soil tare with respect to the first mass of the second sample by using the first mass of the second sample and the second mass of the second sample and/or calculating the percentage by mass of the soil tare with respect to the mass of the target plant material by using the first mass of the second sample and the second mass of the second sample. In a step 260, carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks. Further in step 260, comparing the results of the analysis of the first sample with the results of the reference analysis of the second sample.

After carrying out this calibration, the following steps are carried out. In a step 110, receiving the crop sample comprising target plant material adhered with soil tare comprising target plant material and soil tare. In a step 111, chopping the crop sample comprising target plant material adhered with soil tare into pieces. In a step 112, homogeneously distributing the crop sample comprising target plant material adhered with soil tare onto the transport device, preferably with a roller that is arranged above the transport device. In a step 113, moving the crop sample comprising target plant material adhered with soil tare along a sensor that is adapted to receive electromagnetic waves and/or along a camera that is adapted to receive electromagnetic waves, wherein preferably moving the crop sample comprising target plant material adhered with soil tare is conducted using a transport device, preferably a conveyor belt, preferably with a transport velocity within a range of 0.05 m/s to 20 m/s, in particular 0.05 m/s to 10 10 m/s, preferably 0.5 m/s to 5 m/s.

In a step 120, emitting electromagnetic waves towards the crop sample comprising target plant material adhered with soil tare. In a step 130, receiving electromagnetic waves reflected from the crop sample comprising target plant material adhered with soil tare. In a step 140, processing the received electromagnetic waves using an analysis assembly. Then one or several of the following steps are possible. In a step 150*a*, determining a percentage by mass of the target plant material, and/or in a step 150*b*, determining a percentage by mass of the soil tare.

Figure 2B:
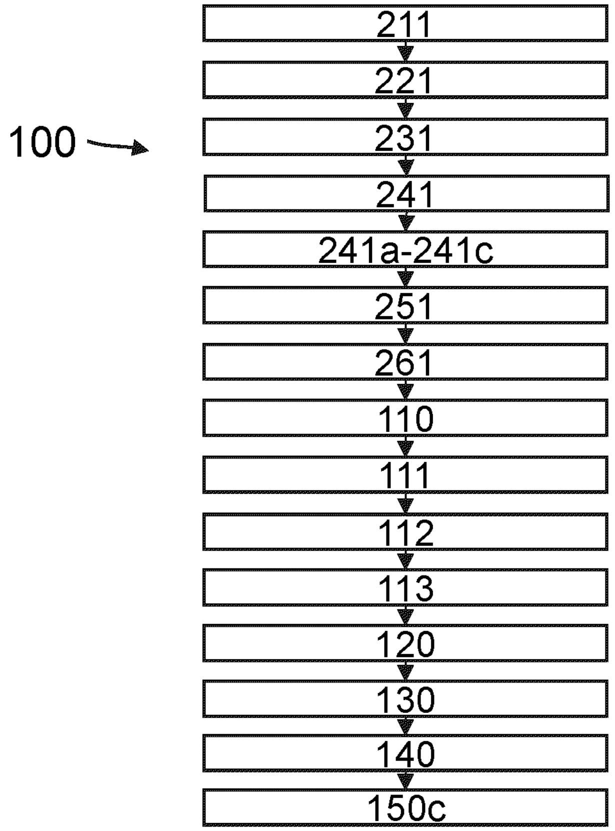

FIG. 2*b* shows a method 100 for analyzing a crop sample comprising a target plant material with soil tare adhered thereto, in particular soiled plant material. In this example components of the soil tare can be determined. The method comprises the steps described in the following. First, a calibration is carried out. In a step 211, generating second calibration data, wherein step 211 comprises the following steps: In a step 221, taking a sample of the crop sample comprising target plant material adhered with soil tare, preferably a determined amount, for example 10 kg. In a step 231, chopping the target plant material adhered with soil tare, and preferably moving the sample along a sensor that is adapted to receive electromagnetic waves. In a step 241, spectroscopic analysis of the sample by, preferably continuously, emitting electromagnetic waves towards the sample, receiving electromagnetic waves, and converting the received electromagnetic waves into a spectral signal, in particular by using laser-induced breakdown spectroscopy (LIBS) and preferably at least one other analytical method.

Generating second calibration data can further comprise one or several of the following steps. In a step 241*a*, pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out. In a step 241*b*, removing spectral signals that are not converted from electromagnetic waves that are reflected from the crop sample comprising target plant material adhered with soil tare, preferably by differentiating the spectral signals using classification and/or filtering, in particular using mathematical filtering methods. In a step 241*c*, averaging spectral signals to one spectral signal.

In a step 251, reference analysis of the soil tare by conducting measurements, such as polarimetry, flame photometry, fluorometric o-5 phthalaldehyde (OPA) method, copper method, immobilized enzyme biosensor method, oven method, atomic absorption spectrometry (AAS), X-ray fluorescence spectroscopy (XRFS), inductively coupled plasma-atomic emission spectrometry (ICP-AES), and/or others. In a step 261, carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks. Further in step 261, comparing the results of the spectroscopic analysis with the results of the reference analysis.

After carrying out this calibration, the following steps are carried out. In a step 110, receiving the crop sample comprising target plant material adhered with soil tare comprising target plant material and soil tare. In a step 111, chopping the crop sample comprising target plant material adhered with soil tare into pieces. In a step 112, homogeneously distributing the crop sample comprising target plant material adhered with soil tare onto the transport device, preferably with a roller that is arranged above the transport device. In a step 113, moving the crop sample comprising target plant material adhered with soil tare along a sensor that is adapted to receive electromagnetic waves and/or along a camera that is adapted to receive electromagnetic waves, wherein preferably moving the crop sample comprising target plant material adhered with soil tare is conducted using a transport device, preferably a conveyor belt, preferably with a transport velocity within a range of 0.05 m/s to 20 m/s, in particular 0.05 m/s to 10 10 m/s, preferably 0.5 m/s to 5 m/s.

In a step 120, emitting electromagnetic waves towards the crop sample comprising target plant material adhered with soil tare. In a step 130, receiving electromagnetic waves reflected from the crop sample comprising target plant material adhered with soil tare. In a step 140, processing the received electromagnetic waves using an analysis assembly. Then one or several of the following steps are possible. In a step 150*c*, determining components of the soil tare.

Figure 3:
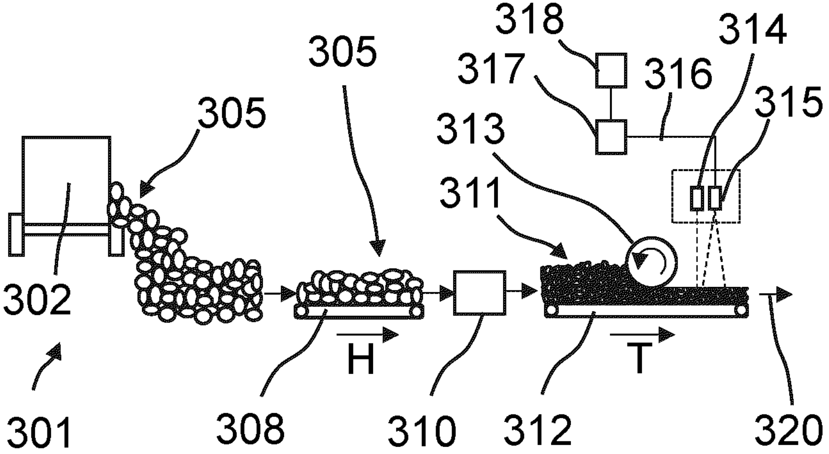

FIG. 3 shows a preferred example of a section of a sugar production facility with an arrangement for determining components of the soil tare and for determining the percentage by mass of the soil tare and/or the percentage by mass of the target material. Sugar beets 305, which is the target material, together with soil tare thereon, in particular soil, are transported to the receiving section 301 by a truck 302. At the receiving section 301, the sugar beets 305 are removed from the truck 302 and optionally stored for some period of time. Then, directly from the truck 302 or after optional storage, the sugar beets 305 are conveyed along a hopping direction H to a chopping device 310 using a sugar beet hopper 308. With the chopping device 310 the sugar beets 305 are cut into sugar beet pieces, wherein the chopping device cuts the sugar beets 305 into sugar beet pieces 311.

The sugar beet pieces 311 are arranged on a transport device 312, which can be a conveyor belt. The sugar beet pieces 311 are transported in a transport direction T from an upstream end of the transport device to a downstream end of the transport device, wherein the transport device 312 generates a stream of sugar beet pieces that moves along the transport direction T. A roller 313 is arranged above the transport device that is adapted to homogeneously distribute and compact the sugar beet pieces that move on the transport device 312 along the transport direction T. Above the transport device 312, an analysis assembly is arranged. Wherein the analysis assembly is arranged to emit electromagnetic waves towards the sugar beet pieces 311 that are arranged on the transport device 312 by using an electromagnetic wave source 314. Furthermore, the analysis assembly is arranged to receive reflected electromagnetic waves by using a sensor 315 that is located directly downstream of the roller 313. The sensor 315 is arranged for detecting the reflected electromagnetic waves from the surface of the sugar beet pieces 312, for example in the wavelength range from 850 nm to 1650 nm. Furthermore, the analysis assembly is arranged to convert the received reflected electromagnetic waves into a spectral signal.

The sensor 315 can continuously record reflected electromagnetic waves and transmit the data via an optical fiber 316 to a spectrometer 317, which converts the spectrally resolved reflected electromagnetic wavelengths into spectral signals. During the stream of sugar beet pieces with soil tare several of such spectral signals are produced, which can be filtered and averaged by a processor 318. By comparison with suitable calibration data, components of the soil tare can be determined and the percentage by mass of the soil tare and/or the percentage by mass of the target material can be determined.

The sugar beet pieces 311 with the soil tare thereon are then cleaned or washed in order to remove the soil tare thereon at least to a larger part and then introduced 320 to a sugar production process (not shown) in a sugar production facility.

Figure 4:
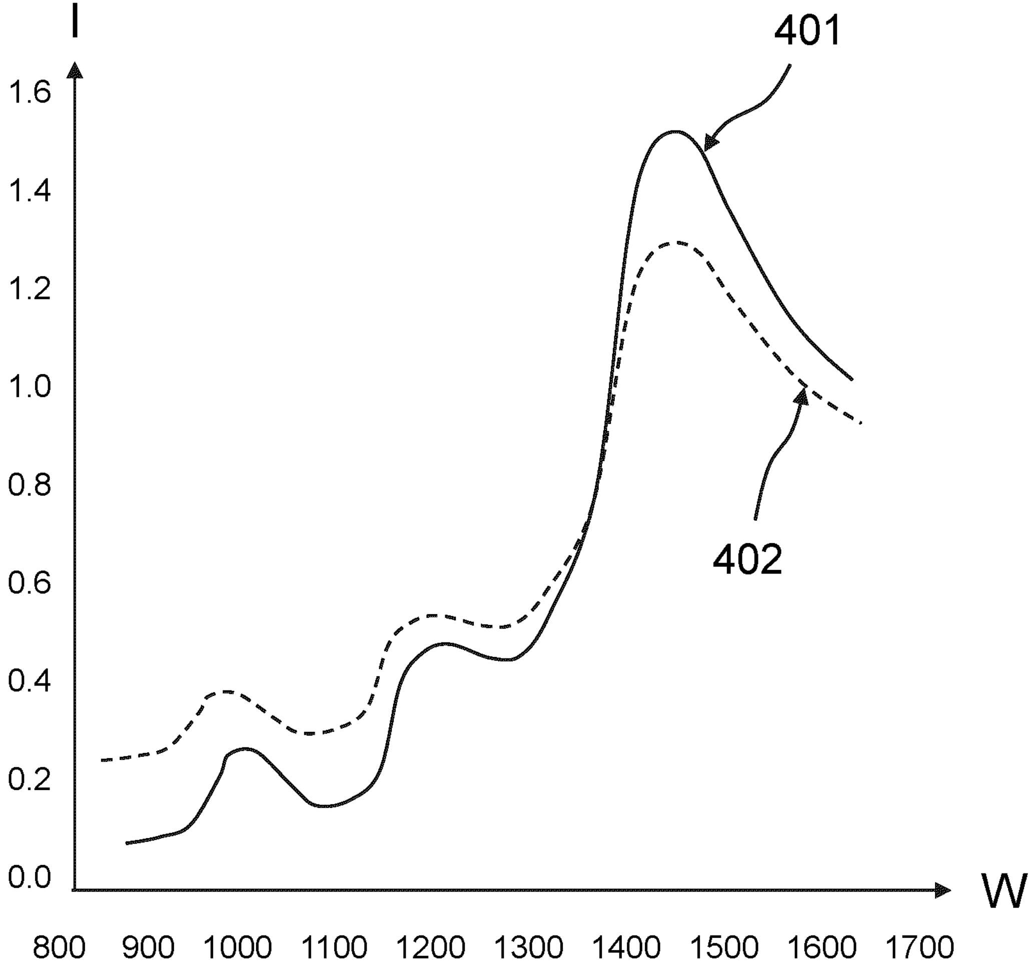

FIG. 4 shows an example of two spectral signals 401, 402 obtained from using near-infrared spectroscopy on sugar beet pieces for sugar production. To generate such spectral signals 401, 402, first, electromagnetic waves are emitted towards sugar beet pieces that are arranged on the transport device by using an electromagnetic wave source. Then, reflected electromagnetic waves are received by using a sensor, wherein the sensor is arranged for detecting the reflected electromagnetic waves from the surface of the sugar beet pieces. Then, the received reflected electromagnetic waves are converted into a spectral signal using a near-infrared spectrometer. In the shown example, reflected electromagnetic waves in the wavelength range from about 850 nm to 1650 nm are received. In the shown diagram, the intensity I is plotted versus the wavelength W (in nm). The spectral signals represents typical curves representing spectral signals for chopped sugar beet pieces that are washed and therefore pre-cleaned (this is the signal 401) and for chopped sugar beet pieces that are not pre-cleaned and therefore include more soil tare (this is signal 402). During a stream of sugar beet pieces several of such spectral signals can be produced, which can be filtered and averaged by a processor. Due to the difference in the spectral signals from cleaned and non-cleaned sugar beet pieces it is possible to determine the amount of soil tare and therefore to determine the percentage by mass of the soil tare only by using information obtained by using spectroscopy.

Figure 5:
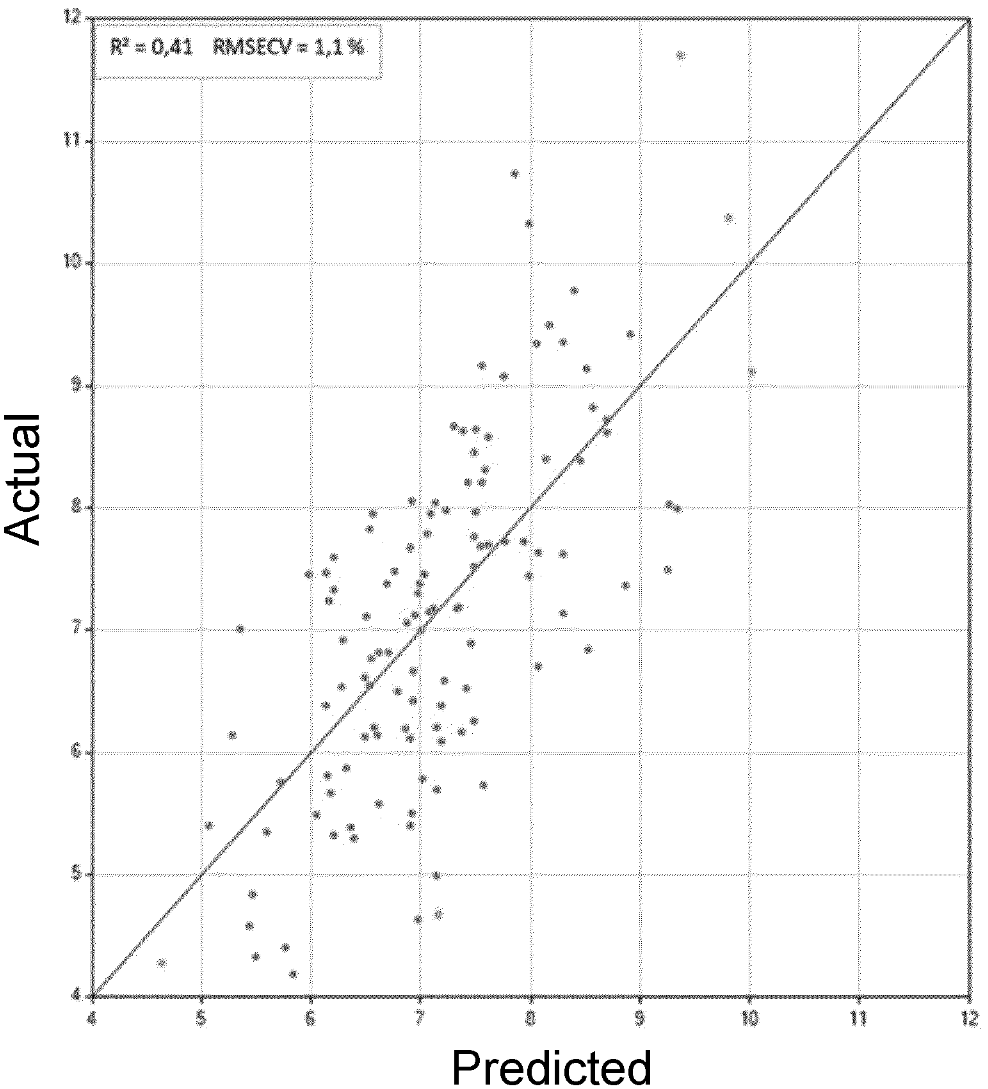

FIG. 5 shows a diagram with values obtained by near-infrared spectroscopy (NIRS) analysis of soil tare. Actual values are plotted versus predicted values. It can be seen that the dots, each representing a measurement, correlate in the diagram. In average, the actual values can be predicted relatively accurate.

Figure 6A:
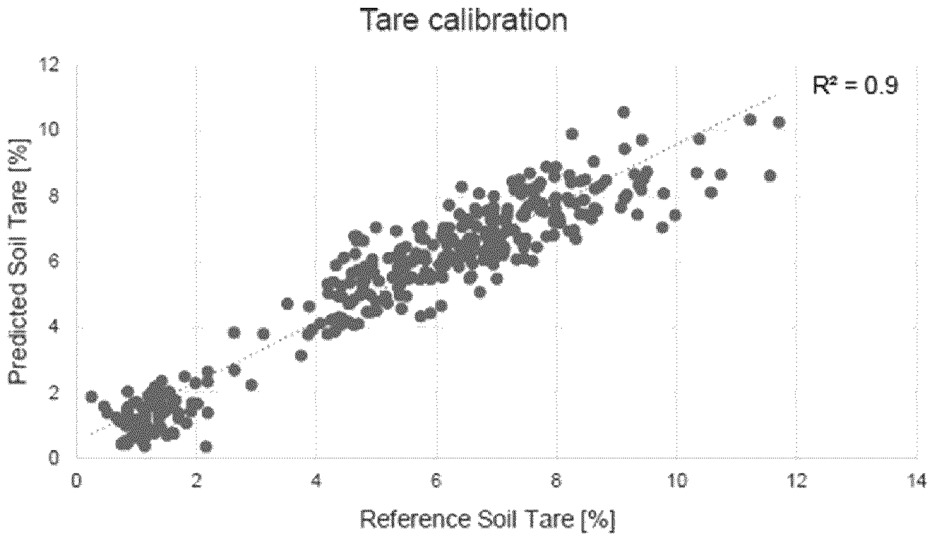

FIG. 6*a* shows a diagram for calibration data with predicted values and reference values of percentage by mass of soil tare. In this figure, the predicted soil tare in percent is understood to be a predicted percentage by mass of soil tare that was determined by using near-infrared spectroscopy (NIRS) analysis. The reference soil tare in percent is understood to be the percentage by mass of the soil tare determined by reference analysis. It can be seen that the dots, each representing a measurement, show a high correlation of $R^2$=0.9. This means that based on these determined values, it can be shown that the percentage by mass of the soil tare can be predicted relatively precisely by using information obtained using near-infrared spectroscopy (NIRS) analysis.

Figure 6B:
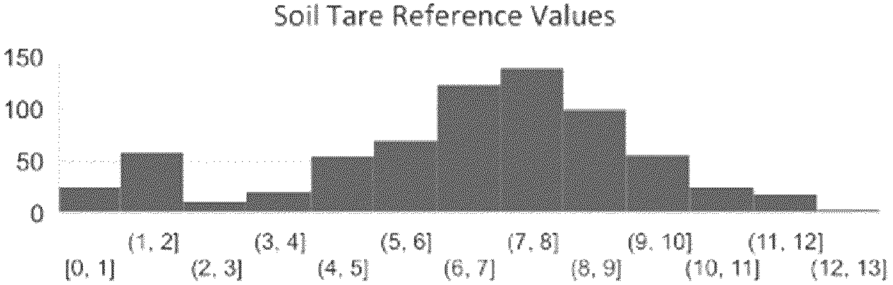

FIG. 6*b* shows a diagram with absolute values of reference values shown in FIG. 6*a*. Several hundred measurements have been conducted, most of them in the region of 6-9 percentage by mass of the soil tare.

Figure 7:
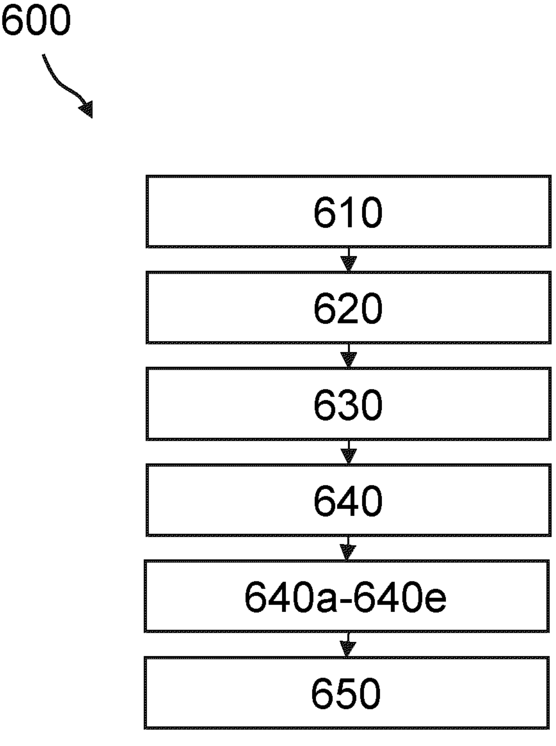

FIG. 7 shows a schematic representation of an example of a method 600 for determining first calibration data. The method comprises the following steps. In a step 610, taking a sample of the crop sample comprising target plant material adhered with soil tare, comprising target plant material and soil tare, and dividing the sample into a first sample and a second sample. In a step 620, chopping the target plant material adhered with soil tare of the first sample, and/or preferably moving the first sample along a sensor that is adapted to receive electromagnetic waves and/or along a camera that is adapted to receive electromagnetic waves. In a step 630, analysis of the first sample by, preferably continuously, emitting electromagnetic waves towards the first sample, receiving electromagnetic waves reflected from the first sample, and preferably processing the received electromagnetic waves. In a step 640, reference analysis of the second sample by determining a first mass of the second sample, removing at least a part of the soil tare from the second sample and subsequently determining a second mass of the second sample, and calculating the percentage by mass of the soil tare with respect to the first mass of the second sample by using the first mass of the second sample and the second mass of the second sample, and/or the percentage by mass of the soil tare with respect to the mass of the target plant material by using the first mass of the second sample and the second mass of the second sample.

In a step 640*a*, converting the received electromagnetic waves into a spectral signal, and/or into at least one digital image, preferably several digital images, in particular RGB images. In a step 640*b*, pre-processing the spectral signal for correcting and/or eliminating overlaying effects, wherein preferably pre-processing is conducted using multiplicative scatter correction (MSC), and/or first derivatives, and/or second derivatives, and/or smoothing, wherein preferably pre-processing is conducted before multiple and/or multivariate and/or linear regression analysis is carried out. In a step 640*c*, pre-processing the at least one digital image using a filter, wherein preferably the filter is arranged for using at least one colour threshold to distinguish between target plant material and soil tare. In a step 640*d*, removing spectral signals that are not converted from electromagnetic waves that are reflected from the first sample, preferably by differentiating the spectral signals using classification and/or filtering, in particular using mathematical filtering methods. In a step 640*e*, averaging spectral signals to one spectral signal And in a step 650, carrying out multiple and/or multivariate and/or linear regression analysis for generating calibration data, wherein preferably the calibration data is derived using principle component analysis (PCA), and/or multiple linear regression (MLR), and/or partial least squares (PLS) regression, and/or machine learning, in particular using neuronal networks. Further in step 650, comparing the results of the analysis of the first sample with the results of the reference analysis of the second sample.

In the following, further examples and explanations with respect to the specifics and functioning of laser-induced breakdown spectroscopy (LIBS) analysis are given.

Apart from the intensity in the spectrum, a higher pulse power and a larger measurement spot lead to a higher amount of measured spectra per plot. Although the high power LIBS had one plot measurement with only 51 averages (which was probably due to the triggering of the measurement by hand), the average spectra per plot are >2 times higher than with the Fiber LIBS. This means that more sample per plot is measured (increased sample cross-section), which helps due to the heterogeneous sample. Example for performance of the system to predict macronutrients were shown for potassium and sodium.

Table Plot inspection: Statistics of averaged spectra per plot

| | Fiber LIBS | High Power LIBS |
|---|---|---|
| Average spectra per plot | 342 | 769 |
| Minimal spectra per plot | 216 | 51 |
| Maximal spectra per plot | 573 | 1182 |

For the determination of potassium, the spectra are normalized on the Ha line (specific deep-red visible spectral line in the Balmer series with a wavelength of 656.28 nm in air) at 565.5 nm and the range limited to 764 till 772 nm, to the two potassium. The noise is lower in the high power spectra, although the signal heights are at the same level due to the normalization. Stated in numbers the Signal-to-noise ratio is ~8 times better for the high power LIBS.

Table Merit of the potassium determination

| | | Factors | Samples | Min. | Max. | Std. | $R^2$ | RMSE | RPD |
|---|---|---|---|---|---|---|---|---|---|
| Fiber | calibration | 2 | 37 | 2.74 | 3.90 | 0.38 | 0.77 | 0.18 | 2.1 |
| LIBS | Cross-validation | 2 | 37 | 2.74 | 3.90 | 0.38 | 0.60 | 0.25 | 1.5 |
| High | calibration | 2 | 37 | 2.74 | 3.90 | 0.38 | 0.76 | 0.18 | 2.1 |
| Power LIBS | Cross-validation | 2 | 37 | 2.74 | 3.90 | 0.38 | 0.65 | 0.23 | 1.6 |

Std.: standard deviation of reference set
R2: coefficient of correlation
RMSE: root mean square error
RPD: residual prediction deviation For the determination of sodium, the spectra are normalized on the Ha line at 565.5 nm and the range is limited to 586 till 591 nm, to the sodium emission line. The noise is lower in the high power spectra. For Sodium, the Signal-to-noise ratio is ~2 times better for the High Power LIBS. In the calibration as well in the cross-validation, the High Power LIBS performs ~20% better than the Fiber LIBS. The High Power LIBS reaches an $R^2$ of 0.83 and a RMSE of 0.38 mmol/100 g fresh beet.

Table Merit of the sodium determination

| | | Factors | Samples | Min. | Max. | Std. | $R^2$ | RMSE | RPD |
|---|---|---|---|---|---|---|---|---|---|
| Fiber | calibration | 2 | 37 | 0.16 | 0.47 | 0.088 | 0.81 | 0.037 | 2.4 |
| LIBS | Cross-validation | 2 | 37 | 0.16 | 0.47 | 0.088 | 0.75 | 0.045 | 1.9 |
| High | calibration | 2 | 37 | 0.16 | 0.47 | 0.088 | 0.89 | 0.029 | 3 |
| Power LIBS | Cross-validation | 2 | 37 | 0.16 | 0.47 | 0.088 | 0.83 | 0.038 | 2.3 |

Std.: standard deviation of reference set
R2: coefficient of correlation
RMSE: root mean square error
RPD: residual prediction deviation The results shown on example of sodium and potassium, that LIBS can be used for analysis of chemical soil parameters as contents of the main nutrients, such as potassium, magnesium, calcium, nitrogen and phosphorus, and the total contents of the trace nutrients such as iron and manganese. About the direct analysis of specific macro- and micronutrients in tare, a specific tare content analysis based on different locations is possible and give sugar factories a better understanding of growing areas.

Figure 8:
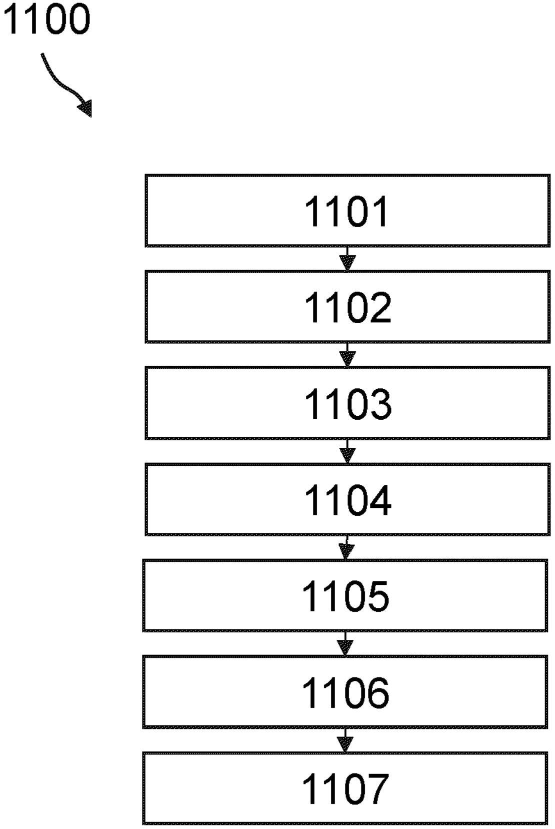
FIG. 8 shows a schematic representation of an example of a method for determining components in sugar beets for sugar production.

FIG. 8 shows a schematic representation of an example of a method 1100 for determining components in sugar beets for sugar production. The method 1100 comprises the steps described in the following. In a step 1101, receiving a plurality of sugar beets including a production portion of sugar beets for sugar production and an analysis portion of sugar beets for component analysis and possibly for sugar production. In a step 1102, providing the plurality of sugar beets including a production portion of sugar beets for sugar production and an analysis portion of sugar beets for component analysis and possibly for sugar production. Preferably, the production portion and/or the analysis portion are provided in sugar beet pieces by chopping and/or slicing. In a step 1103, analysing at least the analysis portion and possibly the production portion. In a step 1104, emitting electromagnetic waves towards at least the analysis portion and possibly the production portion. In a step 1105, receiving electromagnetic waves. In a step 1106, converting the received electromagnetic waves into a spectral signal. In a step 1107, producing sugar from at least the production portion and possibly from the analysis portion.

An example of the method for determining components in sugar beets for sugar production can be as follows, wherein the order of the steps can be different from the order in which the steps are described in the following. The method can comprise the steps described in FIG. 8 and one or several of the steps described in following, wherein the order of the steps can be different from the order in which the steps are described in the following. In a step, providing sugar beet pieces and/or slices from the production portion and/or the analysis portion. In a step, arranging at least the analysis portion and possibly the production portion onto at least one transport device. In a step, conveying at least the analysis portion and possibly the production portion using the at least one transport device, preferably with a transport velocity within a range of 0.05 m/s to 20 m/s, in particular 0.05 m/s to 10 m/s, preferably within a range of 0.05 m/s to 5 m/s, more preferably within a range of 0.05 m/s to 1 m/s. In a step, producing pressed pulp by removing liquid substances from at least the production portion and/or at least the analysis portion, preferably using a mechanical press. In a step, generating calibration data, including taking a sample of sugar beets, preferably a determined amount, for example 10 kg, spectroscopic analysis of the sample by, preferably continuously, emitting electromagnetic waves towards the sample, receiving electromagnetic waves, and converting the received electromagnetic waves into a spectral signal, producing a sugar beet pulp from the sample, preferably by a cutter mill, and extracting the sugar beet pulp, preferably by Aluminium sulfate or lead acetate solution or water, reference analysis of the extracted sugar beet pulp by conducting measurements, such as polarimetry, flame photometry, fluorometric o-phthalaldehyde (OPA) method, copper method, immobilized enzyme biosensor method and/or others, comparing the results of the spectroscopic analysis with the results of the reference analysis. In a step, processing the spectral signal for determining components in at least the analysis portion and possibly the production portion. In a step, comparing the spectral signal with the calibration data and dependent on the comparison determine, preferably quantitatively, the components in at least the analysis portion and possibly the production portion. In a step, changing at least one sugar production parameter, in particular electric field pulses and/or pulse numbers and/or process temperature and/or conveying speed and/or duration of the production portion in reactor dependent on the determined components in at least the analysis portion. In a step, changing at least one drying process parameter for drying pressed pulp, in particular drying time and/or drying temperature for drying pressed pulp dependent on the determined components in at least the analysis portion. In a step, changing at least the order in which sugar beets are introduced into a sugar production process dependent on the determined components in at least the analysis portion. In a step, conveying the production portion and the analysis portion along the first transport section. In a step, conveying at least the analysis portion along the bypass section, wherein the bypass section can be used for analysing the analysis portion and/or for analysing the production portion and/or as step in a calibration process. In a step, conveying at least a part of the production portion, in particular the sugar beet pieces that are not part of the analysis portion, along the main transport section. In a step, conveying the production portion along the second transport section. In a step, conveying the analysis portion along the second transport section and/or discarding the analysis portion. In a step, homogeneously distributing the sugar beet pieces onto the at least one transport device, preferably with a roller that is arranged above the transport device or heterogeneously distributing the sugar beet pieces onto at least one transport device without using a roller.

Figure 9:
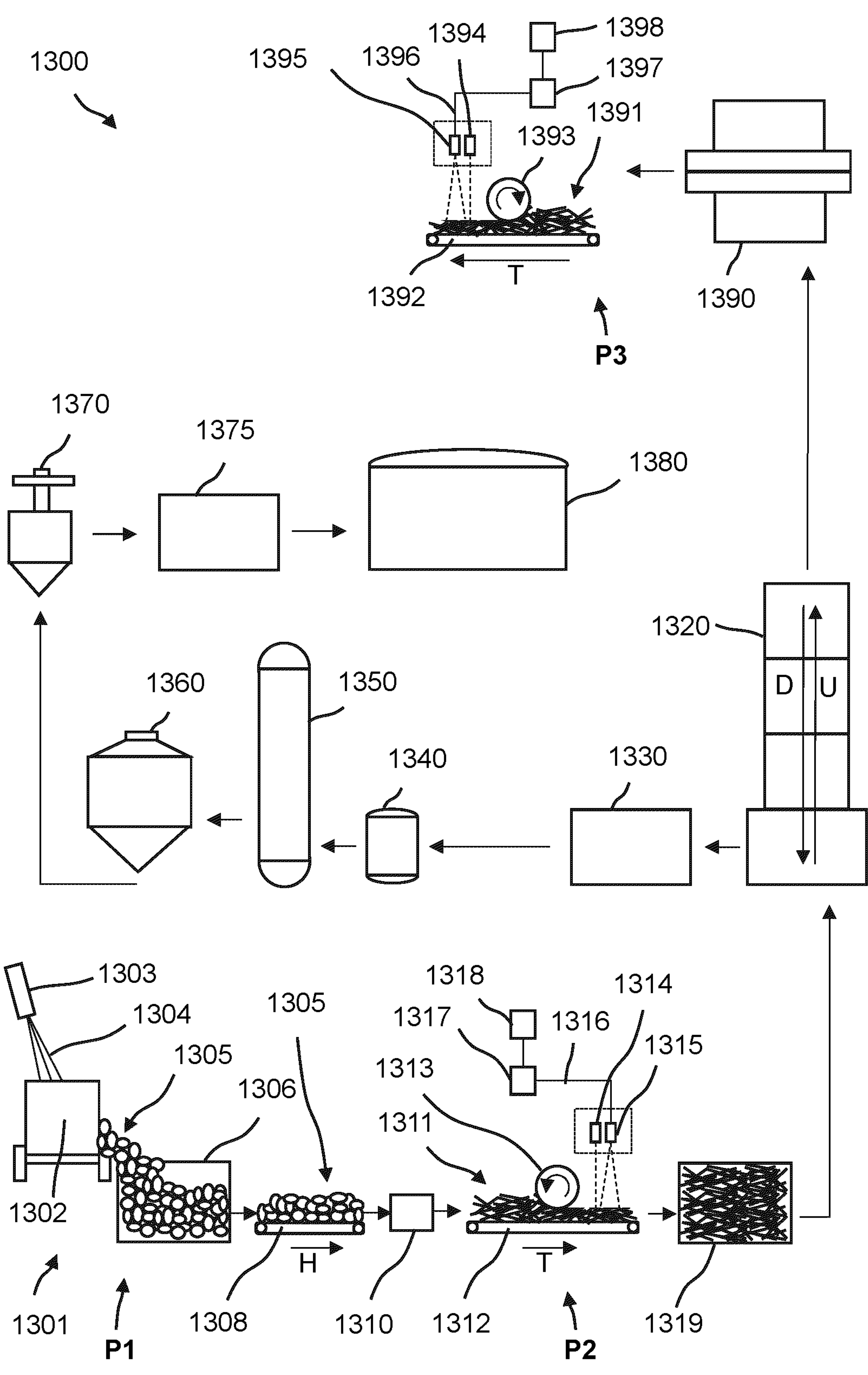
FIG. 9 shows a preferred example of a sugar production facility with an arrangement for determining components in sugar beets for sugar production.

FIG. 9 shows a preferred example of a sugar production facility 1300 with an arrangement for determining components in sugar beets for sugar production. Harvested sugar beets are received at a receiving section 1301 of the sugar production facility. The sugar beets are transported to the receiving section 1301 by a truck 1302. At the receiving section 1301, the sugar beets 1305 are removed from the truck 1302 with a water jet 1304 that is generated from a water source 1303. At the receiving section 1301, the sugar beets can be analysed at a first analysis position P1. At the first analysis position P1 the sugar beets can be analysed with the method described herein. Then, the sugar beets 1305 are washed using a sugar beet washer 1306 to remove soil, stones, mud and sand. The beet washer 1306 can also contain a magnet to remove metal parts. Subsequently, the sugar beets 1305 are conveyed along a hopping direction H to a slicing device 1310 using a sugar beet hopper 1308. With the slicing device 1310 the sugar beets 1305 are cut into sugar beet pieces, wherein the slicing device cuts the sugar beets 1305 into sugar beet pieces 1311 that are formed as thin elongated strips. The sugar beet pieces 1311 are arranged on a transport device 1312, which can be a conveyor belt. The sugar beet pieces 1311 are transported in a transport direction T from an upstream end of the transport device to a downstream end of the transport device, wherein the transport device 1312 generates a stream of sugar beet pieces that moves along the transport direction T. A roller 1313 can be arranged above the transport device that is adapted to homogeneously distribute and compact the sugar beet pieces that move on the transport device 1312 along the transport direction T. However, it is also possible to use the method described herein without a roller.

At a second analysis position P2 sugar beet pieces can be analysed with the method described herein. Above the transport device 1312, an analysis assembly is arranged. Wherein the analysis assembly is arranged to emit electromagnetic waves towards the sugar beet pieces 1311 that are arranged on the transport device 1312 by using an electromagnetic wave source 1314. Furthermore, the analysis assembly is arranged to receive reflected electromagnetic waves by using an optical system 1315 that is located directly downstream of the roller 1313. The optical system 1315 is arranged for detecting the reflected electromagnetic waves from the surface of the sugar beet pieces 1312.

Furthermore, the analysis assembly is arranged to convert the received reflected electromagnetic waves into a spectral signal. The optical system 1315 can continuously record reflected electromagnetic waves and transmit them via an optical fiber 1316 to a spectrometer 1317, which converts the spectrally resolved reflected electromagnetic wavelengths into spectral signals, for example in the wavelength range from 850 nm to 1650 nm. During the stream of sugar beet pieces several of such spectral signals are produced, which can be filtered and averaged by a processor 1318. By comparison with suitable calibration data, the components of the sugar beet pieces such as for example extractable sugar content and several others can be accurately determined. The processer 1318 can comprise a control unit for controlling the analysis assembly and for receiving data from the analysis assembly. The control unit is arranged for changing at least one sugar production parameter dependent on components determined by the analysis assembly. Thus, the sugar production process can be directly adapted to the components of the sugar beet pieces that are currently in the sugar production facility in the sugar production process. Hence, with such an in-process analysis of components, the sugar production process can be optimally adjusted according to the sugar beet pieces from which sugar shall be extracted.

The sugar beet pieces 1311 are then transported to a sugar beet pieces mixer 1319 where the sugar beet pieces are mixed with hot juice. Subsequently, the sugar beet pieces are pumped into the bottom of a diffuser 1320. The sugar is extracted from the sugar beet pieces by means of hot water (for example with a water temperature of about 70° C.) in the diffuser. In the diffuser 1320, the sugar beet pieces move in an upwards direction U and the hot water moves in a downwards direction D, wherein the hot water moves in opposite direction of the direction of the movement of the sugar beet pieces. In the diffuser, sugar is extracted from the sugar beet pieces and obtained from the hot water. This results in a raw juice. The raw juice can contain about 98 wt. % of the total sugar content of the sugar beets and organic and inorganic constituents, which are called non-sugars, from the sugar beets. The non-sugars in the raw juice are bound and extracted by means of the natural substances lime and carbonic acid gas at a lime kiln in a juice cleaning arrangement 1330. Subsequently, the flocculatable insoluble non-sugars and the lime are filtered out in filter units 1340. The filtrate is referred to as thin juice and the filter residue as carbonated lime. The thin juice is thickened in a course of a multi-stage evaporation process with evaporators 1350. This results in a thick juice. The thick juice is thickened further in the evaporators under vacuum. Subsequently, a crystallization process is triggered by adding finely ground sugar to the thick juice in a crystallization device 360. This results in a syrup.

Then, sugar crystals are separated from the syrup by means of centrifugation using a centrifuge 1370. This results in sugar. The sugar is dried by using a drying device 1375 that applies an air stream on the sugar. Subsequently, the dried sugar can be stored in a silo 1380.

From the diffuser 1320 the sugar beet pieces from which sugar has been extracted in the diffuser 1320 are transported to a mechanical press 1390. The mechanical press 1390 presses the sugar beet pieces from which sugar has been extracted to remove liquid from the sugar beet pieces. This results in pressed pulp. The pressed pulp has a lower moisture content compared to the sugar beet pieces before pressing the sugar beet pieces. At a third analysis position P3 the pressed pulp can be analysed with the method described herein. From the mechanical press 1390 the pressed pulp is transported to another analysis assembly, wherein this analysis assembly is arranged to emit electromagnetic waves towards the pressed pulp 1391 that are arranged on another transport device 1392 by using an electromagnetic wave source 1394. Furthermore, the analysis assembly is arranged to receive reflected electromagnetic waves by using an optical system 1395 that is located directly downstream of a roller 1393, wherein the method can also be applied without a roller. The optical system 1395 is arranged for detecting the reflected electromagnetic waves from the surface of the pressed pulp 1391. Furthermore, the analysis assembly is arranged to convert the received reflected electromagnetic waves into a spectral signal. The optical system 1395 can continuously record reflected electromagnetic waves and transmit it via an optical fiber 1396 to a spectrometer 1397, which converts the spectrally resolved reflected electromagnetic wavelengths into spectral signals, for example in the wavelength range from 850 nm to 1650 nm. During the stream of the pressed pulp 1391 a plurality of such spectral signals is produced, which can be filtered and averaged by a processor 1398. By comparison with suitable calibration data, the components of the pressed pulp, such as for example remaining moisture content and several others, can be accurately determined. The processor 1398 can comprise a control unit for controlling the analysis assembly and for receiving data from the analysis assembly. The control unit is arranged for changing at least one sugar production parameter and/or at least one parameter of the mechanical press dependent on components of the pressed pulp determined by the analysis assembly.

In this example, at the analysis positions P2, all sugar beet pieces are analysed for component analysis and all sugar beet pieces are used for sugar production. Therefore, in this example, all sugar beet pieces are part of the analysis portion and all sugar beet pieces are part of the production portion. Furthermore, in this example, the whole pressed pulp that is produced is analysed for pressed pulp component analysis. Therefore, in this example, all of the pressed pulp is part of the pressed pulp analysis portion.

In addition to the analysis positions P1, P2, and P3, sugar beets can also be analysed with the method described herein at other analysis position, such as a fourth analysis position that is arranged at a storage section where sugar beets are stored.

Figure 10:
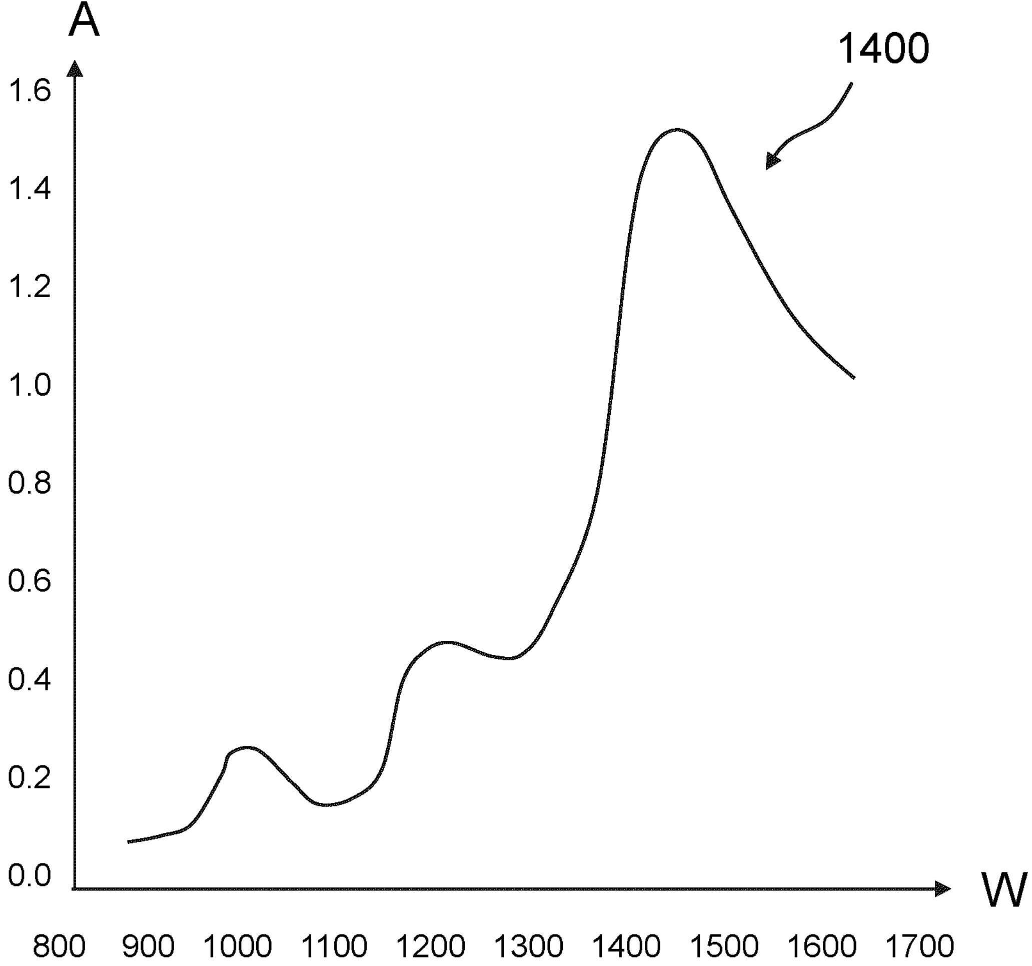
FIG. 10 shows an example of a spectral signal obtained from using near-infrared spectroscopy on sugar beet pieces for sugar production.

FIG. 10 shows an example of a spectral signal 1400 obtained from using near-infrared spectroscopy on sugar beet pieces for sugar production. To generate a spectral signal 1400, first, electromagnetic waves are emitted towards sugar beet pieces that are arranged on the transport device by using an electromagnetic wave source. Then, reflected electromagnetic waves are received by using a sensor, wherein the sensor is arranged for detecting the reflected electromagnetic waves from the surface of the sugar beet pieces. Then, the received reflected electromagnetic waves are converted into a spectral signal using a near-infrared spectrometer. In the shown example, reflected electromagnetic waves in the wavelength range from 850 nm to 1650 nm are received. In the shown diagram, the absorbance A is plotted versus the wavelength W (in nm). The spectral signal 1400 represents a typical curve representing a spectral signal of sugar beet pieces. During a stream of sugar beet pieces several of such spectral signals can be produced, which can be filtered and averaged by a processor. From such a spectral signal 1400 or several of such spectral signals, it is possible to determine components in sugar beet pieces.

FIG. 11*a* shows a first example of a transport device 1312 in a sugar production facility with a bypass section 1540. The transport device 1312 comprises a first transport section 1510 that is arranged upstream of the transport device 1312 and that is arranged to convey sugar beet pieces, comprising an analysis portion for component analysis and a production portion for sugar production, along a transport direction F from an upstream end 1511 of the first transport section 1510 to a downstream end 1512 of the first transport section 1510.

Adjacent to the first transport section 1510, a main transport section 1520 is arranged, wherein the main transport section 1520 has an upstream end 1521 and a downstream end 1522 and the upstream end 1521 of the main transport section 1520 is arranged adjacent to the downstream end 1512 of the first transport section 1510. Optionally a roller can be arranged at first transport section. The main transport section 1520 conveys a part of the production portion, except for the part of the production portion that is the analysis portion, along a transport direction M from the upstream end 1521 of the main transport section 1520 to the downstream end 1522 of the main transport section 5120.

The bypass section 1540 has an upstream end 1541 and a downstream end 1542, wherein the analysis portion is conveyed in a transport direction B from the upstream end 1541 of the bypass section 1540 to the downstream end 1542 of the bypass section 1540. Above the bypass section 1540, an analysis assembly 1515 is arranged, wherein the analysis assembly 1515 is arranged to emit electromagnetic waves towards the analysis portion that is arranged on the bypass section 1540, wherein the analysis assembly 1515 is arranged to receive reflected electromagnetic waves, and wherein the analysis assembly 1515 is arranged to convert the received reflected electromagnetic waves into a spectral signal. Optionally a roller can be arranged at the bypass section.

Adjacent to the main transport section 1520 and the bypass section 1540, a second transport section 1530 is arranged. The second transport section 1530 has an upstream end 1531 and a downstream end 1532. Sugar beet pieces including the analysis portion and the production portion are conveyed along a transport direction S from an upstream end 1531 of the second transport section 1530 to a downstream end 1532 of the second transport section 1530.

As described in this example, the analysis portion is divided from a main stream of sugar beet pieces, which is a stream of the production portion and the analysis portion, via the bypass section 1540 at the downstream end 1512 of the first transport section 1510. Then, the analysis portion is analysed on the bypass section 1540 using the analysis assembly 1515. Subsequently, the analysis portion is reintroduced to the main stream at the upstream end 1531 of the second transport section 1530. Thus, in this example, the analysis portion is part of the production portion.

FIG. 11*b* shows a second example of a transport device 1312 in a sugar production facility with a bypass section 1540. The transport device 1312 comprises a first transport section 1510 that is arranged upstream of the transport device 1312 and that is arranged to convey sugar beet pieces, comprising an analysis portion for component analysis and a production portion for sugar production, along a transport direction F from an upstream end 1511 of the first transport section 1510 to a downstream end 1512 of the first transport section 1510.

Adjacent to the first transport section 1510, a main transport section 1520 is arranged, wherein the main transport section 1520 has an upstream end 1521 and a downstream end 1522 and the upstream end 1521 of the main transport section 1520 is arranged adjacent to the downstream end 1512 of the first transport section 1510. The main transport section 1520 conveys the production portion along a transport direction M from the upstream end 1521 of the main transport section 1520 to the downstream end 1522 of the main transport section 1520.

The bypass section 1540 has an upstream end 1541 and a downstream end 1542, wherein the analysis portion is conveyed in a transport direction B from the upstream end 1541 of the bypass section 1540 to the downstream end 1542 of the bypass section 1540. Above the bypass section 1540, an analysis assembly 1515 is arranged, wherein the analysis assembly 1515 is arranged to emit electromagnetic waves towards the analysis portion that is arranged on the bypass section 1540, wherein the analysis assembly 1515 is arranged to receive reflected electromagnetic waves, and wherein the analysis assembly 1515 is arranged to convert the received reflected electromagnetic waves into a spectral signal. Adjacent to the downstream end 1542 of the bypass section 1540, a container 1550 for collecting the analysis portion is arranged, wherein the analysis portion is conveyed into the container 1550. The analysis portion in the container 1550 can for example be discarded or be reintroduced into the sugar production process or be used in a different way. Optionally a roller can be arranged at the bypass section.

Adjacent to the main transport section 1520, a second transport section 1530 is arranged. The second transport section 1530 has an upstream end 1531 and a downstream end 1532. The production portion is conveyed along a transport direction S from an upstream end 1531 of the second transport section 1530 to a downstream end 1532 of the second transport section 1530.

As described in this example, the analysis portion is divided from the main stream via the bypass section 1540 at the downstream end 1512 of the first transport section 1510, analysed on the bypass section 1540 using the analysis assembly 1515, and then introduced into the container 5150. Thus, in this example, the analysis portion is not part of the production portion.

FIG. 11*c* shows a third example of a transport device 1312 in a sugar production facility with a bypass section 1540. The transport device 1312 comprises a first transport section 1510 that is arranged upstream of the transport device 1312 and that is arranged to convey sugar beet pieces, comprising an analysis portion for component analysis and a production portion for sugar production, along a transport direction F from an upstream end 1511 of the first transport section 1510 to a downstream end 1512 of the first transport section 1510.

Adjacent to the first transport section 1510, a main transport section 1520 is arranged, wherein the main transport section 1520 has an upstream end 1521 and a downstream end 1522 and the upstream end 1521 of the main transport section 1520 is arranged adjacent to the downstream end 1512 of the first transport section 1510. The main transport section 1520 conveys the production portion along a transport direction M from the upstream end 1521 of the main transport section 1520 to the downstream end 1522 of the main transport section 1520.

The bypass section 1540 has an upstream end 1541 and a downstream end 1542, wherein the analysis portion is conveyed in a transport direction B from the upstream end 1541 of the bypass section 1540 to the downstream end 1542 of the bypass section 540. Above the bypass section 1540, an analysis assembly 1515 is arranged, wherein the analysis assembly 1515 is arranged to emit electromagnetic waves towards the analysis portion that is arranged on the bypass section 1540, wherein the analysis assembly 1515 is arranged to receive reflected electromagnetic waves, and wherein the analysis assembly 1515 is arranged to convert the received reflected electromagnetic waves into a spectral signal. The downstream end 1542 of the bypass section 1540 is arranged outside of the sugar production facility. The line 1590 indicates a border of the sugar production facility. Optionally a roller can be arranged at the bypass section.

Adjacent to the main transport section 1520, a second transport section 1530 is arranged. The second transport section 1530 has an upstream end 1531 and a downstream end 1532. The production portion is conveyed along a transport direction S from the upstream end 1531 of the second transport section 1530 to the downstream end 1532 of the second transport section 1530.

As described in this example, the analysis portion is divided from the main stream via the bypass section 1540 at the downstream end 1512 of the first transport section 1510, analysed on the bypass section 1540 using the analysis assembly 1515, and then conveyed outside of the sugar production facility. Thus, in this example, the analysis portion is not part of the production portion.

A transport device 1392 for conveying pressed pulp can also comprise a bypass section as described in one of the examples that are shown in FIGS. 11*a*, 11*b* and 11*c* and be designed accordingly.

FIG. 12 shows a diagram in which polarisation measured on sugar beet pieces using near-infrared spectroscopy PN is plotted versus polarisation measured with a reference method PR. A calibration was developed for sugar beet pieces to check the performance in component analysis on sugar beet pieces that are formed as slices, i.e. as thin elongated strips. Samples consisting of 10 kg of sugar beet pieces in form of slices were analysed using NIRS analysis. Therefore, 10 kg of sugar beet pieces from a sugar production process were taken, then a stream of slices with a height of 100 mm and speed of 0.1 m/s on a conveyor belt was generated. Then the slices were continuously irradiated with electromagnetic waves. Then, reflected radiation in a wavelength range of 850-1650 nm was continuously recorded every 45 ms. Then, the recorded radiation was converted into a spectral signal, and the spectral signal was processed for determination of polarisation in the sugar beet pieces. After such an analysis using NIRS, the sample consisting of 10 kg slices was cut in a cutting mill and mill pulp was produced from the sample. This mill pulp was homogenized, and a subsample was taken and frozen at −25° C. The frozen pulp samples were extracted with warm water (with a temperature of about 40° C.) and the polarisation was determined using a polarimeter. The predicted results from the NIRS analysis PN were compared with values of polarization obtained by using the polarimeter PR. It can be seen that the values for the polarisation obtained using NIRS can be matched with the values for polarisation obtained using a polarimeter. When using a linear equation, as shown in the diagram, the correlation is $R^2=0.8$. By comparing the values for the polarisation obtained from these two different analysis methods, calibration data as described herein can be generated. These results show that component analysis using spectroscopy directly on sugar beet pieces that are present in a sugar production facility is possible.

FIG. 13 shows an example for a combination of different spectroscopy methods for component analysis. Sugar beet pieces at the second analysis position P2 as described in FIG. 9 are shown. The difference in respect to FIG. 9 lies in a combination of different spectroscopy methods. Here, three optical systems 1315*a*, 1315*b*, 1315*c* are arranged for detecting reflected electromagnetic waves from the surface of the sugar beet pieces 1312. One optical system 1315*a* is arranged for detecting electromagnetic waves in a wavelength range that lies in the near-infrared spectrum. Another optical system 1315*b* is arranged for detecting electromagnetic waves in a wavelength range that lies in a spectrum suitable for Raman spectroscopy. Another optical system 1315*c* is arranged for detecting electromagnetic waves in a wavelength range that lies in a spectrum suitable for LIBS spectroscopy. For the optical systems 1315*b* and 1315*c* individual light sources can be used. The received reflected electromagnetic waves are converted into spectral signals. The optical systems 1315*a*, 1315*b*, 1315*c* can continuously record reflected electromagnetic waves and transmit the data via optical fibers 1316*a*, 1316*b*, 1316*c* to spectrometers 1317*a*, 1317*b*, 1317*c*, which convert the spectrally resolved reflected electromagnetic wavelengths into spectral signals. One of the spectrometers 317*a* is a NIR spectrometer, another spectrometer 1317*b* is a LIB spectrometer, and another spectrometer 1317*c* is a Raman spectrometer. During the stream of sugar beet pieces several of such spectral signals are produced, which can be filtered and averaged by processors 1318*a*, 1318*b*, 1318*c*. By comparison with suitable calibration data, the components of the sugar beet pieces such as for example extractable sugar content and several others can be accurately determined. The processers 1318*a*, 1318*b*, 1318*c* can comprise a control unit for controlling the analysis assembly and for receiving data from the analysis assembly.

By the combination of NIR/Raman/LIBS-sensors/optical systems on sugar beet pieces many of the non-sugar components can be analysed for example for monitoring the extraction efficiency and quality of the sugar beets. NIRS calibration for marc content and dry matter content shows a high performance. Based on the formula from Buchholz the monitoring of recoverable sugar on sugar beet pieces is possible, as can be seen in the following table.

| | | Calibration | | Validation | | | |
|---|---|---|---|---|---|---|---|
| Trait | Reference | min | max | min | max | R | SEP |
| Polarization | ICUMSA | 10.4 | 21.9 | 10.5 | 21.7 | 0.97 | 0.34 |
| Recoverable sugar | Calculated from polarization, Na, K, and α-amino-N (ICUMSA) | 9.0 | 20.6 | 9.5 | 20.6 | 0.95 | 0.43 |
| Dry matter | oven | 11.6 | 28.3 | 11.6 | 28.3 | 0.98 | 0.40 |
| Marc content | Wet chemistry | 2.8 | 5.1 | 3.1 | 4.9 | 0.86 | 0.20 |

NIR calibrations, based on total nitrogen-content can be used for quality estimation of sugar beets. In this case spectral information from organic nitrogen-compounds in a sugar beet (also betaine; glutamine; asparagine; pyrrolidone) are recorded in a spectral signal and included in a predicted value for nitrogen.

| | | Calibration | | Validation | | | |
|---|---|---|---|---|---|---|---|
| Trait | Reference | min | max | min | max | R | SEP |
| Total Nitrogen | Dumas | 0.48 | 1.05 | 0.5 | 1.05 | 0.77 | 0.04 |

Another option to get more information about harmful nitrogen in sugar beets is the application of LIBS sensors. High power LIBS can produce spectral signals with a higher intensity. Also the signal-to-noise ratio was increased by applying high power LIBS. For example, for the detection of nitrogen, a wavelength range from 485-640 nm in the spectrometer was selected. The calibration and cross-validation of total N is shown in the following table. Based on only few samples it can be summarized, that with an RPD of 2,2 a screening in low, middle and high nitrogen content is possible.

| | | Min. | Max. | $R^2$ | RMSE | RPD |
|---|---|---|---|---|---|---|
| Fiber LIBS | calibration | 11.84 | 166.65 | 0.75 | 7.73 | 2 |
| | Cross-validation | 11.84 | 166.65 | 0.63 | 9.79 | 1.6 |
| High Power LIBS | calibration | 11.84 | 166.65 | 0.78 | 7.22 | 2.2 |
| | Cross-validation | 11.84 | 166.65 | 0.63 | 10.08 | 1.6 |

Based on used samples it can be summarized, that with an RPD of 2,2 a screening in low, middle and high nitrogen content is possible. Based on the very small range (112-167 mg total-N/g DM) of this samples a better performance is expected by higher variation in total nitrogen content as it is common in quality estimation of sugar production facilities. A combination of different spectroscopy methods as described above could also be applied at another analysis position, such as for example at the first analysis position or at the third analysis position.

FIG. 14 shows segments of a sugar beet for investigating heterogeneity in sugar beets. The heterogeneity in sugar beets has been investigated in detail to get a better understanding of the heterogeneity of components in sugar beets. Therefore, 100 sugar beets from 2 varieties (higher tonnage variety and higher sugar content variety) were investigated. From every variety, 100 uniform beets were selected and sorted by size to process homogenous groups of 5 to 7 sugar beets. In average 16 replications per variety were produced. Every beet was divided into 6 horizontal sections. The slices were cut along specified circular vascular bundles to produce 11 segments in total. Each of the 11 segments is located at a different position of a single sugar beet, as indicated in the figure. The corresponding segments were pooled and processed by grinding and homogenization with ceramic knives in a mill. For the evaluation of the distribution of the components in the sugar beet segments different analyses were performed. The results show significant differences between segments for all components, as can be seen in the following table. For example, the concentration of recoverable sugar usually increases from the root tip to the upper root within a single sugar beet. In the central marc the content of recoverable sugar was up to 1.5% lower compared to the root tissue outside. The highest content of recoverable sugar was found in the middle root tissue. Within sugar beets there is a significant variation for sugar content up to 2.5%, depending on the segment. The results indicate a high heterogeneity in distribution of components within sugar beets for all analysed components.

shows a schematic representation of an example of a method 1900 for generating calibration data for the determination of components in sugar beets for sugar production.

The method 1900 comprises the steps described in the following. In a step 1901, taking a sample of sugar beets, preferably a determined amount, for example 10 kg. In a step 1902, spectroscopic analysis of the sample by, preferably continuously, emitting electromagnetic waves towards the sample, receiving electromagnetic waves, and converting the received electromagnetic waves into a spectral signal. In a step 1903, producing a sugar beet pulp from the sample, preferably by a cutter mill, and extracting the sugar beet pulp, preferably by Aluminium sulfate or lead acetate solution. In a step 1904, reference analysis of the extracted sugar beet pulp by conducting measurements, such as polarimetry, flame photometry, fluorometric o-phthalaldehyde (OPA) method, copper method, immobilized enzyme biosensor method and/or others. In a step 1905, comparing the results of the spectroscopic analysis with the results of the reference analysis.

FIG. 16 shows a schematic representation of an example of a method 2100 for detecting plant diseases in plant material. The method 2100 comprises the steps described in the following. In a step 2101, receiving plant material. In a step 2102, emitting electromagnetic waves towards the plant material. In a step 2103, receiving electromagnetic waves. In a step 2104, converting the received electromagnetic waves into a spectral signal. In a step 2105, determining plant diseases in the plant material. In a step 2105*a*, generating calibration data, including taking a sample of plant material, preferably with and/or without plant diseases, calibration analysis of the plant material by evaluating plant diseases in the plant material, for example by visual scoring of a plant disease that is present in the plant material, spectroscopic

| | Polarisation in % FW | Potassium | Sodium | α-amino-N | Glucose | soluble N in mg/ 100 g beet FW | Total N in % DM | Dry matter in % | Recoverable sugar in % FW | Total N in % DM |
|---|---|---|---|---|---|---|---|---|---|---|
| | | in mmol/100 g beet FW | | | | | | | | |
| Segment 1' | 16.73 | 5.46 | 0.56 | 2.20 | 0.19 | 90.77 | 0.88 | 24.01 | 14.99 | 0.88 |
| Segment 2' | 18.70 | 3.92 | 0.28 | 0.94 | 0.15 | 53.47 | 0.50 | 24.09 | 17.44 | 0.50 |
| Segment 3' | 18.93 | 3.98 | 0.28 | 0.85 | 0.08 | 43.68 | 0.42 | 23.81 | 17.71 | 0.42 |
| Segment 4' | 18.37 | 5.07 | 0.33 | 0.85 | 0.07 | 44.17 | 0.43 | 23.23 | 17.02 | 0.43 |
| Segment 5' | 18.83 | 3.56 | 0.25 | 0.64 | 0.12 | 38.79 | 0.45 | 24.02 | 17.72 | 0.45 |
| Segment 6' | 19.13 | 3.21 | 0.20 | 0.53 | 0.10 | 33.93 | 0.38 | 23.73 | 18.09 | 0.38 |
| Segment 7' | 18.93 | 3.72 | 0.22 | 0.52 | 0.09 | 33.28 | 0.39 | 23.60 | 17.82 | 0.39 |
| Segment 8' | 18.80 | 3.28 | 0.22 | 0.47 | 0.14 | 34.67 | 0.44 | 23.85 | 17.77 | 0.44 |
| Segment 9' | 19.01 | 3.15 | 0.19 | 0.43 | 0.11 | 31.94 | 0.38 | 23.68 | 18.01 | 0.38 |
| Segment 10' | 18.63 | 3.29 | 0.21 | 0.43 | 0.15 | 35.13 | 0.44 | 23.67 | 17.61 | 0.44 |
| Segment 11' | 18.00 | 3.71 | 0.24 | 0.42 | 0.20 | 38.69 | 0.50 | 23.54 | 16.92 | 0.50 |

Also when comparing one sugar beet to another sugar beet the heterogeneity of components can be very high. Therefore, one truckload of sugar beet was divided in 459 individual samples. Each sample was processed and analysed in a quality lab. The results for example for recoverable sugar content show the significant heterogeneity in one grower's truckload. Recoverable sugar content ranged from 11.9% up to 16.2% with an average of 14.5% and a standard deviation of 0.79%. The standard deviation between samples is depending from sample size to evaluate the effect of sample size, random sample results were combined to virtually larger samples. The original average sample size was 11.5 sugar beets per sample. By combining two samples the standard deviation decreased from 0.79% to 0.56% and by merging four samples it decreased further to 0.39 FIG. 15 analysis of the sample by, preferably continuously, emitting electromagnetic waves towards the sample, receiving electromagnetic waves, and converting the received electromagnetic waves into a spectral signal, comparing the results of the spectroscopic analysis with the results of the calibration analysis. In a step 106, comparing the spectral signal with calibration data and/or at least one reference value and dependent on the comparison determine presence and/or quantification and/or qualification of plant diseases in the plant material.

FIG. 17 shows a schematic representation of an example of a method 2100 for detecting plant diseases in plant material. The method 2100 comprises the steps described in FIG. 16 and the steps describes in following, wherein the preferred order of the steps can be seen in FIG. 17. In the following, only the steps that have not already been described in regard to FIG. 16 are described. In a step 2101*a*, chopping and/or slicing the plant material into plant material pieces. In a step 2101*b*, homogeneously distributing the plant material onto a transport device, preferably with a roller that is arranged above the transport device. In a step 2101*c*, adjusting the plant material, in particular by adjusting the height of the plant material and/or by compressing the plant material and/or by smoothing the surface of the plant material, preferably with the roller. In a step 2101*d*, arranging the, preferably homogeneously distributed, plant material onto a transport device. In a step 2101*e*, conveying the plant material using the transport device, wherein preferably the plant material is conveyed towards a sensor, wherein the sensor is adapted to receive reflected electromagnetic waves. In a step 2103*a*, continuously recording received reflected electromagnetic waves, and/or continuously converting the received electromagnetic waves into spectral signals. In a step 2106*a*, introducing plant material into a breeding process, changing at least one breeding parameter, dependent on the determination of plant diseases in the plant material.

FIG. 18 shows an example of an analysis assembly 4 for detecting plant diseases in plant material. In the shown example, plant material, such as for example plant material from the species *Beta vulgaris* and/or *Solanum tuberosum*, in particular sugar beets and/or potatoes, are received in a receiving device 13. The plant material is cut and/or crumbled into plant material pieces using a cutting and/or crumbling device 14, comprising a rotating cutting part 16 in a housing 15. Subsequently, the plant material pieces fall onto a conveyor belt 5 of a transport device 2. As the plant material pieces contact the roller 6, they are spread on the conveyor belt 5 and are subject to a compressive force as a function of the distance between the roller 6 and the conveyor belt 5. The so-compressed plant material pieces have a smooth surface and a constant height. Scrapers 8, 19 are provided on the roller 6 and the conveyor belt 5 and continuously clean the roller surface and belt during operation, thus avoiding the cross-mixing of two different plant material pieces for example from different samples. Moreover, a clumping or accumulation of plant material pieces on the conveyor belt 5 and the roller 6 can be ruled out, which could otherwise severely disturb the comparative homogenization of the sample flow. Directly downstream of the roller 6 a sensor head 9 is arranged with a light source 10 and a sensor 11 for detecting the electromagnetic waves from the smooth surface of the stream of plant material pieces in the wavelength range from 850 nm to 1650 nm. The sensor head 9 can be elevated at a fixed distance of 200 to 250 mm to the surface of the smooth flow of plant material pieces and can be pivoted as desired relative to the stream of plant material pieces. In this way, it is possible to sense and record the entire width of the stream of plant material pieces. The sensor 11 continuously records reflected electromagnetic waves and transmits it via an optical fiber 17 to a spectrometer 18, which converts the spectrally resolved radiation wavelengths into digitized, the spectral signals at regular intervals of 30 ms. Thus, during the flow-by of the stream of plant material pieces, several hundred such spectra are produced within a short period of time, which are filtered and averaged by a processor 12. By comparison with suitable calibration data, plant diseases can be determined in the plant material.

FIG. 19 shows an example of several spectral signals 2400 obtained from using near-infrared spectroscopy on plant material, wherein in this example the plant material consists of sugar beet pieces. To generate spectral signals 400, first, electromagnetic waves are emitted towards sugar beet pieces that are arranged on a transport device by using an electromagnetic wave source. Then, reflected electromagnetic waves are received by using a sensor, wherein the sensor is arranged for detecting the reflected electromagnetic waves from the surface of the sugar beet pieces. Then, the received reflected electromagnetic waves are converted into a spectral signal using a near-infrared spectrometer. In the shown example, reflected electromagnetic waves in the wavelength range from 850 nm to 1650 nm are received. In the shown diagram, the absorbance A is plotted versus the wavelength W (in nm). During a stream of sugar beet pieces several of such spectral signals can be produced, which can be filtered and averaged by a processor. From such spectral signal 2400 or several of such spectral signals, it is possible to detect plant diseases in sugar beet pieces.

The spectral signals 2410 represent typical curves representing spectral signals of sugar beet pieces that are not infected with a plant disease. The spectral signals 2421 and 2422 show a deviation of the absorbance, in particular in the range of about 850 nm to 1300 nm. In this region, the absorbance is much lower for the spectral signals 2421 and 2422 when compared to the spectral signals 2410. The spectral signals 2421 and 2422 represent typical curves representing spectral signals of sugar beet pieces that are infected with the plant disease "*Rhizoctonia*". From the deviation in the spectral signals obtained from healthy sugar beets and infected sugar beets, it is possible to automatically and reliably detect if plant diseases are present and if this is the case which plant diseases are present. For different plant diseases the deviations in the spectral signals caused by these plant diseases can be differently. This allows for distinguishing which plant disease or which plant diseases are present in the plant material from the information of the spectral signals.

For example, determining the plant disease "*Rhizoctonia*" can be achieved with an approach based on the slope of the spectral signal in the area of wavelengths between about 870 nm and 910 nm. Determining the slope in this region also allows a raw screening, wherein the screening is robust due to the nearly independence from the reference values and in particular from the absolute values of the absorbance. This is possible because of the significant influence of the plant disease "*Rhizoctonia*" on the slope in the area of wavelengths between about 870 nm and 910 nm.

Such spectral signals can be obtained for example by using an analysis assembly as shown in FIG. 18.

In particular, the method for determining plant diseases can be applied as described in the following example: Sugar beets with RHC (*Rhizoctonia*) and GTSC (girt scab) symptoms were collected and sorted by a visual scoring, wherein the visual scoring ranges from 1 to 9 with 1 for lowest and 9 for highest severity of visually detectable plant diseases. Each of these classes contained about 10-20 sugar beets. In the laboratory, first whole sugar beets were measured and then the same sugar beets were chopped using a chopping device. Then spectral signals obtained with NIRS were created and evaluated. A calibration was performed by multivariate regression methods between spectral signals and the rating done by visual scoring. The NIR spectral signal obtained from analysis on chopped sugar beets showed a better match with visual scoring than a NIR spectral signal obtained from non-chopped whole sugar beets. The calibration with normal filtering and only one component in the function, showed good results for GTSC. For RHC, the calibration showed good results with low filtering. This can be seen in the following table, were the correlation is indicated by $R^2$ and for most of the tests lies above 95. $R^2$ is the coefficient of correlation. Different filtering and different count of components were conducted.

| | Filtering | component | $R^2$ |
|---|---|---|---|
| RHC | low | 1 | 95.32 |
| RHC | normal | 5 | 97.73 |
| RHC | normal | 1 | 89.44 |
| GTSC | low | 1 | 96.90 |
| GTSC | normal | 1 | 96.36 |

The classical PLS approach works and allows a raw screening (low, medium and high infection). Also, an approach based on the slope of the spectra between 870 nm and 910 nm approach allows a raw screening and is robust due to the nearly independence from reference values. This is possible because of the significant influence of *Rhizoctonia* in this lower wavelength range.

The method can be applied for numerous plant diseases such as for example the following listed and described plant diseases that can occur in sugar beets:

1. RHIZOMANIA/Beet necrotic yellow vein virus (BNYVV, Benyvirus), the causal agent of sugar beet rhizomania (Tamada & Baba, 1973). Rhizomania ('root madness or beardness') is characterized by the extensive proliferation of lateral rootlets along the main taproot, necrosis of the vascular bundle and severe stunting of the plant. BNYVV virions infect the sugar beet root system. In root sections a reddish-brown discoloration of the central stele can occur along with tumour-like symptoms from where the root proliferation appears. Severe infection can result in a high reduction of yield, sugar content and purity.

2. Beet soil-borne/Beet soil-borne virus (BSBV) causes no obvious symptoms on sugar beet. Heavily infected sugar beet plants can exhibit browning and necrosis of vascular bundles. Beet soil-borne mosaic virus (BSBMV) is a member of the genus Benyvirus. The roots of BSBMV-infected sugar beets are generally asymptomatic.

3. VIRUS YELLOWS/Currently, the sugar beet 'mild' yellowing viruses are classified within the family Luteoviridae of which there are three genera: Luteovirus, Polerovirus and Enamovirus. Within the Polerovirus genus there are three key beet-infecting species, Beet mild yellowing virus (BMYV), Beet western yellows virus-USA (BWYV) and Beet chlorosis virus (BChV). Initial symptoms of beet polerovirus-infected sugar beet are diffuse chlorotic areas on fully expanded leaves, and these areas eventually expand and merge.

4. *Aphanomyces* root rot/Abundant lateral roots are formed, which quickly become black and shrivelled. Root lesions start out yellow-brown and appear water-soaked, later becoming dark brown to black. The fungus may invade the lower portion of the taproot, inducing a tip rot.

5. *Rhizoctonia* root and crown rot/Roots show varied degrees of a dark brown to blackish rot, often beginning at the crown and extending down the taproot. Deep cankers or fissures are common in the crown area and on the side of affected roots, and brownish fungal hyphae may be visible within such cavities.

6. Violet root rot/Roots of affected plants exhibit purplish areas and a felt-like, reddish-purple mycelial growth that advances over the root surface from the tip to the crown, causing much soil adherence to diseased roots.

7. *Phymatotrichum* root rot/The fungus spreads over the root surface as a thin, felt-like layer of yellowish mycelium. Eventually, affected roots develop a rather superficial, yellow to tan rot.

8. *Phytophthora* root rot/Blackish spots appear toward the base of roots and a wet rot eventually spreads upward on the taproot. Rotted tissue is brown, with a blackish margin between healthy and diseased areas.

9. *Pythium* root rot/Grey to brown lesions appear on taproots, turning roots dark and spongy.

10. *Phoma* root rot/Dark brown, depressed lesions on the root surface near the crown are the first signs of this rot caused by *Phoma betae*. A soft watery rot develops beneath these lesions and spreads into neighbouring areas of the root. The rotting tissue is dark brown to black, subsequently darkening further and becoming dry and shrunken.

11. Beet vascular necrosis and rot/Root symptoms vary from soft to dry rot, and vascular bundles become necrotic. When the root is cut to expose the necrotic vascular bundles, surrounding areas turn pink or reddish within 20-30 seconds.

12. Crown gall/A tumorous outgrowth develops on the side of the root sometimes growing even larger than the root itself. The gall or galls tend to be covered by a corky or warty surface and are attached to the root by a relatively small neck of tissue.

13. Scab/Brown, round or oval, corky or scaly wart-like growths are found scattered over the root surface.

14. Low sugar syndrome (Basses richesses)/Affected plants may be scattered throughout the crop or occur at high density and their sugar content is reduced by 2-4%.

15. Insects can as well directly or indirectly influence the quality of sugar beets.

FIG. 20 shows a schematic representation of an example of a method for generating calibration data for the determination of diseases in plant material. The method 2500 comprises the steps described in the following. In a step 2501, taking a sample of plant material. In a step 2502, calibration analysis of the plant material by evaluating plant diseases in the plant material, for example by visual scoring of a plant disease that is present in the plant material. In a step 5203, spectroscopic analysis of the sample by, preferably continuously, emitting electromagnetic waves towards the sample, receiving electromagnetic waves, and converting the received electromagnetic waves into a spectral signal. In a step 2504, comparing the results of the spectroscopic analysis with the results of the calibration analysis.

LIST OF REFERENCE SIGNS

100 method for analyzing a crop sample comprising a target plant material with soil tare adhered thereto
110 receiving the crop sample comprising target plant material adhered with soil tare comprising target plant material and soil tare
111 chopping the crop sample comprising target plant material adhered with soil tare
112 homogeneously distributing the crop sample comprising target plant material adhered with soil tare
113 moving the crop sample comprising target plant material adhered with soil tare along a sensor
120 emitting electromagnetic waves towards the crop sample comprising target plant material adhered with soil tare
130 receiving electromagnetic waves reflected from the crop sample comprising target plant material adhered with soil tare
140 processing the received electromagnetic waves using an analysis assembly
**150*a*** determining a percentage by mass of the target plant material
**150*b*** determining a percentage by mass of the soil tare

150*c* determining components of the soil tare.
210 generating first calibration data
211 generating second calibration data
221 taking a sample of the crop sample comprising target plant material adhered with soil tare
231 chopping the target plant material adhered with soil tare
241 spectroscopic analysis
241*a* pre-processing the spectral signal
241*b* removing spectral signals
241*c* averaging spectral signals
251 reference analysis
261 carrying out multiple and/or multivariate and/or linear regression and comparing the results
220 taking a sample of the crop sample comprising target plant material adhered with soil tare and dividing the sample
230 chopping the target plant material adhered with soil tare
240 analysis of the first sample
240*a* converting the received electromagnetic waves into a spectral signal
240*b* pre-processing the spectral signal
240*c* pre-processing the at least one digital image
240*d* removing spectral signals
240*e* averaging spectral signals
250 reference analysis of the second sample
260 carrying out multiple and/or multivariate and/or linear regression analysis and comparing the results
301 receiving section
310 chopping device
401 spectral signal of pre-cleaned chopped sugar beet pieces
402 spectral signal of chopped sugar beet pieces that are not pre-cleaned
610 taking a sample of the crop sample comprising target plant material adhered with soil tare
620 chopping the target plant material adhered with soil tare of the first sample
630 analysis of the first sample
640 reference analysis of the second sample
640*a* converting the received electromagnetic waves into a spectral signal
640*b* pre-processing the spectral signal
640*c* pre-processing the at least one digital image using a filter
640*d* removing spectral signals
640*e* averaging spectral signals
640*f* carrying out multiple and/or multivariate and/or linear regression analysis
650 comparing the results
1100 method for determining components in sugar beets for sugar production
1101 receiving a plurality of sugar beets
1102 providing the plurality of sugar beets
1103 analysing at least the analysis portion
1104 emitting electromagnetic waves towards at least the analysis portion
1105 receiving electromagnetic waves
1106 converting the received electromagnetic waves into a spectral signal
1107 producing sugar
1300 sugar production facility
1301 receiving section
1302 truck
1303 water source
1304 water jet
1305 sugar beets
1306 beet washer
1308 sugar beet hopper
1310 slicing device
1311 sugar beet pieces
1312 transport device
1313 roller
1314 electromagnetic wave source
1315, 1315*a*, 1315*b*, 1315*c* optical system
1316, 1316*a*, 1316*b*, 1316*c* optical fiber
1317, 1317*a*, 1317*b*, 1317*c* spectrometer
1318, 1318*a*, 1318*b*, 1318*c* processor
1319 sugar beet pieces mixer
1320 diffuser
1330 juice cleaning arrangement
1340 filter units
1350 evaporators
1360 crystallization device
1370 centrifuge
1375 drying device
1380 silo
1390 mechanical press
1391 pressed pulp
1392 transport device
1393 roller
1394 electromagnetic wave source
1395 optical system
1396 optical fiber
1397 spectrometer
1398 processor
D downwards direction in diffuser
H hopping direction
T transport direction
U upwards direction in diffuser
P1 first analysis position
P2 second analysis position
P3 third analysis position
1400 spectral signal
A absorbance
W wavelength
1510 first transport section
1511 upstream end of the first transport section
1512 downstream end of the first transport section
1515 analysis assembly
1520 main transport section
1521 upstream end of the main transport section
1522 downstream end of the main transport section
1530 second transport section
1531 upstream end of the second transport section
1532 downstream end of the second transport section
1540 bypass section
1541 upstream end of the bypass section
1542 downstream end of the bypass section
1550 container
1590 boarder of sugar production facility
B transport direction along the bypass section
F transport direction along the first transport section
M transport direction along the main transport section
S transport direction along the second transport section
PN polarisation measured with near-infrared spectroscopy
PR polarisation reference
1900 method for generating calibration data
1901 taking a sample of sugar beets
1902 spectroscopic analysis of the sample
1903 producing a sugar beet pulp
1904 reference analysis of the extracted sugar beet pulp

1905 comparing the results of the spectroscopic analysis with the results of the reference analysis

The invention claimed is:

1. A method for determining components in industrial processing of sugar beets in a production facility, the method comprising:

providing a plurality of sugar beets including a production portion of sugar beets for production and an analysis portion of sugar beets for component analysis and for production;

analysing the analysis portion, wherein analysing comprises:

emitting electromagnetic waves towards the analysis portion, receiving electromagnetic waves, and converting the received electromagnetic waves into a spectral signal;

processing the spectral signal to determine components in the analysis portion;

adjusting one or more production parameters based on the determined components in the analysis portion; and responsive to adjusting the one or more production parameters, producing a product from the production portion and from the analysis portion.

2. The method according to claim 1, wherein analysing is performed as a continuous process comprising converting the received electromagnetic waves into the spectral signal in intervals less than 100 ms.

3. The method according to claim 1, wherein the mass fraction of the analysis portion is at least 0.001% of the plurality of sugar beets.

4. The method according to claim 1, further comprising:

generating calibration data, including one or more of the following:

taking a sample of sugar beets and moving the sample along a sensor that is adapted to receive electromagnetic waves, producing a sugar beet pulp from the sample and extracting the sugar beet pulp by one or more of Aluminium sulfate, lead acetate, a water solution, or a combination thereof, performing reference analysis of the extracted sugar beet pulp by conducting measurements comprising one or more of polarimetry, flame photometry, fluorometric o-phthalaldehyde (OPA) method, copper method, immobilized enzyme biosensor method, oven method, or a combination thereof, pre-processing the spectral signal for correcting and/or eliminating overlaying effects, wherein pre-processing is conducted using one or more of multiplicative scatter correction (MSC), inverse MSC, extended MSC, smoothing, standard normal variate (SNV), normalization, or a combination thereof, removing one or more first spectral signals that are not converted from electromagnetic waves that are reflected from or emitted through the sugar beets, by differentiating the one or more first spectral signals using one or more of classification, filtering, mathematical filtering methods, or a combination thereof, averaging spectral signals to one spectral signal, and carrying out multiple and/or multivariate analysis for generating the calibration data, wherein the calibration data is derived using one or more of principle component analysis (PCA), partial least squares (PLS) regression, machine learning, neuronal networks, or a combination thereof.

5. The method according to claim 4, further comprising:

comparing the spectral signal with the calibration data and dependent on the comparison determine the components in the analysis portion.

6. The method according to claim 1, wherein the wavelength of the electromagnetic waves lies in one or more of the infrared spectrum, the near-infrared spectrum, the microwave region, the visible spectrum, the ultraviolet spectrum, or a combination thereof, and wherein the spectral signal is converted by using one or more of spectroscopy, in particular near-infrared spectroscopy (NIRS), mid-infrared-spectroscopy, far-infrared spectroscopy, terahertz-spectroscopy, ultraviolet-visible spectroscopy (UV-Vis), Raman spectroscopy, laser-induced breakdown spectroscopy (LIBS), fluorescence spectroscopy, hyperspectral imaging, nuclear magnetic resonance, or a combination thereof.

7. The method according to claim 1, wherein adjusting the one or more production parameters comprises one or more of the following:

changing one or more of electric field pulses, pulse numbers, a process temperature, a conveying speed, a duration of the production portion in reactor, application of milk of lime and $CO_2$ in raw juice purification, adjustment of processes of liming, carbonation, sludge separation and sulphitation in juice purification, or a combination thereof, and changing at least one drying process parameter for drying pressed pulp.

8. The method according to claim 1, wherein emitting the electromagnetic waves towards the analysis portion is conducted while the analysis portion is conveyed using a transport device.

9. A method for generating calibration data for the determination of components in sugar beets for sugar production, the method comprising:

taking a sample of sugar beets and moving the sample along a sensor that is adapted to receive electromagnetic waves;

performing spectroscopic analysis of the sample by continuously emitting electromagnetic waves towards the sample, receiving electromagnetic waves, and converting the received electromagnetic waves into a spectral signal;

producing a sugar beet pulp from the sample and extracting the sugar beet pulp by one or more of Aluminium sulfate, lead acetate solution, water, or a combination thereof;

performing reference analysis of the extracted sugar beet pulp by conducting measurements comprising one or more of polarimetry, flame photometry, fluorometric o-phthalaldehyde (OPA) method, copper method, immobilized enzyme biosensor method, oven method, or a combination thereof; and comparing the results of the spectroscopic analysis with the results of the reference analysis.

10. An arrangement for determining components in sugar beets for sugar production, the arrangement comprising:

a receiving section configured to receive a plurality of sugar beets including a production portion of sugar beets for sugar production and an analysis portion of sugar beets for component analysis and for sugar production;

a chopping device configured to cut the analysis portion into substantially equal sized sugar beet pieces;

a transport device configured to convey the analysis portion and the production portion;

an analysis assembly configured to emit electromagnetic waves towards the analysis portion that is arranged on the transport device, and to convert the received electromagnetic waves into a spectral signal;

a production device configured to produce a product from the analysis portion and from the production portion; and a control unit configured to:

receive the spectral signal from the analysis assembly;

process the received spectral signal to determine components in the analysis portion; and adjust in real-time at least one sugar production parameter based on the determined components in the analysis portion, wherein the at least one sugar production parameter comprises one or more of electric field pulses, pulse numbers, a process temperature, a conveying speed, a duration of the production portion in reactor, application of milk of lime and CO2 in raw juice purification, and/or adjustment of processes of liming, carbonation, sludge separation and sulphitation in juice purification, a drying time, a drying temperature, or a combination thereof.

11. The arrangement according to claim 10, wherein the production device is configured to produce the product based on the at least one adjusted sugar production parameter.

* * * * *